(12) United States Patent
Inagaki et al.

(10) Patent No.: US 7,885,249 B2
(45) Date of Patent: Feb. 8, 2011

(54) COMMUNICATION SYSTEM AND METHOD

(75) Inventors: Takeo Inagaki, Tokyo (JP); Haruo Oba, Kanagawa (JP); Taku Sugawara, Tokyo (JP); Junichi Rekimoto, Tokyo (JP); Nobuyuki Matsushita, Kanagawa (JP); Yuji Ayatsuka, Tokyo (JP)

(73) Assignee: Sony Corporation (JP)

( * ) Notice: Subject to any disclaimer, the term of this patent is extended or adjusted under 35 U.S.C. 154(b) by 1142 days.

(21) Appl. No.: 10/483,910

(22) PCT Filed: Jul. 16, 2002

(86) PCT No.: PCT/JP02/07197

§ 371 (c)(1),
(2), (4) Date: Sep. 24, 2004

(87) PCT Pub. No.: WO03/009534

PCT Pub. Date: Jan. 30, 2003

(65) Prior Publication Data
US 2005/0025117 A1    Feb. 3, 2005

(30) Foreign Application Priority Data
Jul. 18, 2001 (JP) ............................. 2001-218520

(51) Int. Cl.
H04J 3/06 (2006.01)
(52) U.S. Cl. ........................................ 370/350
(58) Field of Classification Search ................ 455/41.2, 455/41.3, 558, 557, 556.1, 151.2; 370/406, 370/453
See application file for complete search history.

(56) References Cited
U.S. PATENT DOCUMENTS
6,340,952 B1 * 1/2002 Tsai et al. .................. 343/741

(Continued)

FOREIGN PATENT DOCUMENTS
DE    100 46 300 A1    6/2001

(Continued)

OTHER PUBLICATIONS

Akira Nihei, "Keitai Denwa wa Benri na Saifu ni Pocket ni Keitai dakega Arebaii Seikatsu ga Kuru", Jul. 1, 2001, ASCII, vol. 25, No. 7, pp. 278 to 279.

(Continued)

*Primary Examiner*—Diane Mizrahi
(74) *Attorney, Agent, or Firm*—Finnegan Henderson Farabow Garrett & Dunner LLP

(57) ABSTRACT

The present invention relates to a communication system and a communication method for simply and quickly starting communication. A cellular phone 52 is loaded with a non-contact IC card that communicates with a reader/writer of a personal computer 51 using an electromagnetic wave. When the non-contact IC card receives the electromagnetic wave emitted from the reader/writer with the cellular phone 52 placed close to the personal computer 51, the cellular phone 52 notifies the personal computer 51 of a card ID set in the non-contact IC card. When the personal computer 51 acquires Bluetooth device names of the cellular phone 52 and PDA 53 with intra-piconet synchronization established between the cellular phone 52 and the PDA 53, the personal computer 51 identifies the cellular phone 52 as a communication partner based on the Bluetooth device names already notified of as the card ID. The present invention is applicable to an information processing apparatus such as a personal computer and a cellular phone.

23 Claims, 33 Drawing Sheets

U.S. PATENT DOCUMENTS

| | | |
|---|---|---|
| 6,574,266 B1 | 6/2003 | Haartsen |
| 6,725,061 B1 | 4/2004 | Hutchison, IV et al. |
| 6,788,656 B1 * | 9/2004 | Smolentzov et al. ........ 370/328 |
| 6,859,650 B1 | 2/2005 | Ritter |
| 6,879,570 B1 | 4/2005 | Choi |
| 7,170,878 B2 * | 1/2007 | Fukuda ........................ 370/338 |
| 2001/0003191 A1 | 6/2001 | Kovacs et al. |
| 2001/0007815 A1 | 7/2001 | Philipsson |
| 2002/0031228 A1 * | 3/2002 | Karkas et al. ................ 380/270 |
| 2002/0066042 A1 * | 5/2002 | Matsumoto et al. .......... 713/202 |
| 2003/0149794 A1 * | 8/2003 | Morris et al. ................ 709/249 |
| 2004/0067734 A1 | 4/2004 | Gunnarsson |

FOREIGN PATENT DOCUMENTS

| | | | |
|---|---|---|---|
| EP | 1 107 512 | A1 | 6/2001 |
| GB | 2 358 329 | A | 7/2001 |
| JP | 2001-144781 | | 5/2001 |
| JP | 2001-156704 | | 6/2001 |
| WO | WO 98/58510 | | 12/1998 |
| WO | WO 00/42797 | | 7/2000 |
| WO | WO 01/01717 | A1 | 1/2001 |
| WO | WO 01/39103 | A1 | 5/2001 |
| WO | WO 01/45319 | A1 | 6/2001 |

OTHER PUBLICATIONS

European Search Report issued on Oct. 17, 2007, in related Application No. 02746080.7 (4 pages).

* cited by examiner

FIG. 18

| SPECIFICATION ITEMS | | | |
|---|---|---|---|
| DATA RATE | | | 211.875kbps |
| POWER TRANS-MISSION | | CENTER FREQUENCY | 13.56MHz |
| | | OUTPUT | 350mW |
| DATA TRANSFER | R/W → Card | CENTER FREQUENCY | 13.56MHz |
| | | MODULATION SYSTEM | ASK |
| | Card → R/W | CENTER FREQUENCY | 13.56MHz |
| | | MODULATION SYSTEM | LOAD SWITCHING |

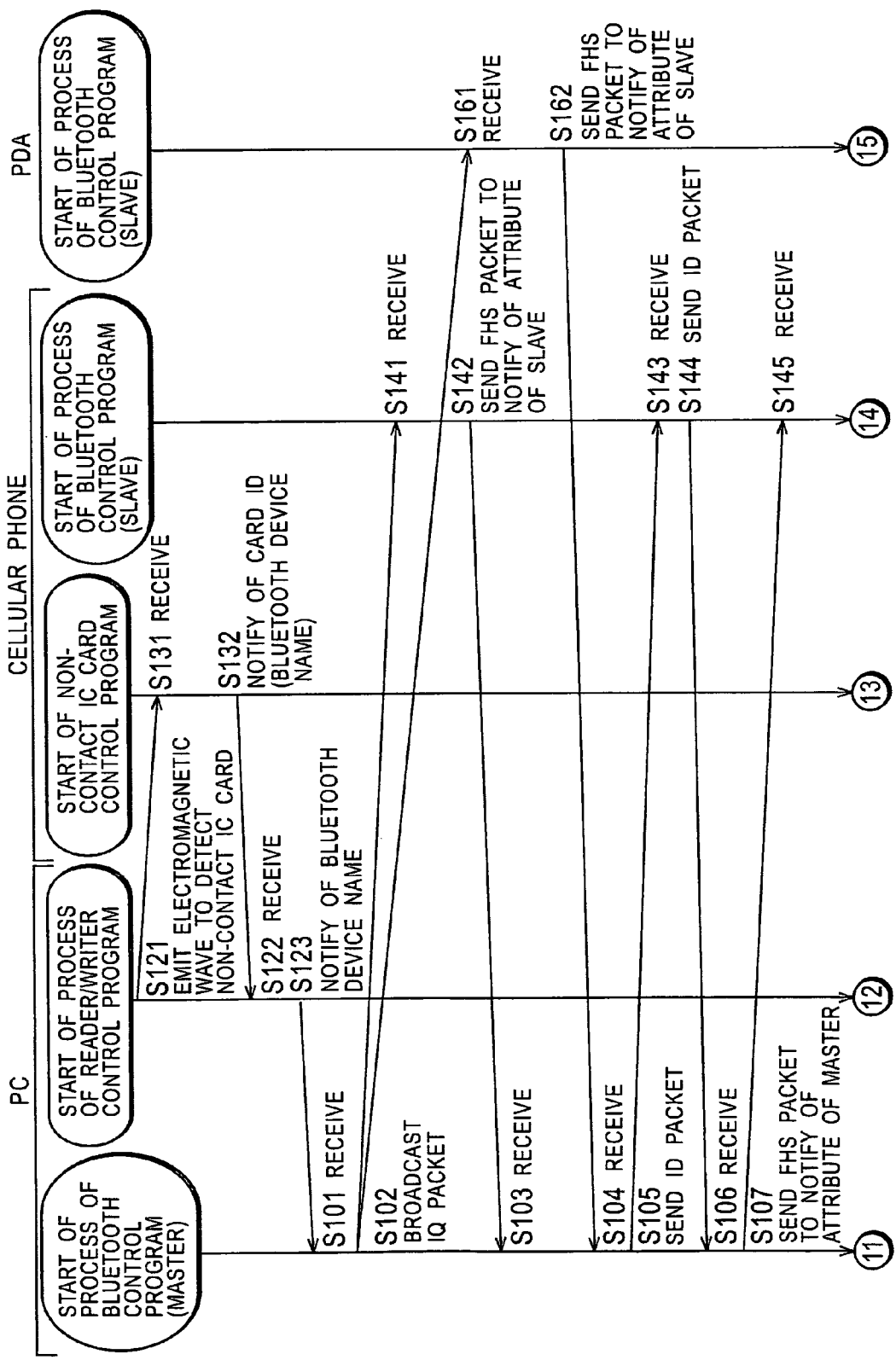

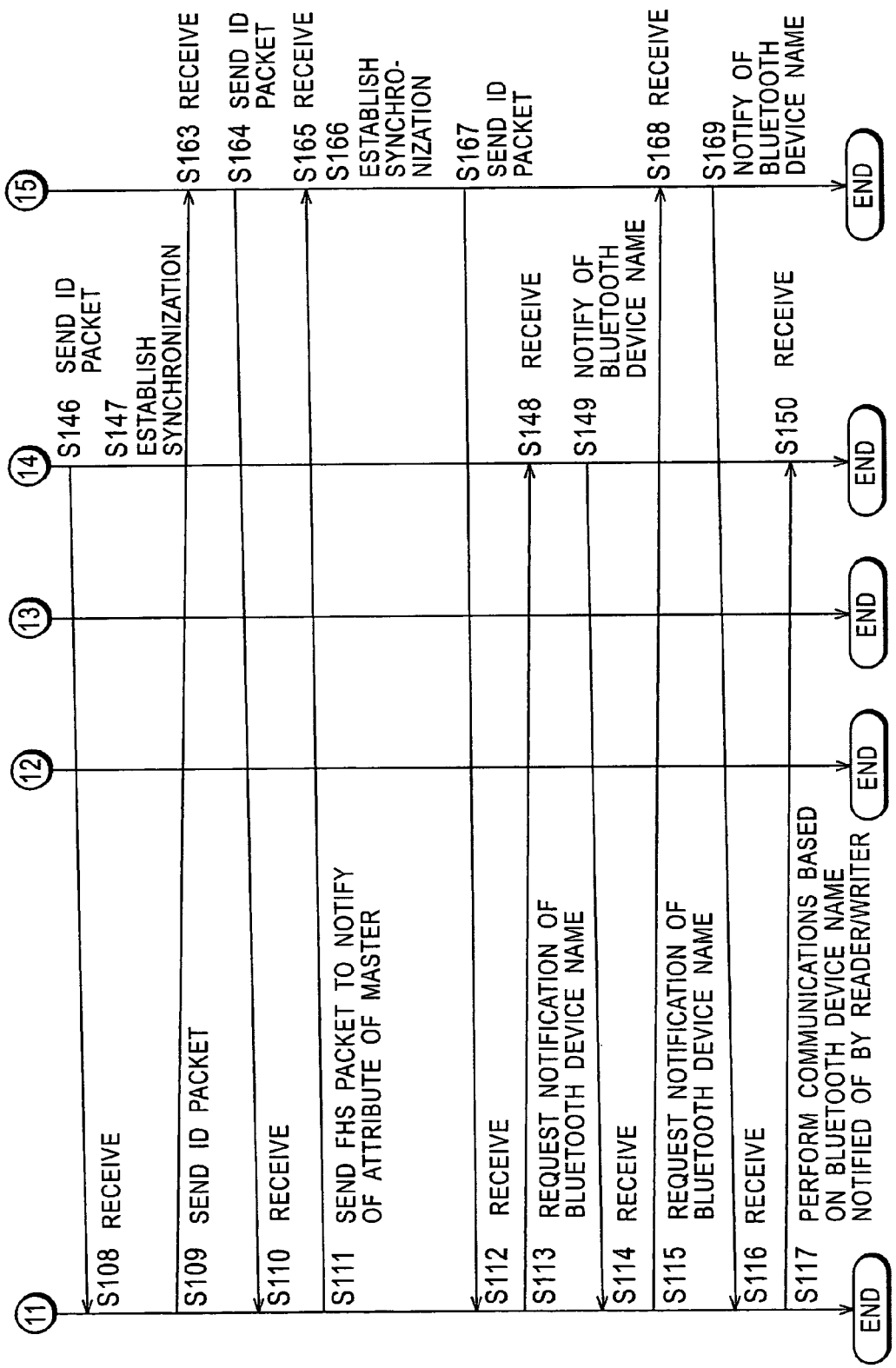

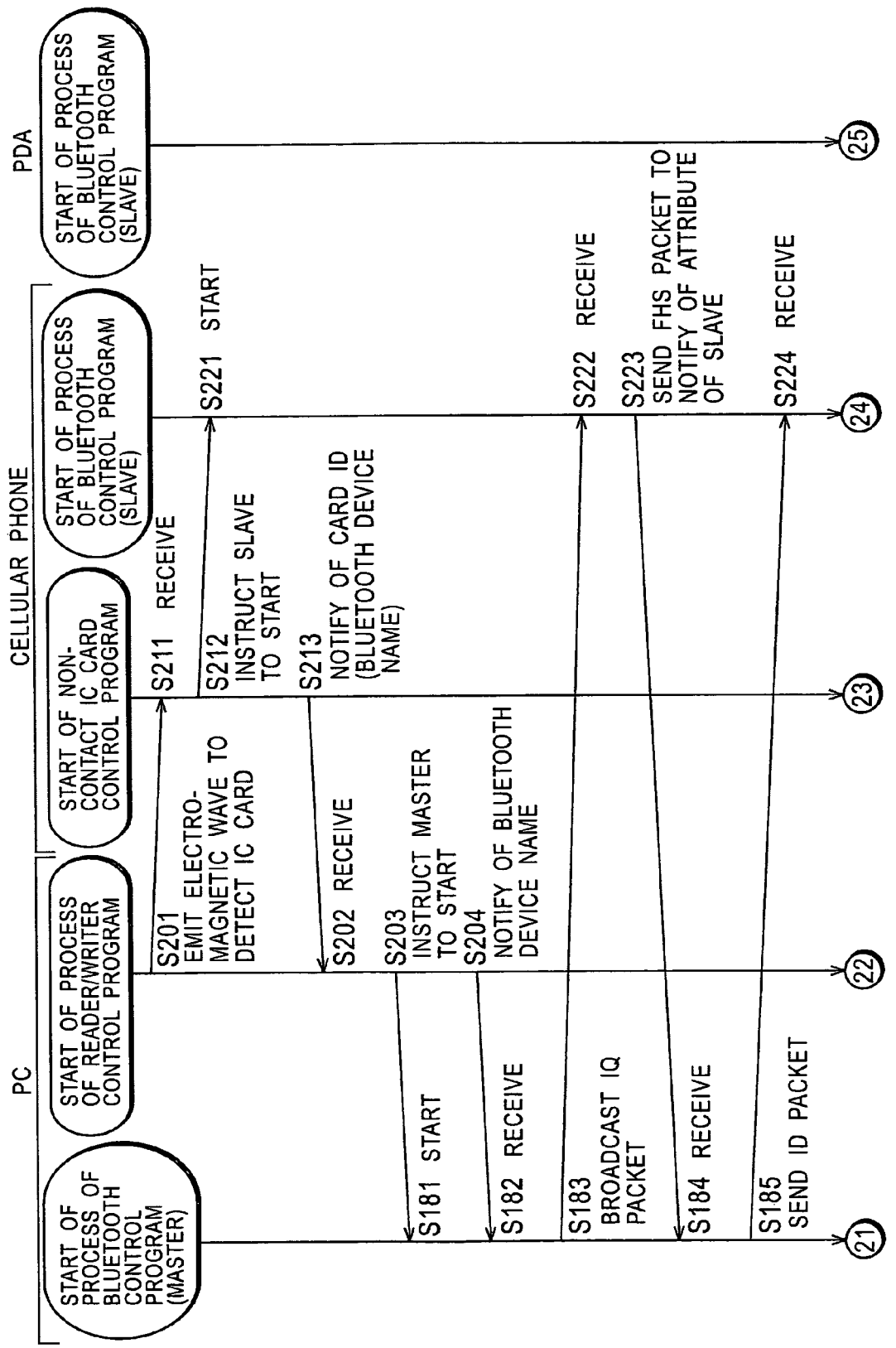

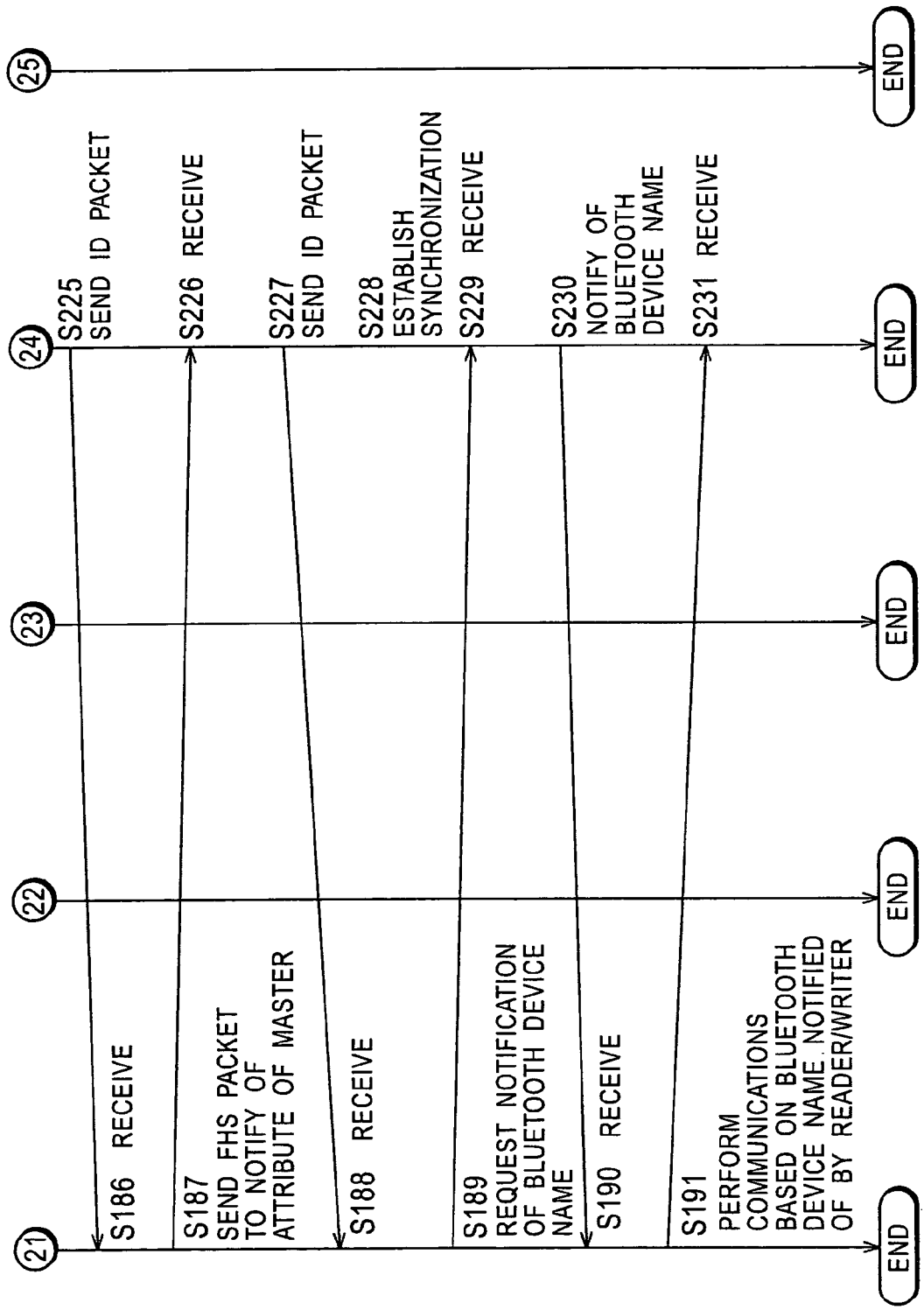

COMMUNICATION SYSTEM AND METHOD

TECHNICAL FIELD

The present invention relates to a communication system and a communication method for starting communication in a simple and quick manner by identifying a communication partner, in particular, in a Bluetooth communication.

BACKGROUND ART

Bluetooth® commands attention as wireless short-range communication means and a variety of Bluetooth devices are developed and commercially available.

Bluetooth is a wireless communication standard standardized by Bluetooth SIG (Special Interest Group), and a Bluetooth device communicates with another device having a Bluetooth module using a 2.4 GHZ band (IMS (Industrial Science Medical)).

A network formed using Bluetooth is referred to as a piconet or is referred to as a scatternet including a plurality of interconnected piconets depending on configuration. Bluetooth devices, functioning as a master role and a slave role, are contained in the network. For convenience, the Bluetooth device functioning as the master role is simply referred to as a master, and the Bluetooth device functioning as the slave role is simply referred to as a slave.

FIG. 1 illustrates the concept of the piconet and the scatternet.

As shown, the piconet includes a single master, and one or a plurality of slaves perform communications under the control of the master. In this example, a piconet 1 includes a master 1, a slave 1-1, and a slave 1-2. A piconet 2 includes a master 2 and a slave 2-1.

A scatternet is formed of the piconet 1 and the piconet 2 interconnected to each other. As shown in FIG. 1, a communication link between the piconet 1 and the piconet 2 is disabled.

To transmit and receive various information in the piconet, all Bluetooth devices in the piconet must be synchronized in frequency axis and time axis.

The synchronization in the frequency axis and the synchronization in the time axis are now discussed.

In Bluetooth, a signal is sent from the master to the slave using a frequency width of 79 MHZ. The master sends the signal by randomly changing (hopping) the transmission frequency of information by a frequency width of 1 MHz rather than concurrently occupying the frequency width of 79 MHz.

The receiving slave synchronizes with the randomly changing transmission frequency of the master, thereby appropriately changing the reception frequency thereof to receive the information sent from the master.

A pattern of changing frequencies of the master and the slave is called a frequency hopping pattern, and a state in which the frequency hopping pattern is commonly shared by the master and the slave is defined as a frequency axis synchronization established state.

To allow the master to communicate with a plurality of slaves in a Bluetooth system, a communication path (channel) between the master and the slaves is time-division multiplexed by a unit of 625 µs. A time duration of 625 µs is called a time slot. A state in which the time slot is commonly shared is defined as a time axis synchronization established state.

As will be discussed more detail later, all slaves calculate a frequency hopping pattern to establish the synchronization in the frequency axis based on a Bluetooth address of the master, adds an offset to a Bluetooth clock managed by own slave in accordance with a Bluetooth clock of the master, and sets the timing of the time slot to establish the synchronization in the time axis.

Each Bluetooth device has a 48 bit Bluetooth address unique thereto, and based on the Bluetooth address, a hopping pattern is uniquely calculated. All Bluetooth devices manage their own Bluetooth clocks.

Before forming the piconet, the master and the slave exchange a variety of information including the Bluetooth address, and the Bluetooth clock to establish the frequency axis synchronization and the time axis synchronization.

The process of a conventional Bluetooth device to establish the frequency axis synchronization and the time axis synchronization and to form a piconet is discussed below with reference to flowcharts shown in FIGS. 2 and 3.

In the process to be discussed below, the master 1, the slave 1-1, and the slave 1-2 shown in FIG. 1 are synchronized, and the piconet 1 is configured. Packets, etc. exchanged therebetween will be discussed later, and a general flow of the process is discussed here.

In step S1, the master 1 broadcasts an IQ (Inquiry) packet to detect slaves present surrounding the master.

For example, if the slave 1-1 and the slave 1-2 are present in the master 1 as shown in FIG. 1, the slave 1-1 receives the IQ packet sent from the master 1 in step S31. In step S32, the slave 1-1 replies to the master with a packet (FHS packet) indicating own attribute information.

Similarly, the slave 1-2 receives the IQ packet in step S51, and replies to the master with the FHS packet thereof in step S52.

The FHS packet sent from the slave to the master contains, as the attribute information of the slave, the Bluetooth address and the Bluetooth clock of the slave.

The master 1 receives the FHS packet from the slave 1-1 in step S2, and receives the FHS packet from the slave 1-2 in step S3.

An "Inquiry" refers to a series of steps of the master including broadcasting the IQ packet and receiving the FHS packet sent in response, and a series of steps of the slave including receiving the sent IQ packet, and sending the FHS packet in response.

In step S4, the master 1 sends, to the slave 1-1, an ID packet generated based on the FHS packet received in step S2.

The slave 1-1 receives the ID packet in step S33. In step S34, the slave 1-1 sends the same ID packet as the one received to notify the master that the transmission and the reception of packets are enabled.

Upon receiving the ID packet sent from the slave 1-1 in step S5, the master 1 proceeds to step S6. The master 1 sends the FHS packet to the slave 1-1, and notifies the slave 1-1 of the Bluetooth address and the Bluetooth clock as own attribute information.

In step S35, the slave 1-1 receives the FHS packet from the master 1, and the Bluetooth addresses and the Bluetooth clocks required to establish intra-piconet synchronization are now exchanged between the master 1 and the slave 1-1.

In step S36, the slave 1-1 sends the ID packet to the master 1, and acknowledges that the FHS packet has been received.

In step S37, the slave 1-1 establishes synchronization with the master 1 based on the Bluetooth address and the Bluetooth clock notified of by the master 1. The process of the slave to establish synchronization based on the information notified of by the master will be discussed in detail later.

Upon receiving the notification from the slave 1-1 in step S7, the master 1 proceeds to step S8. In succession to exchanging the FHS packet and the ID packet with the slave 1-1, the master 1 exchanges these pieces of information with the slave 1-2. In other words, process steps of the master 1 in steps S8 through step S11, and process steps of the slave 1-2 in steps S53 through S57 are respectively identical to process steps in steps S4 through S7, and process steps in steps S33 through S37.

More specifically, the master 1 sends the ID packet to the slave 1-2 in step S8. In response, the slave 1-2 sends the ID packet to acknowledge the reception of the ID packet. In step S10, the master 1 sends the FHS packet to the slave 1-2 to notify the slave 1-2 of own attribute information.

In step S55, the slave 1-2 receives the FHS packet from the master 1. In step S56, the slave 1-2 sends the ID packet to the master 1. In step S57, the slave 1-2 establishes synchronization with the master 1 based on the Bluetooth address and the Bluetooth clock sent from the master 1.

A series of process steps from the "inquiry" to the establishment of synchronization is referred to as "page".

In step S12, the master 1 requests the slave 1-1 to notify of the Bluetooth device name. Each Bluetooth device has its own Bluetooth device name set therefor, and the modification of the Bluetooth device name is up to a user.

The Bluetooth device name is used for the user to operate the master to select a communication partner (slave), for example. If the communication partner is selected based on the Bluetooth address, the user must make a mental note of addresses of all Bluetooth devices present in the piconet. The Bluetooth address is a number represented by 48 bits.

Upon receiving the request from the master 1 in step S38, the slave 1-1 proceeds to step S39. The slave 1-1 notifies the master 1 of the set Bluetooth device name.

In step S13, the master 1 receives the Bluetooth device name notified of by the slave 1-1.

In step S14, the master 1 also requests the slave 1-2 to notify of the Bluetooth device name.

The slave 1-2, which has received the request in step S58, notifies the master 1 of the set Bluetooth device name in step S59.

Upon receiving the notification from the slave 1-2 in step S15, the master 1 displays a selection screen for selecting a slave to communicate on a display thereof in step S16. Presented on the selection screen are the Bluetooth device names acquired in steps S13 and S15. Viewing the selection screen, the user may select the slave to communicate with later.

FIG. 4 illustrates the selection screen presented on the Bluetooth device (master) provided subsequent to the establishment of synchronization.

As shown, a selection window 1 appears. A master screen 11 displaying information of the master operated by the user is presented on the left-hand side of the selection window.

The master screen 11 includes a device name screen partition 11A and an address screen partition 11B. The Bluetooth device name of the master is displayed on the device name screen partition 11A, and the Bluetooth device address is displayed on the address-screen partition 11B.

More in detail, a category of the Bluetooth device of the master is displayed on the upper row of the device name screen partition 11A, while the Bluetooth device name modifiable to the user's preference is displayed on the lower row of the device name screen partition 11A. In this example, the category is "(personal) computer", and the device name is "Red's computer".

Profile selection buttons 12 are arranged in a vertical column at the approximate center of the selection window 1. The user selects the profile for the slave. The profile defines a communication system of the slave. As shown in FIG. 4, eight profile selection buttons 12 appear.

Displayed on the right portion of the selection window 1 are slave screen partitions 13 through 19. Like in the master screen 11, each slave screen partition includes a device name screen partition and an address screen partition.

In the example shown in FIG. 4, communications are going on between the slave screen partition 16 and the master. The category of the Bluetooth device displayed on the slave screen partition 16 is "cellular phone", and the Bluetooth device name displayed on the slave screen partition 16 is "red cellular phone".

FIG. 5 illustrates another example of the selection screen displayed on the Bluetooth device subsequent to the establishment of synchronization.

A selection window 31 presents a profile on the left-hand portion thereof, and a Bluetooth device name of the slave with a blank arrow mark interposed therebetween. For example, the master performs Bluetooth communications at the profile for transferring a music file to a slave (a black player) displayed on a first row of the selection window 31.

The piconet is thus established. To start communications, communicable Bluetooth devices are listed as shown in FIGS. 4 and 5. The user then must select a communication partner.

After selecting the communication partner, the user must further select the profile in accordance with the device of the communication partner.

A system using Bluetooth communication has been proposed in which a charge for a commodity purchased from a vending machine is paid using a cellular phone having a Bluetooth module. In such a system, the user may be expected to select the communication partner to greater or lesser degrees.

The purchasing procedure using the system in the vending machine may become complicated in comparison with the purchasing procedure using banknotes.

DISCLOSURE OF INVENTION

The present invention has been developed in view of the above problems, and allows communications to start easily and quickly by identifying a terminal of a communication partner when Bluetooth communications are performed.

An information processing apparatus of a communication system of the present invention includes first acquisition processing means for acquiring identification information of the communication terminal close thereto using a first wireless communication unit that sends power to and transmits data to and receives data from the communication terminal close thereto through a loop antenna, first synchronization processing means for establishing synchronization for wireless communication with the plurality of communication terminals including the communication terminal close thereto using a second wireless communication unit, second acquisition processing means for acquiring terminal name information from the plurality of communication terminals with which synchronization is established by the first synchronization processing means, using the second wireless communication unit, and identification processing means for identifying a communication partner using the identification information acquired by the first acquisition processing means, and the terminal name information acquired by the second acquisition processing means.

A communication terminal of the communication system includes first providing processing means for providing identification information of own terminal to the information processing apparatus using a third wireless communication unit that transmits and receives data using at least a portion of power induced through an loop antenna, second synchronization processing means for establishing synchronization by transmitting and receiving predetermined signals through a fourth wireless communication unit in response to a request from the information processing apparatus when the synchronization of wireless communication is established using the second wireless communication unit, and second providing processing means for providing terminal name of own terminal, using the fourth wireless communication unit transmitting and receiving data, in response to a request from the information processing apparatus transmitted through the second wireless communication unit.

An information processing method for the information processing apparatus, constituting a communication method of the present invention, includes a first acquisition processing step for acquiring identification information of the communication terminal close thereto using a first wireless communication unit that sends power to and transmits data to and receives data from the communication terminal close thereto through a loop antenna, a first synchronization processing step for establishing synchronization for wireless communication with the plurality of communication terminals including the communication terminal close thereto using a second wireless communication unit, a second acquisition processing step for acquiring terminal name information from the plurality of communication terminals with which synchronization is established in the first synchronization processing step, using the second wireless communication unit, and an identification processing step for identifying a communication partner using the identification information acquired in the first acquisition processing step, and the terminal name information acquired in the second acquisition processing step.

A communication method for the communication terminal, constituting the communication method of the present invention, includes a first providing processing step for providing identification information of own terminal to the information processing apparatus using a third wireless communication unit that transmits and receives data using at least a portion of power induced through an loop antenna, a second synchronization processing step for establishing synchronization by transmitting and receiving predetermined signals through a fourth wireless communication unit in response to a request from the information processing apparatus when the synchronization of wireless communication is established using the second wireless communication unit, and a second providing processing step for providing terminal name information of own terminal, using the fourth wireless communication unit transmitting and receiving data, in response to a request from the information processing apparatus transmitted through the second wireless communication unit.

An information processing apparatus of the present invention includes first acquisition processing means for acquiring identification information of a communication terminal using a first wireless communication unit that transmits and receives predetermined data, synchronization processing means for establishing synchronization for wireless communication with a plurality of communication terminals including the communication terminal using a second wireless communication unit that transmits and receives desired data, second acquisition processing means for acquiring terminal name information from the plurality of communication terminals with which synchronization is established by the synchronization processing means, using the second wireless communication unit, and identification processing means for identifying a communication partner using the identification information acquired by the first acquisition processing means, and the terminal name information acquired by the second acquisition processing means.

The wireless communication coverage distance of the first wireless communication unit may be shorter than the wireless communication coverage distance of the second wireless communication unit.

The first acquisition processing means may acquire the identification information of the communication terminal close thereto using the first wireless communication unit that sends power to and transmits data to and receives data from the communication terminal close thereto through a loop antenna.

Each of the identification information and the terminal name information may contain a Bluetooth device name.

Each of the identification information and the terminal name information may contain an IP address unique to the communication terminal.

The information processing apparatus may further include start-up processing means for starting the second wireless communication unit in response to the acquisition of the identification information by the first acquisition processing means.

An information processing method for the information processing apparatus of the present invention includes a first acquisition processing step for acquiring identification information of a communication terminal using a first wireless communication unit that transmits and receives predetermined data, a synchronization processing step for establishing synchronization for wireless communication with a plurality of communication terminals including the communication terminal using a second wireless communication unit that transmits and receives desired data, a second acquisition processing step for acquiring terminal name information from the plurality of communication terminals with which synchronization is established in the synchronization processing step, using the second wireless communication unit, and an identification processing step for identifying a communication partner using the identification information acquired in the first acquisition processing step, and the terminal name information acquired in the second acquisition processing step.

The identification information may contain a Bluetooth device name, and the first acquisition processing step may include acquiring the identification information of the communication terminal close thereto using the first wireless communication unit that sends power to and transmits data to and receives data from the communication terminal close thereto through a loop antenna.

A communication terminal of the present invention includes first providing processing means for providing identification information of own terminal in response to a predetermined request from an information processing apparatus using a first wireless communication unit that transmits and receives predetermined data, synchronization processing means for establishing synchronization with the information processing apparatus by transmitting and receiving predetermined signals through a second wireless communication unit that transmits and receives desired data, and second providing processing means for providing terminal name information of own terminal using the second wireless communication unit in response to a request from the information processing apparatus received through the second wireless communication unit.

The wireless communication coverage distance of the first wireless communication unit may be shorter than the wireless communication coverage distance of the second wireless communication unit.

The first providing processing means may provide the identification information of own terminal to the information processing apparatus using the first wireless communication unit that transmits and receives data using at least a portion of power induced through a loop antenna.

Each of the identification information and the terminal name information may contain at least a Bluetooth device name.

Each of the identification information and the terminal name information may contain an IP address unique to the communication terminal.

A communication method for the communication terminal of the present invention includes a first providing processing step for providing identification information of own terminal in response to a predetermined request from an information processing apparatus using a first wireless communication unit that transmits and receives predetermined data, a synchronization processing step for establishing synchronization with the information processing apparatus by transmitting and receiving predetermined signals through a second wireless communication unit that transmits and receives desired data, and a second providing processing step for providing terminal name information of own terminal using the second wireless communication unit in response to a request from the information processing apparatus received through the second wireless communication unit.

Each of the identification information and the terminal name information may contain at least a Bluetooth device name, and the first providing processing step may include providing identification information of own terminal to the information processing apparatus using the first wireless communication unit that transmits and receives data using a portion of power induced through a loop antenna.

A first expansion device of the present invention includes a connection terminal, electrically connected to the information processing apparatus, for transmitting and receiving data, first acquisition processing means for acquiring identification information of a communication terminal close thereto using a first wireless communication unit that sends power to and transmits data to and receives data from the communication terminal close thereto through a loop antenna, synchronization processing means for establishing synchronization for wireless communication with a plurality of communication terminals including the communication terminal close thereto using a second wireless communication unit, second acquisition processing means for acquiring terminal name information from the plurality of communication terminals with which synchronization is established by the synchronization processing means, using the second wireless communication unit, an identification processing means for identifying a communication partner using the identification information acquired by the first acquisition processing means, and the terminal name information acquired from the plurality of communication terminals.

A second expansion device of the present invention includes a connection terminal, electrically connected to the communication terminal, for transmitting and receiving data, first providing processing means for providing identification information of own terminal in response to a request from an information processing apparatus using a first wireless communication unit that transmits and receives data using at least a portion of power induced through an loop antenna, synchronization processing means for establishing synchronization with the information processing apparatus by transmitting and receiving predetermined signals through a second wireless communication unit that transmits and receives desired data, and second providing processing means for providing terminal name information of own terminal using the second wireless communication unit in response to a request from the information processing apparatus received through the second wireless communication unit.

A first program of the present invention causes an image processing apparatus to perform a first acquisition processing step for acquiring identification information of a communication terminal using a first wireless communication unit that transmits and receives predetermined data, a synchronization processing step for establishing synchronization for wireless communication with a plurality of communication terminals including the communication terminal using a second wireless communication unit that transmits and receives desired data, a second acquisition processing step for acquiring terminal name information from the plurality of communication terminals with which synchronization is established in the synchronization processing step, using the second wireless communication unit, and an identification processing step for identifying a communication partner using the identification information acquired in the first acquisition processing step, and the terminal name information acquired in the second acquisition processing step.

A second program of the present invention causes a communication terminal to perform a first providing processing step for providing identification information of own terminal in response to a predetermined request from an information processing apparatus using a first wireless communication unit that transmits and receives predetermined data, a synchronization processing step for establishing synchronization with the information processing apparatus by transmitting and receiving predetermined signals through a second wireless communication unit that transmits and receives desired data, and a second providing processing step for providing terminal name information of own terminal using the second wireless communication unit in response to a request from the information processing apparatus received through the second wireless communication unit.

In the communication system and the communication method of the present invention, the identification information of the communication terminal is acquired using the first wireless communication unit that sends power to and transmits data to and receives data from the communication terminal close thereto through the loop antenna, the synchronization for wireless communication with the plurality of communication terminals including the communication terminal close thereto is established using the second wireless communication unit, and the terminal name information is acquired from the plurality of communication terminals with which synchronization is established, using the second wireless communication unit. The communication partner is identified using the acquired identification information and the acquired terminal name information. The identification information of own terminal is provided to the information processing apparatus using the third wireless communication unit that transmits and receives data using at least the portion of power induced through the loop antenna, synchronization is established by transmitting and receiving the predetermined signals through the fourth wireless communication unit in response to the request from the information processing apparatus when the synchronization of wireless communication is established using the second wireless communication unit, and the terminal name information of own terminal is provided, using the fourth wireless communication unit transmitting and receiving data, in response to the request from the information processing apparatus transmitted through the second wireless communication unit.

In the information processing apparatus, the information processing method, and the program of the present invention, the identification information of the communication terminal is acquired using the first wireless communication unit that transmits and receives predetermined data, the synchronization for wireless communication with the plurality of communication terminals including the communication terminal is established using the second wireless communication unit that transmits and receives desired data, and the terminal name information is acquired from the plurality of communication terminals with which synchronization is established, using the second wireless communication unit. The communication partner is identified using the acquired identification information, and the acquired terminal name information.

In the communication terminal, the communication method, and the program of the present invention, the identification information of own terminal is provided in response to the predetermined request from the information processing apparatus using the first wireless communication unit that transmits and receives predetermined data, the synchronization with the information processing apparatus is established by transmitting and receiving predetermined signals through the second wireless communication unit that transmits and receives desired data, and the terminal name information of own terminal is provided using the second wireless communication unit in response to the request from the information processing apparatus received through the second wireless communication unit.

In the first expansion device of the present invention, the connection terminal is electrically connected to the information processing apparatus, the identification information of the communication terminal close thereto is acquired using the first wireless communication unit that sends power to and transmits data to and receives data from the communication terminal close thereto through the loop antenna, and the synchronization for wireless communication with the plurality of communication terminals including the communication terminal close thereto is established using a second wireless communication unit. The terminal name information is acquired from the plurality of communication terminals with which synchronization is established, using the second wireless communication unit, and the communication partner is identified using the acquired identification information and the acquired terminal name information.

In the second expansion device of the present invention, the connection terminal is electrically connected to the communication terminal, the identification information of own terminal is provided in response to the request from an information processing apparatus using the first wireless communication unit that transmits and receives data using at least the portion of power induced through the loop antenna, the synchronization with the information processing apparatus is established by transmitting and receiving predetermined signals through the second wireless communication unit that transmits and receives desired data, and the terminal name information of own terminal is produced using the second wireless communication unit in response to the request from the information processing apparatus received through the second wireless communication unit.

BRIEF DESCRIPTION OF THE DRAWINGS

FIG. 18 illustrates specifications of the non-contact IC card of FIG. 17.

FIG. 20 is a flowchart illustrating a process of the communication system of FIG. 6.

FIG. 21 is a continuation of the flowchart of FIG. 20, illustrating the process of the communication system of FIG. 6.

FIG. 22 is a flowchart illustrating another process of the communication system of FIG. 6.

FIG. 23 is a continuation of the flowchart of FIG. 22, illustrating the other process of the communication system of FIG. 6.

BEST MODE FOR CARRYING OUT THE INVENTION

Figure 6:
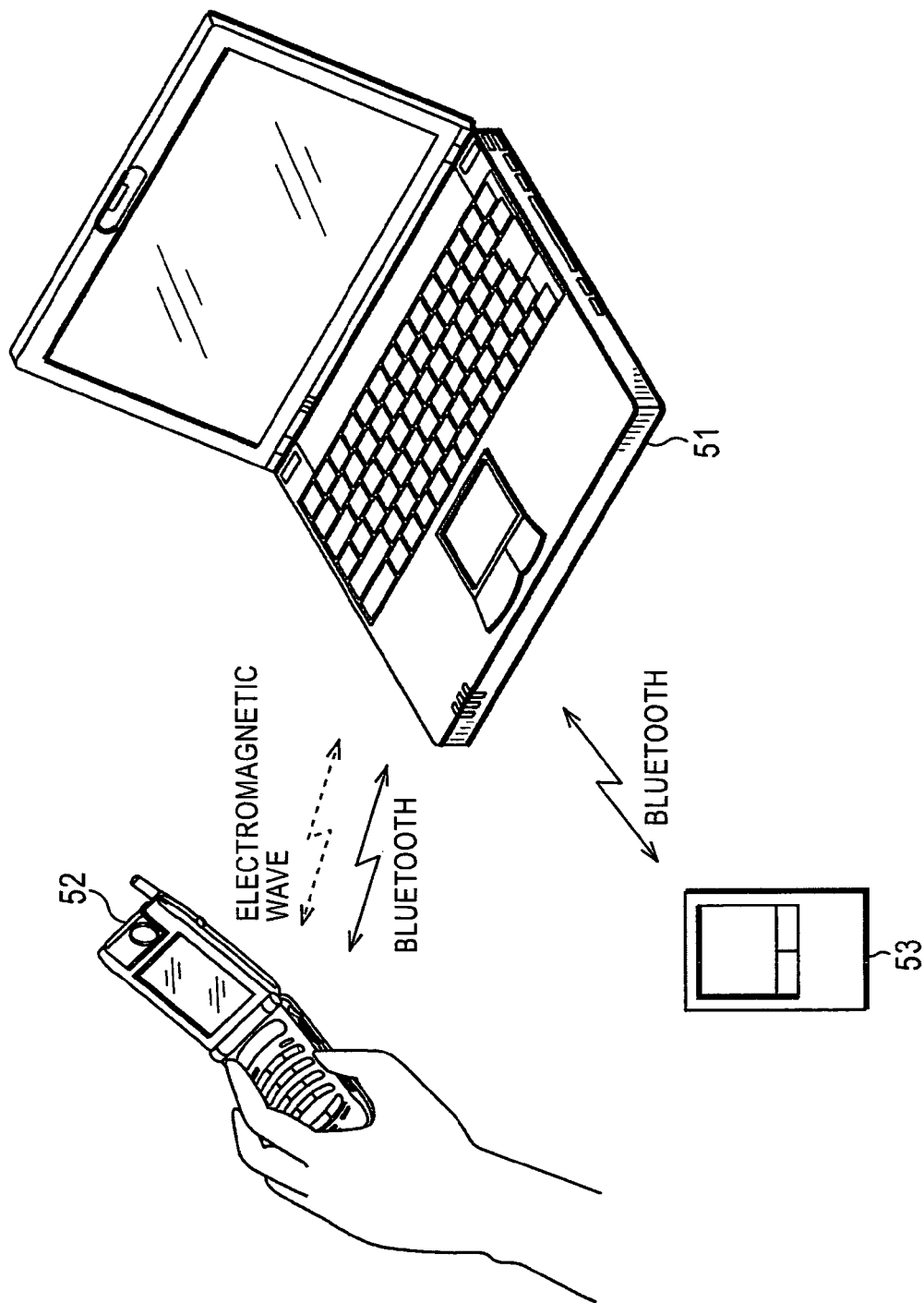
FIG. 6 illustrates a configuration of a communication system implementing the present invention.

FIG. 6 illustrates the structure of a communication system implementing the present invention.

In the communication system illustrated in FIG. 6, a personal computer 51, a cellular phone 52, and a PDA (Personal Digital Assistants) 53, each containing a Bluetooth module, transmit and receive a variety of information in short-range wireless Bluetooth communications.

The cellular phone 52 has a built-in non-contact IC card (IC tag) 246 (see FIG. 16), and the personal computer 51 includes a non-contact IC card reader/writer 105 (see FIG. 11) that writes various information to and read various information from the non-contact IC card 246. Not only Bluetooth communications but also communication using an electromagnetic wave emitted from the non-contact IC card reader/writer 105 are performed between the personal computer 51 and the cellular phone 52.

If the personal computer 51 is a master in a piconet in the communication system implementing the present invention, the personal computer 51 identifies the cellular phone 52 as a slave that performs Bluetooth communications, based on information acquired from the cellular phone 52 through the electromagnetic wave.

The process of the communication system will be discussed more in detail with reference to flowcharts later. When a user locates the cellular phone 52 close to the personal computer 51, and receives the electromagnetic wave emitted from the non-contact IC card reader/writer 105 in the personal computer 51, the non-contact IC card 246 built in the cellular phone 52 provides the personal computer 51 with set identification information (hereinafter referred to as a card ID).

The card ID is the same information as (information relating to) Bluetooth device name set in each cellular phone, for example. When the personal computer 51 establishes intra-piconet synchronization, and acquires the Bluetooth device name, the personal computer 51 identifies the cellular phone 52, having the Bluetooth device name identical to the card ID, as the communication partner.

In this process, the user of the cellular phone 52 starts Bluetooth communications by simply locating the cellular phone 52 close to the personal computer 51 as shown without the need for selecting the communication partner on the above-referenced selection screen.

To send predetermined data from the PDA 53 to the personal computer 51, the user must select the personal computer 51 as a communication partner device on the above-referenced screen. To send data from the cellular phone 52 to the personal computer 51, no such an inconvenient process is required.

The elements of the communication system of FIG. 6 will now be discussed.

Figure 7:
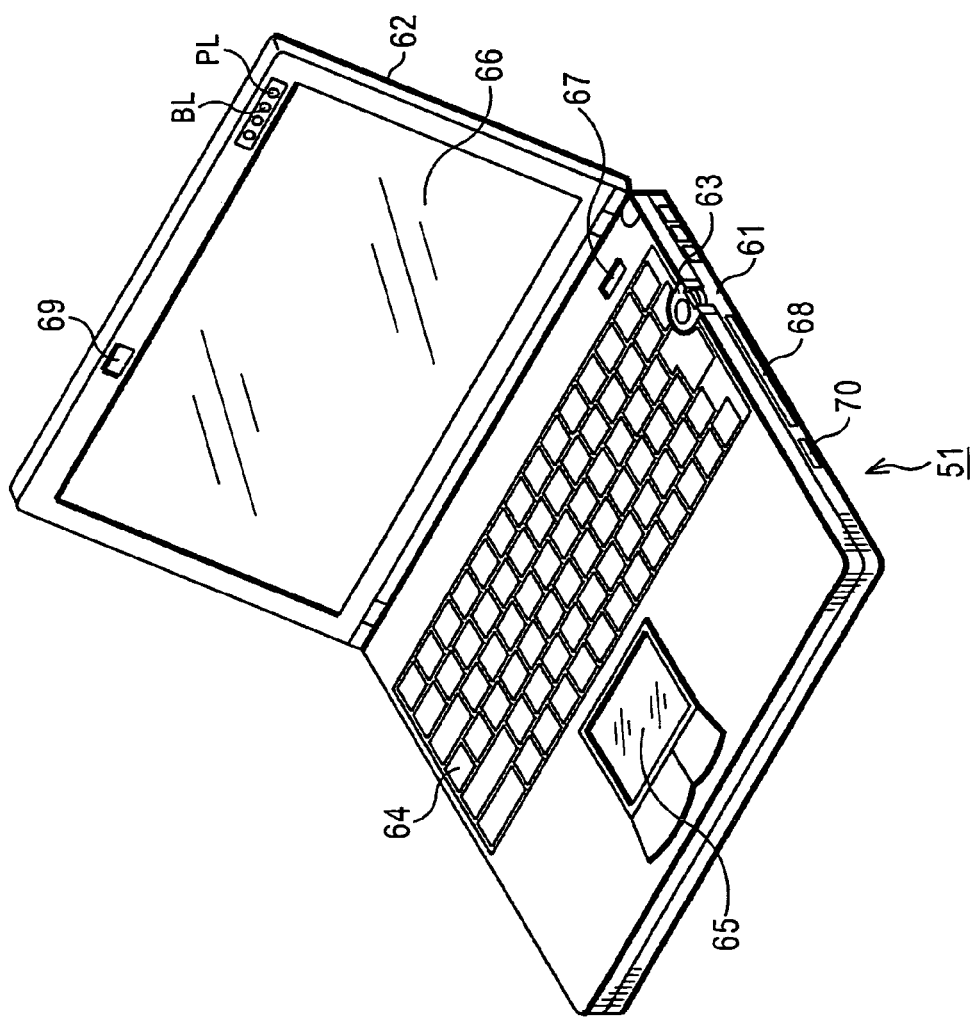
FIG. 7 is an external view of a personal computer of FIG. 6.
Figure 8:
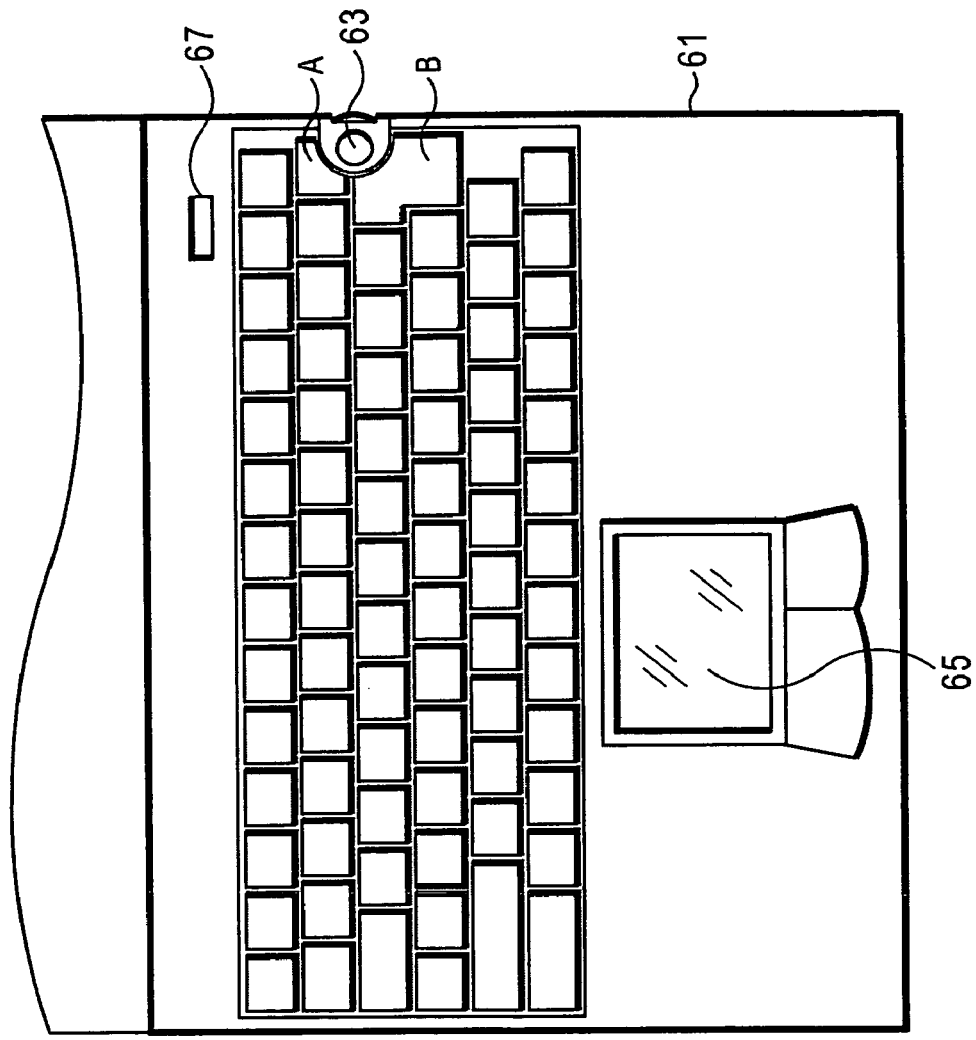
FIG. 8 is another external view of the personal computer of FIG. 6.
Figure 9:
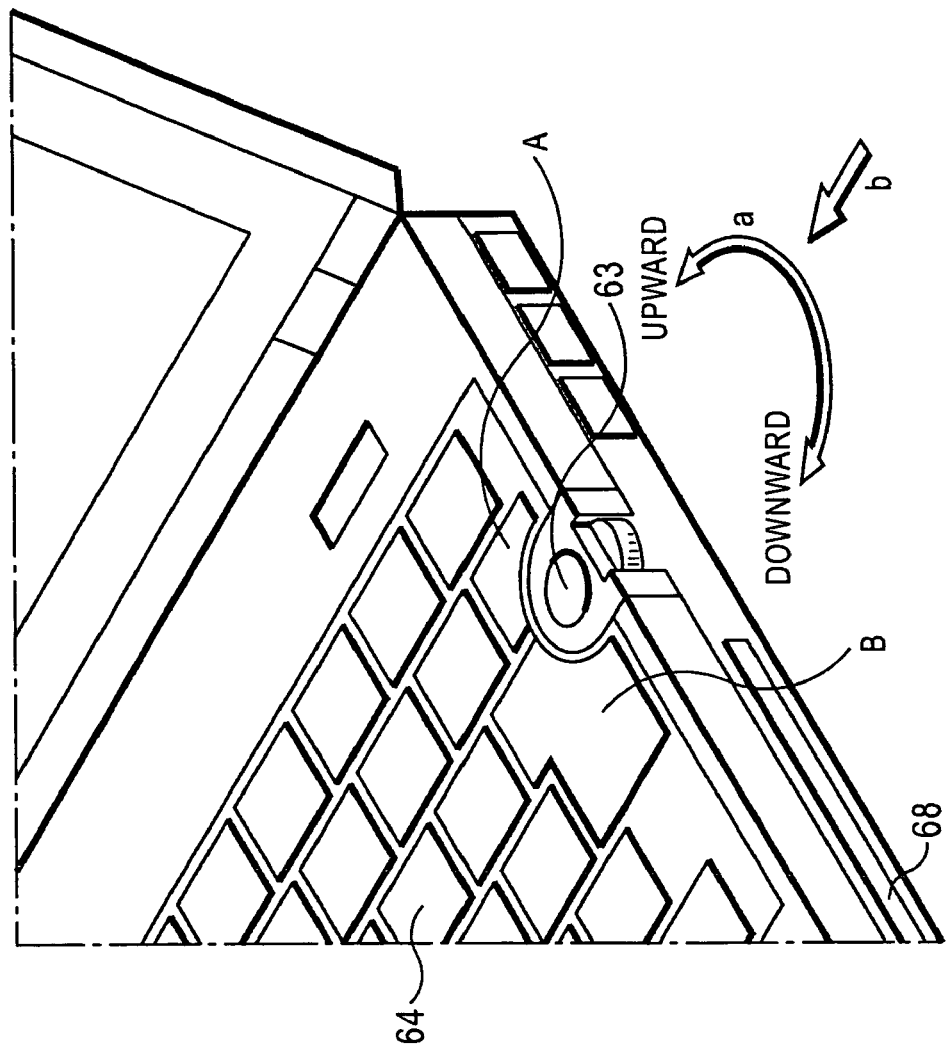
FIG. 9 is a further external view of the personal computer of FIG. 6.
Figure 10:
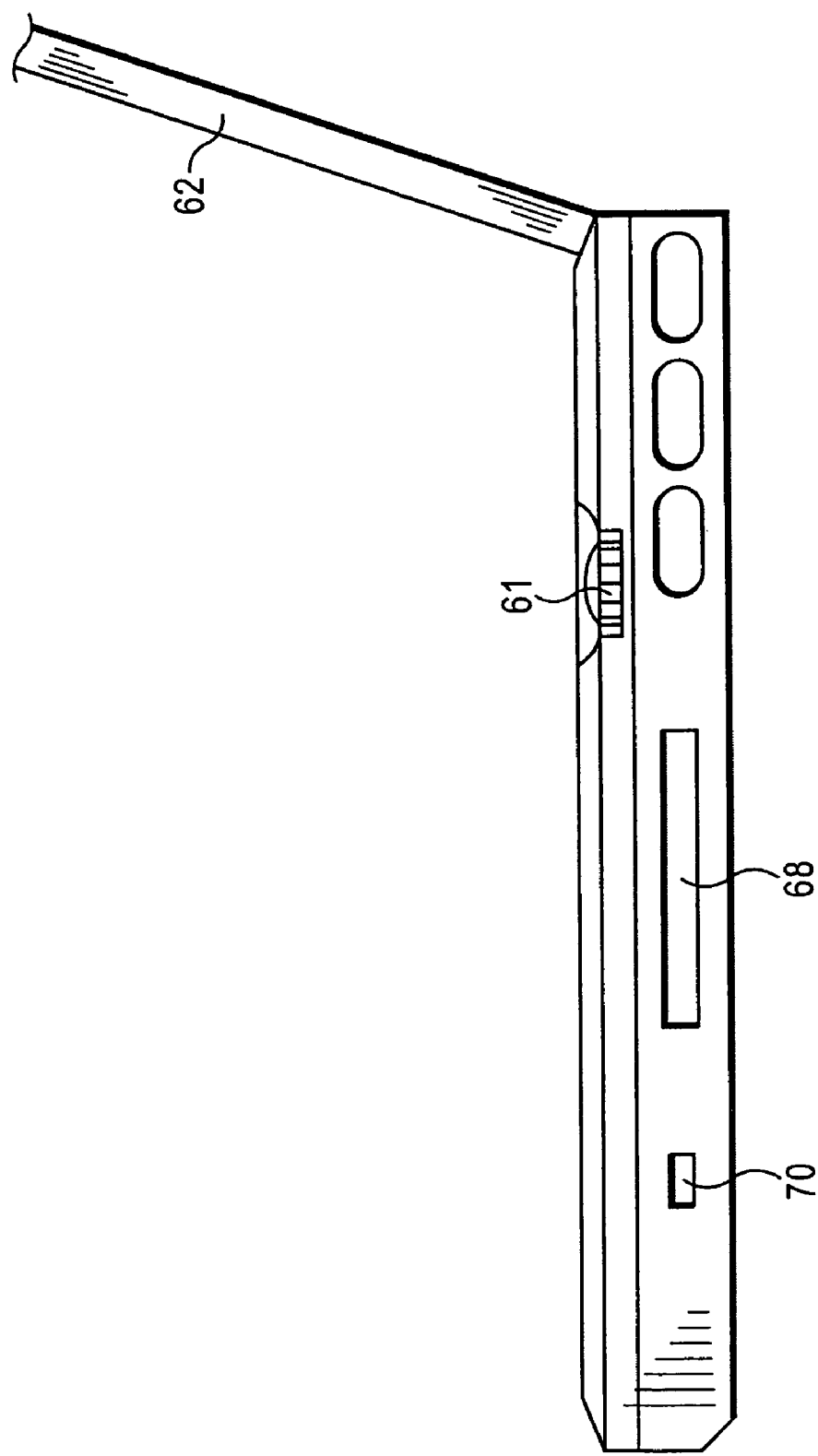
FIG. 10 is a side view of the personal computer of FIG. 6.

FIG. 7 through FIG. 10 are external views of the personal computer 51 of FIG. 6. The notebook personal computer 51 includes, as major elements, a device body 61 and a display 62 which is foldably connected to the device body 61. FIG. 7 is an external perspective view of the personal computer 51 with the display 62 opened from the device body 61. FIG. 8 is a plan view of the device body 61, and FIG. 9 is an enlarged view of a jogdial 63 installed on the device body 61 and the surrounding area thereof. FIG. 10 is a side view of the jogdial 63 of the device body 61.

The device body 61 includes, on the top side thereof, a keyboard 64 for entering a variety of characters and symbols, a touchpad 65 as a pointing device for moving a pointer (a mouse cursor), and a power switch 67, and on the side thereof, the jogdial 63, a slot 68, an IEEE1394 port 70, etc. Instead of the touchpad 65, a stick-type pointing device may be mounted.

An LCD (Liquid Crystal Display) 66 for displaying an image is mounted on the front of the display 62. Arranged on the top right area are a power lamp PL, and a battery lamp BL, and a message lamp ML and other lamps as necessary. The power lamp PL, the battery lam BL, the message lamp ML, etc. may be arranged on the lower portion of the display 62.

The jogdial 63 is arranged between keys of the keyboard 64 on the device body 61, and at the same level as the keys. The jogdial 63 performs a predetermined process in response to the direction of rotation as represented by an arrow a, while performing a predetermined process in response to a shift represented by an arrow b. The jogdial 63 may be arranged on the left-hand side of the device body 61. Alternatively, the jogdial 63 may be arranged on the left end face or the right end face of the display 62 having the LCD 66, or arranged in a vertically aligned position thereof between the G key and the H key of the keyboard 64. Alternatively, the jogdial 63 may be arranged on the front center section of the device body 61 so that the user controls the jogdial 63 with the user's thumb while the user's forefinger operating on the touchpad 65 at the same time. Alternatively, the jogdial 63 may be arranged in a horizontally aligned position thereof along the upper edge or the lower edge of the touchpad 65, or may be arranged in a vertically aligned position thereof between the right-hand button and the left-hand button of the touchpad 65. Rather than being in the vertically aligned position or in the horizontally aligned position, the jogdial 63 may be arranged in a position aligned at an angle so that the user easily operates the jogdial 63 using any finger. The jogdial 63 may be arranged on the side of the mouse as a pointing device so that the user operates the jogdial 63 using the thumb.

Figure 11:
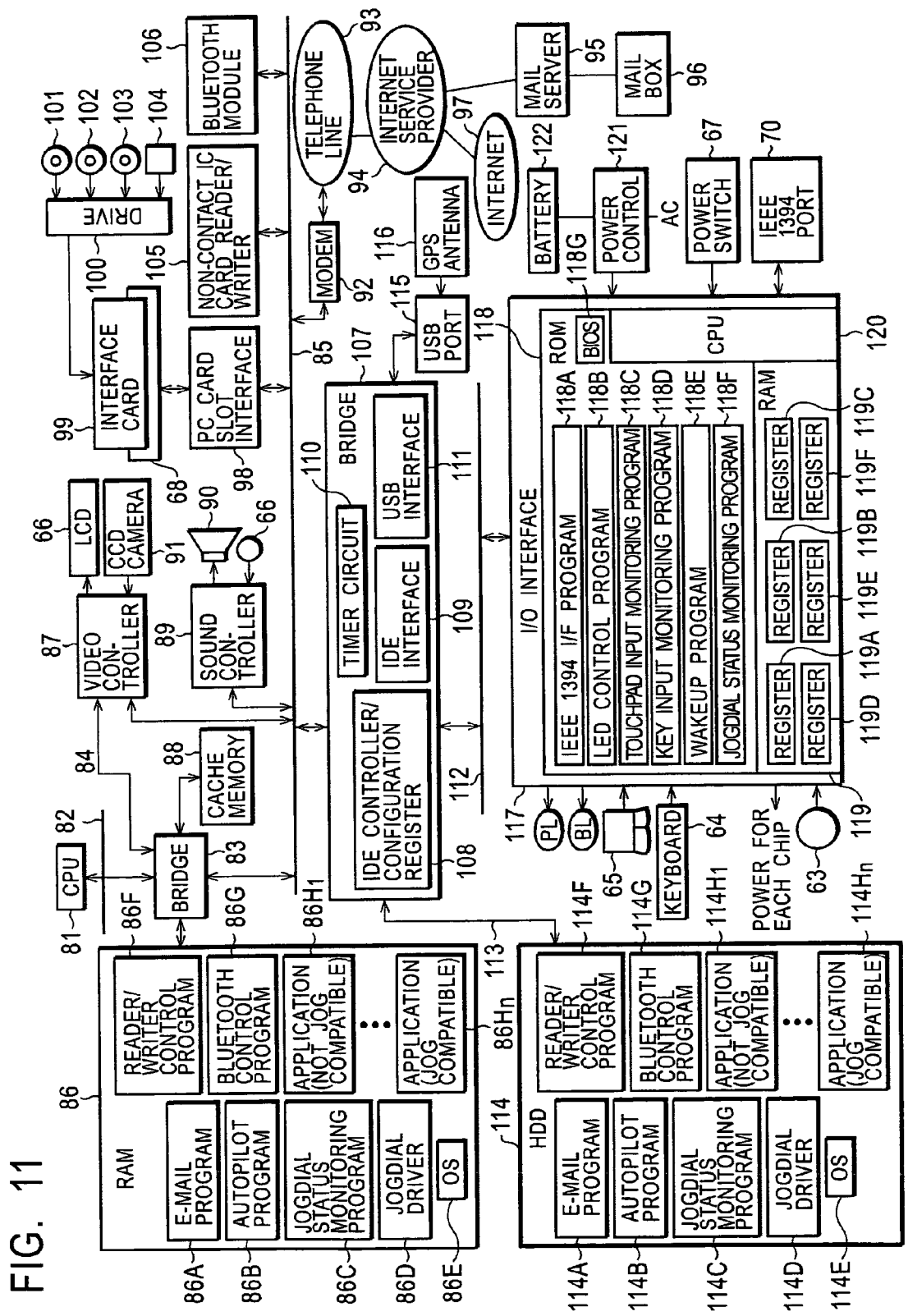
FIG. 11 is a block diagram of the personal computer of FIG. 6.

FIG. 11 is a block diagram illustrating an electrical structure of the personal computer 51.

A CPU (Central Processing Unit) 81 is a Pentium® processor of Intel, and is connected to a host bus 82. Also connected to the host bus 82 is a bridge 83, which is in turn connected to an AGP (Accelerated Graphics Port) 84 and a PCI bus 85. For example, the bridge 83 is 400BX manufactured by Intel, and controls the periphery of the CPU 81 and the RAM (Random Access Memory) 86. The bridge 83 is connected to a video controller 87 through the AGP 84. The bridge 83 and a bridge 107 constitute a so-called chip set.

The bridge 83 is further connected to the RAM 86 and a cache memory 88. The cache memory 88 caches data used by the CPU 81. The CPU 81 contains a primary cache memory therewithin, although the cache memory is not shown.

The RAM 86 is a DRAM (Dynamic Random Access Memory), and stores a program executed by the CPU 81, and data needed for the CPU 81 to operate. More specifically, an electronic mail program 86A, an autopilot program 86B, a jogdial status monitoring program 86C, a jogdial driver 86D, an operating program (OS) 86E, a reader/writer control program 86F, a Bluetooth control program 86G, and other application programs 86H1 through 86Hn are transferred from an HDD 114 to the RAM 86 for storage at the completion of booting.

The electronic mail program 84A receives a communication message from a communication line such as a telephone line 93 through a modem 92. The electronic mail program 84A has an arrival mail acquisition function as a particular function. The arrival mail acquisition function checks with a mail server 95 in a Internet service provider 94 whether a mail addressed to the personal computer 51 (the user) has arrived at a mail box 96, and acquires a mail addressed to the user if the mail has arrived.

The autopilot program 86B successively starts and performs a plurality of already set processes (or programs) in a predetermined order.

The jogdial status monitoring program 86C receives a notification of whether the application programs 86H1 through 86Hn are jogdial compatible. If the application programs 86H1 through 86Hn are jogdial compatible, the jogdial status monitoring program 86C functions to present a display of an operation to be executed by the use of the jogdial 63 using a user interface function of the application. The jogdial status monitoring program 86C usually waits for an event from the jogdial 63, and holds a list of notifications to be received from the application program. The jogdial driver 86D executes a variety of functions in response to the operation of the jogdial 63.

The OS (Operation System) 86E is an operating system controlling the basic operation of the computer, such as Windows 95®, or Windows® 98 of Micro Soft, or Mac OS® of Macintosh.

The reader/writer control program 86F controls the non-contact IC card reader/writer 105 (hereinafter also referred to as a reader/writer 105 as necessary), and detects the presence of a terminal containing the non-contact IC card 246 closely located to the personal computer 51, and transmits and receives various information to and from the terminal using the electromagnetic wave.

The Bluetooth control program 86G controls the Bluetooth module 106, thereby detecting a Bluetooth device present nearby, and establishes synchronization with the Bluetooth device for communication.

The video controller 87, connected to the PCI bus 85, is further connected to the bridge 83 through the AGP 84, and controls the display of the LCD 66 based on data supplied from the PCI bus 85 and the AGP 84.

The PCI bus 85 is connected to a sound controller 89, which is in turn connected to a loudspeaker 90 and a microphone 66. The sound controller 89 captures a sound input from the microphone 66, and supplies a sound signal to the loudspeaker 90.

Also connected to the PCI bus 85 are the modem 92 and a PC card slot interface 98.

The modem 92 may be connected to the Internet 97, the mail server 95, etc., through the telephone line 93 and the Internet service provider 94.

To add optional functions, the interface card 99 is inserted into the slot 68 connected to the PC card slot interface 98 as appropriate, thereby transmitting and receiving data to and from an external device. The interface card 99 is connected to a driver 100, and transmits and receives data to and from a magnetic disk 101, an optical disk 102, a magneto-optical disk 103, and a semiconductor memory 104, each loaded in the driver 100.

The driver 100, which exchanges data with each of the magnetic disk 101, the optical disk 102, the magneto-optical disk 103 and the semiconductor memory 105, may be connected through a USB port 115.

The bridge 107 is connected to the PCI bus 85. The bridge 107 is PIIX4E manufactured by Intel, for example, and controls various input and output signals. More specifically, the bridge 107 controls a device connected to an IDE bus 113, and containing an IDE (Integrated Drive Electronics) controller/configuration register 108, an IDE interface 109, a timer circuit 110, and a USB (Universal Serial Bus) interface 111, the device connected to the USB port 115, and a device connected through an ISA/EIO (Industry Standard Architecture/Extended Input Output) bus 112 and an I/O interface 117.

If a GPS (Global Positioning System) antenna 116 is loaded in the USB port 115, the USB interface 111 sends position data and time data supplied from the GPS antenna 116 to the CPU 81 through the PCI bus 85, the bridge 83, and the host bus 82.

The IDE controller/configuration register 108 is composed of two IDE controllers, namely, a so-called primary IDE controller and a so-called secondary IDE controller, configuration register, etc.

The primary IDE controller is connected, through the IDE bus 113, to a connector (not shown), which is in turn connected to the HDD 114. The secondary IDE controller remains connectable with an external device through another IDE bus (not shown).

The HDD 114 stores an electronic mail program 114A, an autopilot program 114B, a jogdial program status monitoring program 114C, a jogdial driver 114D, an OS (operating system software) 114E, a reader/writer control program 114F, a Bluetooth control program 114G, a plurality of other application programs 114H1 through 114Hn, and data used in these programs. At a start-up (boot-up) process, the programs 114A through 114Hn stored in the HDD 114 are successively transferred to and stored in the RAM 86.

Further connected to the ISA/EIO bus 112 is the I/O interface 117. The I/O interface 117 is interconnected to an ROM 118, an RAM 119, and a CPU 120.

The ROM 118 stores beforehand an IEEE1394 I/F program 118A, an LED control program 118B, a touchpad input monitoring program 118C, a key input monitoring program 118D, a wakeup program 118E, and a jogdial status monitoring program 118F.

The IEEE1394 I/F program 118A inputs and outputs IEEE1394 based data through the IEEE1394 input/output port 70. The LED control program 118B controls lighting of the lamps including the power lamp PL, and the battery lamp BL, and as necessary, the message lamp ML and other LED lamps. The touchpad input monitoring program 118C monitors a user input to the touchpad 65. The key input monitoring program 118D monitors a user input to the keyboard 64 or another key switch. Based on present time data supplied from the timer circuit 110 in the bridge 108, the wakeup program 118E checks to see if it is predetermined time. If it is the predetermined time, the wakeup program 118E manages power to each of chips that boot up a predetermined process (or a program). The jogdial status monitoring program 118F constantly monitors the rotation of a rotary encoder of the jogdial 63 and the pressing of the jogdial 63.

The ROM 118 further stores a BIOS (Basic Input/Output System) 118G. The BIOS, namely, basic input/output system, is a software program for controlling input and output of data between the OS and the application program, and peripheral devices (a display, a keyboard, an HDD, etc.)

The RAM 119 includes, as registers 119A through 119F, registers for LED control, touchpad input status, key input status, and time setting, and an I/O register for jogdial status monitoring, an IEEE1394 I/F register, etc. For example, when the jogdial 63 is pressed, the LED control register controls the lighting of the message lamp ML for displaying an instantaneous start-up status of an electronic mail. When the jogdial 63 is pressed, the key input status register stores an operation key flag. The time setting register permits any time to be set.

Connected to the I/O interface 117 through an unsown connector are the jogdial 63, the keyboard 64, the touchpad 65, and the IEEE1394 input/output port 70. When the user operates the jogdial 63, the keyboard 64, and the touchpad 65, the I/O interface 117 receives signals respectively input through the jogdial 63, the keyboard 64, and the touchpad 65, and outputs the respective signals to the ISA/EIO bus 112. The I/O interface 117 further exchanges data with the outside through the IEEE1394 input/output port 70. Connected to the I/O interface 117 are the power lamp PL, the battery lamp BL, the message lamp ML, a power control circuit 121, and other lamps of LEDs.

The power control circuit 121 is connected to an internal battery 122 or an AC power source. The power control circuit 121 powers each blocks, while controlling the charging of the internal battery 122 or a second battery in a peripheral device. Through the interface 117, the CPU 120 monitors a power switch 67 that switches on or off power.

Even when the power is off, the CPU 120, operating from internal power, can execute the IEEE1394 I/F program 118A through the BIOS 118G. More specifically, even when no window is opened on the LCD 66 of the display 62, the IEEE1394 I/F program 118A through the BIOS 118G constantly remain active. The CPU 120 continuously executes the wakeup program 118E for monitoring the jogdial status if the OS 86E is not running on the CPU 81 with the power switch 67 turned off. Without the need for a dedicated key on the personal computer 51, the personal computer 51 has a programmable power key (PPK) function. Even during power saving state, or power off state, the user starts preferred software or a script file by simply pressing the jogdial 63.

Figure 12:
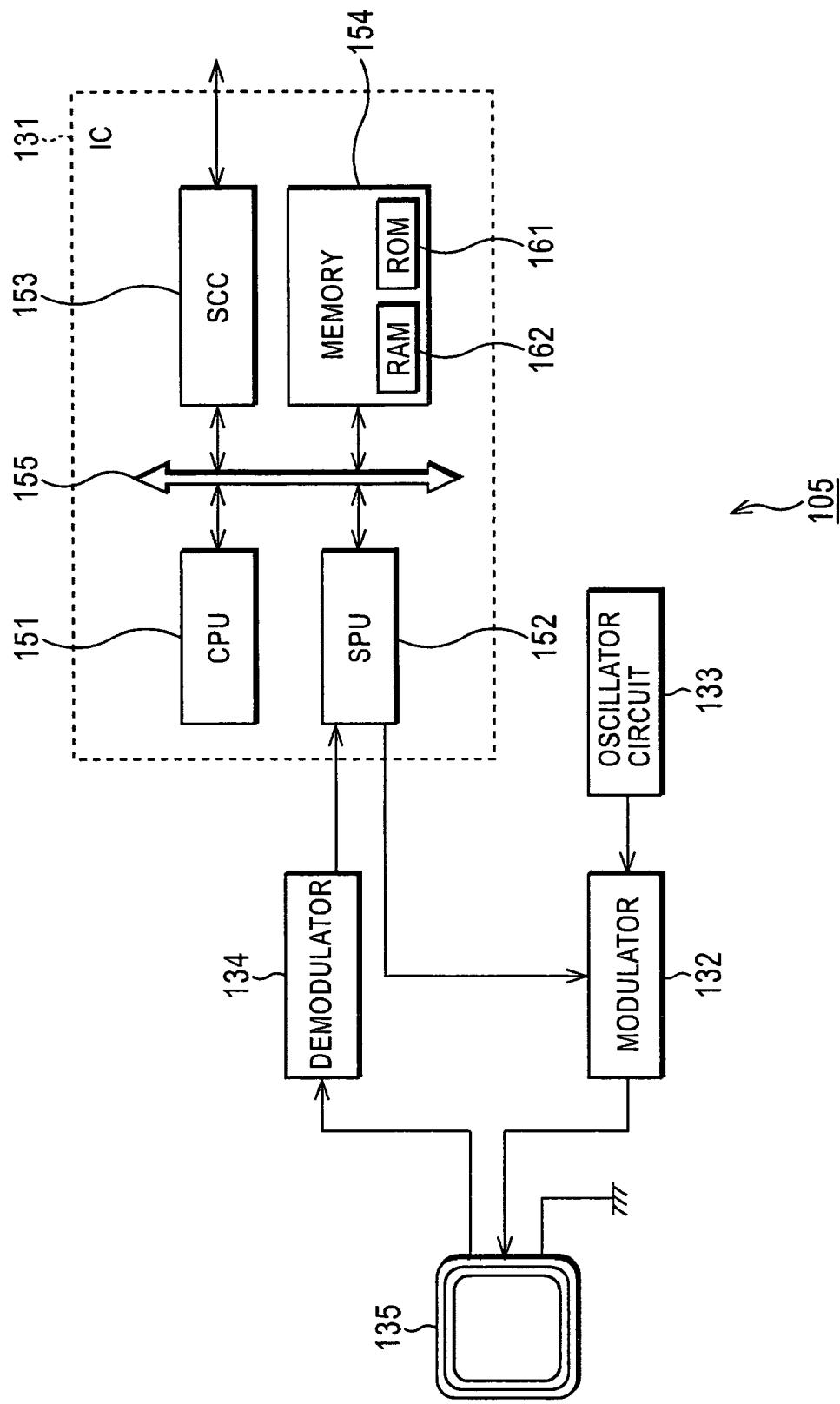
FIG. 12 is a block diagram illustrating the structure of a non-contact IC card reader/writer of FIG. 11.

FIG. 12 is a block diagram illustrating in detail the structure of the non-contact IC card reader/writer 105 of FIG. 11.

An IC 131 includes a CPU 151, an SPU (Signal Processing Unit) 152, an SCC (Serial Communication Controller) 153, and a memory 154. The memory 154 includes an ROM 161 and an RAM 161. The CPU 151 through the memory 154 are interconnected to each other through a bus 155.

The CPU 151 expands a control program stored in the ROM 161 onto the RAM 162, and performs a variety of processes in accordance with response data sent from the non-contact IC card 246, and a control signal supplied by the CPU 81 shown in FIG. 11. For example, the CPU 151 generates a command to be sent to the non-contact IC card 246, outputs the command to the SPU 152 through the bus 155, and performs an authentication process on data sent from the non-contact IC card 246.

When the CPU 151 is notified of a card ID in each of processes to be discussed later with the cellular phone 52 located nearby, the CPU 151 notifies the Bluetooth module 106 of the card ID in response to a command from the CPU 81.

The SPU 152 performs a BPSK (Binary Phase Shift Keying) demodulates data (decodes a Manchester code) when the response data from the non-contact IC card 246 comes in from a demodulator 134, and supplies the CPU 151 with the resulting decoded data. The SPU 152 performs a BPSK modulates a command (codes the command into a Manchester code) when the command to be supplied to the non-contact IC card 246 comes in through the bus 155, and outputs the resulting data to a modulator 132.

The SCC 153 supplies data from the CPU 81 to the CPU 151 through the bus 155, while outputting data input from the CPU 151 through the bus 155 to the CPU 81.

The modulator 132 ASK (Amplitude Shift Keying) modulates a carrier having a predetermined frequency (13.56 MHz, for example) supplied from an oscillator circuit (OSC) 133 with data supplied from the SPU 152, and outputs the modulated signal from an antenna 135 as the electromagnetic wave. On the other hand, the demodulator 134 demodulates a modulated wave (ASK modulated wave) acquired through the antenna 135, and outputs the demodulated data to the SPU 152.

The antenna 135 radiates a predetermined electromagnetic wave, and based on a change in the load thereof, determines whether the non-contact IC card 246 (the cellular phone 52) is located close thereto. When the non-contact IC card 246 is located close, the antenna 135 exchanges various data with the non-contact IC card 246.

Figure 13:
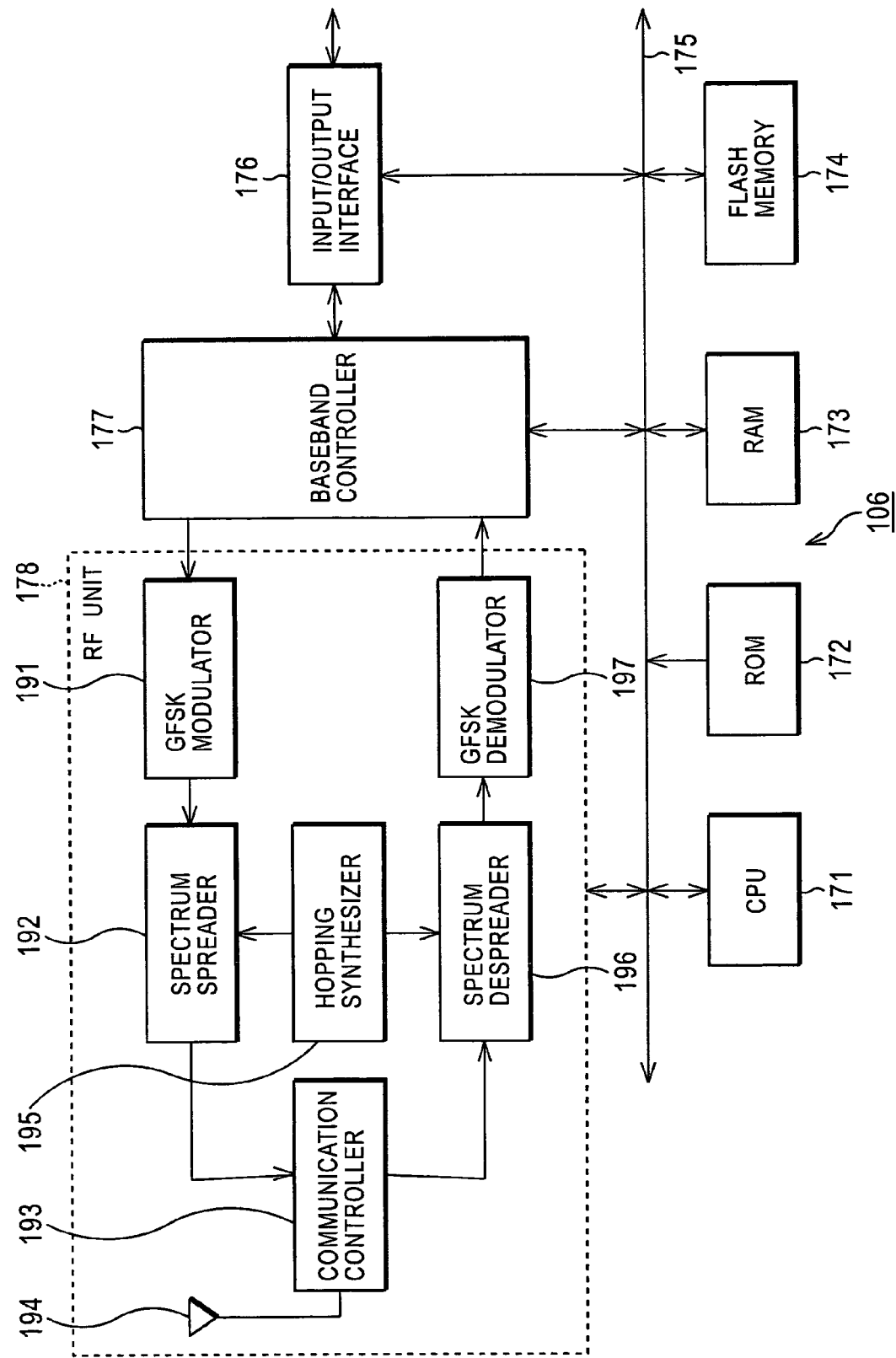
FIG. 13 is a block diagram illustrating the structure of a Bluetooth module of FIG. 11.

FIG. 13 is a block diagram illustrating in detail the Bluetooth module 106 of FIG. 11.

A CPU 171 expands a control program stored in an ROM 172 onto an RAM 173, and generally controls the Bluetooth module 106. The CPU 171 through the RAM 173 are interconnected to each other through a bus 175. A flash memory 174 is connected to the bus 175.

The flash memory 174 stores a Bluetooth device name set in each Bluetooth device and modified to the user's preference, and a Bluetooth address unique to the Bluetooth device.

The Bluetooth address, namely, an identifier of 48 bits, is unique (only one) to each Bluetooth device. The Bluetooth address is used for a variety of management purposes.

For example, as discussed above, to establish intra-piconet synchronization, all slaves must acquire information relating to the frequency hopping pattern. The slave calculates the frequency hopping pattern based on the Bluetooth address of the master.

More in detail, the Bluetooth address contains, as segments, a LAP (Low Address Part) of lower 24 bits, an UAP (Upper Address Part) of next 8 bits, and an NAP (Non-significant Address Part) of remaining 16 bits. A total of 28 bits, namely, the entire LAP of the 24 bits and the UAP of lower 4 bits, are used to calculate the frequency hopping pattern.

Each slave calculates the frequency hopping pattern based on the above-referenced 28 bits of the Bluetooth address of the master that is acquired in the paging for establishing the intra-piconet synchronization, and the Bluetooth clock notified by the master at the same time.

The frequency hopping pattern defines a paging frequency hopping pattern used during paging, an inquiry frequency hopping pattern used during inquiry, and a channel frequency hopping pattern used in communications between the master and the slave subsequent to the establishment of the intra-piconet synchronization. In the discussion that follows, the three frequency hopping patterns are simply referred to as a frequency hopping pattern when it is not necessary to discriminate the three frequency hopping patterns.

Returning to FIG. 13, the flash memory 174 stores a link key that authenticates the Bluetooth device as a communication partner subsequent to the establishment of the intra-piconet synchronization, and encrypts data to be transmitted. The link key is supplied to the CPU 171 as necessary.

The input/output interface 176 manages the input and output of data supplied from the CPU 81 shown in FIG. 11 and data supplied from a baseband controller 177.

The baseband controller 177 supplies a GFSK (Gaussian Frequency Shift Keying) modulator 191 with data from the input/output interface 176 to send the data to the cellular phone 52. Upon being supplied with data from the GFSK demodulator 197, the baseband controller 177 transfers the data to one of the bus 175 and the input/output interface 176.

The GFSK modulator 191 limits the high frequency component of the data supplied from the baseband controller 177, performs a frequency modulation on the data in a primary modulation, and outputs the resulting data to a spectrum spreader 192.

The spectrum spreader 192 switches a carrier frequency in accordance with a frequency hopping pattern calculated as described above and notified of by the hopping synthesizer 195, thereby spectrum spreading the supplied data and outputting the resulting signal to the communication controller 193. In the Bluetooth system, the spectrum spreader 192 hops the frequency every 625 μs, and sends the data.

The communication controller 193 transmits the spectrum spread signal using a 2.4 GHz band from the antenna 194. The communication controller 193 outputs a signal received through the antenna 194 to a spectrum despreader 196.

The spectrum despreader 196 hops the received frequency in accordance with the frequency hopping pattern notified of by the hopping synthesizer 195, and acquires a signal from the cellular phone 52. The spectrum despreader 196 further despreads the acquired signal to reproduce the signal from the cellular phone 52, and outputs the resulting signal to the GFSK demodulator 197. The GFSK demodulator 197 GFSK demodulates the signal supplied from the spectrum despreader 196, and outputs the resulting data to the baseband controller 177.

The structure of the cellular phone 52 will now be discussed.

Figure 14:
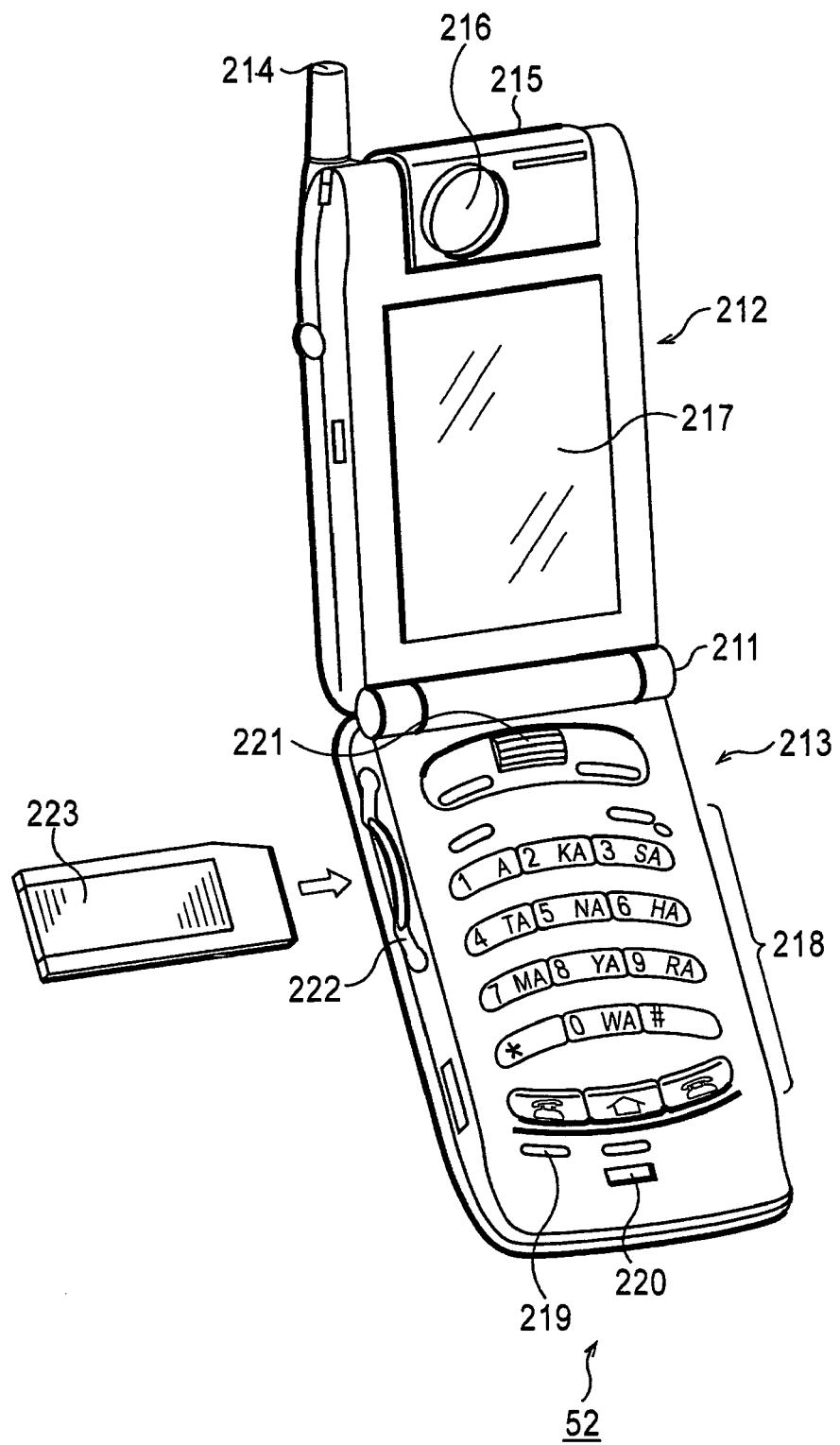
FIG. 14 is an external view of a cellular phone of FIG. 6.

FIG. 14 is an external view of the cellular phone 52 of FIG. 6.

As shown, the cellular phone 52 includes a display 212 and a device body 213, and the display 212 and the device body 213 are connected at a hinge section 211.

The display 212 has an extendable or retractable antenna 214 for transmission and reception at the top left corner thereof. Through the antenna 214, the cellular phone 52 transmits and receives radio wave to and from a base station as a fixed wireless terminal.

The display 212 also has, on the top center portion thereof, a camera section 215 that is rotatable within a range of about 180 degrees. The cellular phone 52 photographs a desired image with a CCD (Charge Coupled Device) of the camera section 215.

Figure 15:
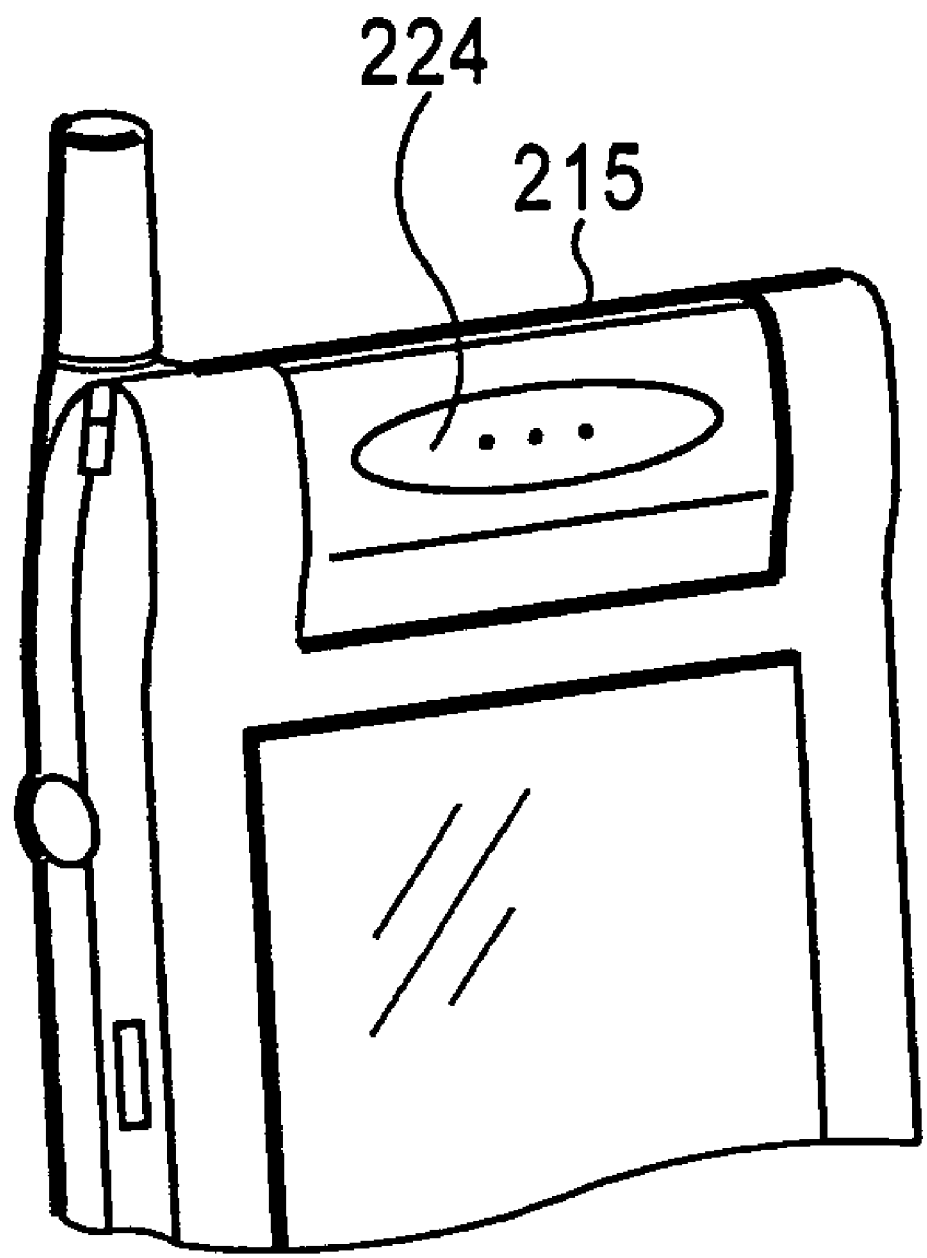
FIG. 15 is another external view of the cellular phone of FIG. 6.

When the user sets the camera section 215 in alignment by rotating the camera section 215 by 180 degrees, the display 212 appears as shown in FIG. 15 with a loudspeaker 224 mounted on the back side of the camera section 215 looks frontward. In this way, the cellular phone 52 is shifted to a standard voice communication state thereof.

A liquid-crystal display 217 is arranged in the center of the display 212. The display 212 displays a radio wave reception state, battery remaining power, a name and a telephone number of a destination registered in a telephone directory, a communication record, contents of mails, a simple-format home page, an image picked up by a CCD camera 216 of the camera section 215, etc.

The device body 213 has, on the top surface thereof, operation keys 218 including numeric keys from a "0" key to a "9" key, a call key, a re-dial key, an end key, a power key, a clear key, an electronic mail key, etc. A variety of commands responsive to the operations of the operation keys 218 are input to the cellular phone 52.

The device body 213 further has a memory button 219 and a microphone 220 below the operation keys 218. The cellular phone 52 records the voice of a communication partner during communication when the memory button 219 is operated. With the microphone 220, the cellular phone 52 picks up the voice of the user during communication.

A jogdial 221, in the slightly projected position thereof, is rotatably arranged on the device body 213 above the operation keys 218. In response to the rotation of the jogdial 221, the cellular phone 52 performs a variety of operations including a scroll operation of the telephone directory or an electronic mail displayed on the liquid-crystal display 217, a page turning operation of the simple format home page, an image scrolling operation, etc.

The user rotates the jogdial 221 on the device body 213 to select a desired telephone number from a plurality of telephone numbers in the telephone directory displayed on the liquid-crystal display 217, and presses the jogdial 221 inwardly into the device body 213 to determine the selected telephone number. The device body 213 performs a call process to that telephone number.

The device body 213 is loaded with an unshown battery pack on the back side thereof. When a talk end/power key is turned on, the battery pack powers each circuit, thereby readying each circuit for operation.

The device body 213 has a memory stick slot 222 on the upper left end surface thereof to receive a memory stick® 223 in a removably loaded fashion. When the memory button 219 is pressed, the cellular phone 52 starts to record the voice of the communication partner in the memory stick 223 during communication. In response to the user operation, the cellular phone 52 records the electronic mail, the simple-format home page, and the image captured by the CCD camera 216 in the loaded memory stick 223.

The memory stick 223 is one type of flash memory cards, developed Sony Corp., namely, the applicant of this patent application. The memory stick 223 has a built-in flash memory element, which is one type of EEPROM (Electrically Erasable and Programmable Read Only Memory), and is an electrically programmable, erasable and non-volatile memory in a flat and compact plastic case as large as 21.5 mm in vertical dimension×50 mm in horizontal dimension×2.8 mm in thickness dimension. The writing and reading of data such as image, sound, and music may be performed through 10 pins.

The cellular phone 52 shares data with another electronic apparatus through the memory stick 223 inserted therein.

If the memory stick 223, with a module (chip) installed in the memory stick 223 to expand a predetermined function, is loaded into the memory stick slot 222, the cellular phone 52 has an expanded function.

As will be discussed later, the memory stick 223 having a Bluetooth module or a non-contact IC card assembled thereinto may be inserted into the cellular phone 52. Even if the cellular phone 52 has no such a module, the cellular phone 52 thus enjoys an expanded function for Bluetooth communication with the personal computer 51 and for communication with the non-contact IC card.

Figure 16:
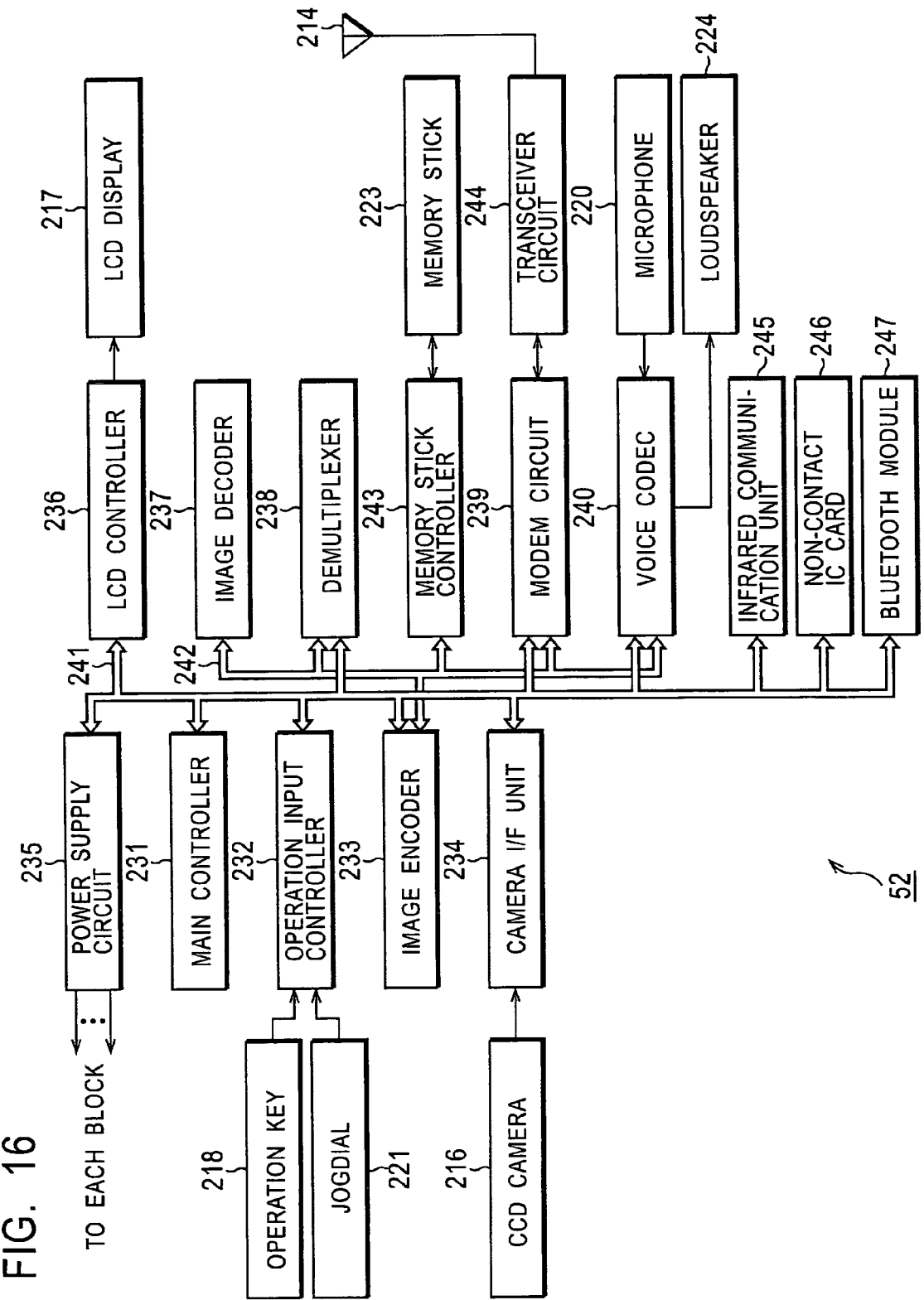
FIG. 16 is a block diagram illustrating the structure of the cellular phone of FIG. 6.

FIG. 16 illustrates the internal structure of the cellular phone 52.

Connected through a main bus 241 to a main controller 231 that generally controls the display 212 and the device body 213 are a power supply circuit 235, an operation input controller 232, an image encoder 233, a camera interface (I/F) unit 234, an LCD controller 236, a multiplexer/demultiplexer 238, a modem circuit 239, a voice codec 240, an infrared communication unit 245, a non-contact IC card 246, and a Bluetooth module 247. An image encoder 233, an image decoder 237, the multiplexer/demultiplexer 238, a memory stick controller 243, the modem circuit 239, and the voice codec 240 are interconnected to each other through a synchronization bus 242.

The power supply circuit 235 readies the cellular phone 52 for operation when the user turns on the talk end/power key to cause the battery pack to power each block. As will be discussed later, the power supply circuit 235 powers and starts up the Bluetooth module 247 when the non-contact IC card 246 issues an instruction of starting up the Bluetooth module 247.

The start-up timing of power on in response to the instruction from the non-contact IC card 246 with the Bluetooth module 247 in a power off state is the timing at which the non-contact IC card 246 receives the electromagnetic wave emitted from the non-contact IC card reader/writer 105 with the cellular phone 52 located close to the personal computer 51.

Under the control of the main controller 231 containing a CPU, an ROM, an RAM, etc., the cellular phone 52 converts a voice signal picked up by the microphone 220 into digital voice data using the voice codec 240 during a voice communication mode. The cellular phone 52 spectrum spreads the digital voice data using the modem circuit 239, and subjects the resulting data to a digital-to-analog conversion process and a frequency conversion process through a transceiver circuit 244, and then transmits the resulting signal from the antenna 214.

During the voice communication mode, the cellular phone 52 amplifies a signal received by the antenna 214, performs a frequency conversion process and an analog-to-digital conversion process on the amplified signal, spectrum despreads the resulting signal using the modem circuit 239, and converts the despread signal into an analog voice signal using the voice codec 240. The cellular phone 52 outputs a voice corresponding to the analog voice signal from the loudspeaker 224.

To send an electronic mail during a data communication mode, the cellular phone 52 sends text data, input by operating the operation keys 218 and the jogdial 221, to the main controller 231 through the operation input controller 232.

The main controller 231 spectrum spreads the text data using the modem circuit 239, performs a digital-to-analog conversion process and a frequency conversion process to the spectrum spread data using the transceiver circuit 244, and then transmits the resulting signal to a base station from the antenna 214.

To receive an electronic mail during the data communication mode, the cellular phone 52 spectrum despreads a signal received through the antenna 214 from the base station using the modem circuit 239. Subsequent to reproducing the original test data, the cellular phone 52 displays the text data on the liquid-crystal display 217 through the LCD controller 236 as an electronic mail.

The cellular phone 52 can record the electronic mail received in response to the user operation onto the memory stick 223 through the memory stick controller 243.

To send image data during the data communication mode, the cellular phone 52 supplies the image encoder 233 with the image data captured by the CCD camera 216 through the camera interface unit 234.

If the cellular phone 52 does not send image data, the image data captured by the CCD camera 216 can be directly displayed on the liquid-crystal display 217 through the camera interface unit 234 and the LCD controller 236.

The image encoder 233 compression encodes the image supplied from the CCD camera 216 in accordance with a predetermined encoding method such as the MPEG (Moving Picture Experts Group) 2 or the MPEG 4, and sends the encoded image data to the multiplexer/demultiplexer 238.

At the same time, the cellular phone 52 sends the voice, picked up by the microphone 220 during image capturing, to the multiplexer/demultiplexer 238 through the voice codec 240 as digital voice data.

The multiplexer/demultiplexer 238 multiplexes the encoded image data supplied from the image encoder 233 and the voice data supplied from the voice codec 240, the modem circuit 239 spectrum spreads the resulting multiplexed signal, and the transceiver circuit 244 performs a digital-to-analog conversion process and a frequency conversion process on the spectrum spread signal. The resulting signal is then transmitted through the antenna 214.

When the cellular phone 52 receives data of a moving picture file, linked to a simple-format home page, during the data communication mode, the modem circuit 239 spectrum despreads a signal received from the base station through the antenna 214. The resulting multiplexed data is sent to the multiplexer/demultiplexer 238.

The multiplexer/demultiplexer 238 demultiplexes the multiplexed data into encoded image data and voice data, and supplies the image decoder 237 with the encoded image data and the voice codec 240 with the voice data through the synchronization bus 242.

The image decoder 237 decodes the encoded image data in accordance with a decoding method corresponding to the predetermined coding method such as the MPEG 2 or the MPEG 4, thereby generating reproduced moving picture data. The moving picture data is supplied to the liquid-crystal display 217 through the LCD controller 236. The cellular phone 52 displays the moving data contained in the moving picture file linked to the simple-format home page.

The voice codec 240 converts the voice data into an analog voice signal, and outputs the analog voice signal to the loudspeaker 224. In this way, the cellular phone 52 reproduces the voice data contained in the moving picture file linked to the simple-format home page.

Like the electronic mail, the cellular phone 52 can store the data linked to the received simple-format home page onto the memory stick 223 through the memory stick controller 243 in response to the user operation.

When the non-contact IC card 246, located close to the personal computer 51, receives the electromagnetic wave emitted from the non-contact IC card reader/writer 105, various information is supplied to the non-contact IC card reader/writer 105 in response.

Figure 17:
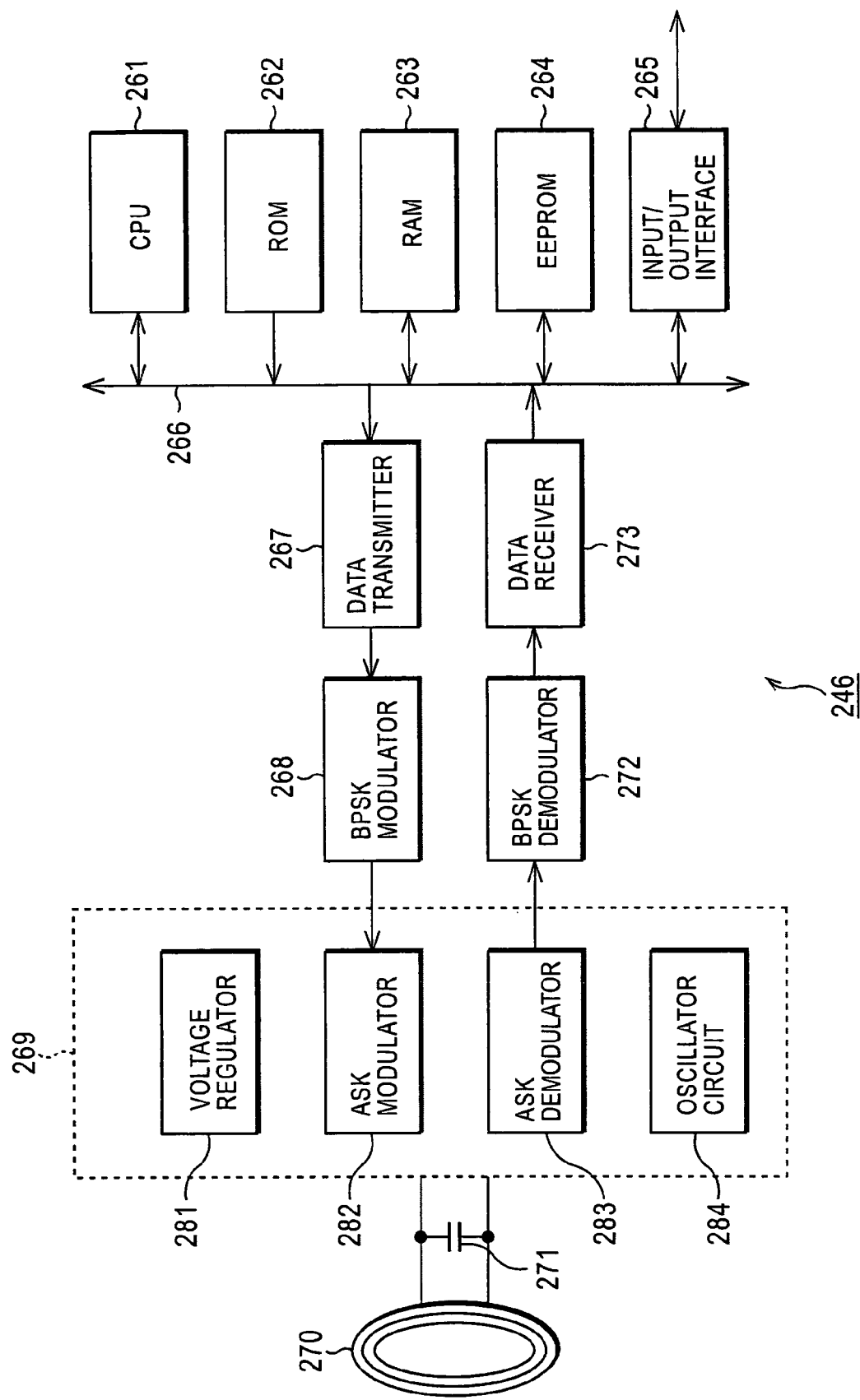
FIG. 17 is a block diagram illustrating the structure of the non-contact IC card of FIG. 16.

FIG. 17 is a block diagram illustrating in detail the structure of the non-contact IC card 246.

For example, the non-contact IC card 246 includes a shown antenna (loop antenna) 270, a capacitor 271, and an IC including the remaining elements encapsulated in a single chip. The non-contact IC card 246 communicates various data with the non-contact IC card reader/writer 105 in a half-duplex operation. The non-contact IC card 246 does not necessarily have a card-like configuration. The IC card is a name used for convenience only, and is intended to have the functions already described and functions to be descried later. Also available is Felica® which provides the function substantially similar to the function of the non-contact IC card 246.

A CPU 261 expands a control program stored in an ROM 262 onto an RAM 263, and generally controls the non-contact IC card 246. For example, when the antenna 270 receives the electromagnetic wave emitted from the non-contact IC card reader/writer 105, the CPU 261 notifies the non-contact IC card reader/writer 105 of a card ID as identification information set in the non-contact IC card 246.

The card ID is freely modified. For example, the card ID may be the same name as the Bluetooth device name set in the Bluetooth module 247 (cellular phone 52) or a name containing the Bluetooth device name.

An ASK demodulator 283 in an interface 269 demodulates a modulated wave (ASK modulated wave) received through the antenna 270 in an envelope detection method, and outputs the demodulated signal to the BPSK demodulator 272. An electromagnetic wave having a predetermined frequency emitted from the non-contact IC card reader/writer 105 is resonated in an LC circuit composed of the antenna 270 and the capacitor 271.

The interface 269 rectifies an AC magnetic field induced in the antenna 270 using the ASK demodulator 283, regulates the rectified signal using a voltage regulator 281, and feeds the regulated signal to each block as DC power. Power of the electromagnetic wave emitted from the non-contact IC card reader/writer 105 is adjusted to produce an magnetic field to feed sufficient power to the non-contact IC card as discussed later.

An oscillator circuit 284 in the interface 269 oscillates a signal having the same frequency as data, and supplies the signal to an unshown PLL.

When data such as the card ID is sent to the non-contact IC card reader/writer 105, the interface 269 turns on and off a predetermined switching element in response to the data supplied from a BPSK modulator 268 and varies the load of the antenna 270 by connecting a predetermined load in parallel with the antenna 270 during only an on period of the switching element.

An ASK modulator 282 ASK modulates a modulated wave, received from the non-contact IC card reader/writer 105, in accordance with a variation in the load of the antenna 270. The modulated component is then transmitted to the reader/writer 105 through the antenna 270 (a terminal voltage at an antenna 135 of the reader/writer 105 is varied) (a load switching method).

If the data demodulated by the ASK demodulator 283 is BPSK modulated data, the BPSK demodulator 272 demodulates the data (decodes a Manchester code) in accordance with a clock signal supplied from the unshown PLL, and outputs the demodulated data to a data receiver 273. The data receiver 273 outputs the supplied data to the CPU 261 and the like as necessary.

The BPSK modulator 268 BPSK modulates data supplied from a data transmitter 267 (codes the data into a Manchester code), and outputs the modulated data to the ASK modulator 282.

The non-contact IC card 246 not only notifies the personal computer 51 of the card ID, but also performs a variety of process including an authentication process with the reader/writer 105 and an encryption process of data to be transmitted.

FIG. 18 lists the specifications of the non-contact IC card 246.

As already discussed, communication between the reader/writer 105 and the non-contact IC card 246 are performed in an half-duplex operation. The data rate of the communication is 211.875 kbps.

Also as shown, 13.56 MHZ is the center frequency of the frequency band used in the power transmission and the data transfer performed from the reader/writer 105 to the non-contact IC card 246, and the data transfer performed from the non-contact IC card 246 to the reader/writer 105.

The radio wave output from the reader/writer 105 for power transmission is 350 mW, for example. The coverage distance of the radio wave is typically about 10 cm, although it changes depending on communication environments such as characteristics of the antenna.

The data transfer from the reader/writer 105 to the non-contact IC card 246 is performed by ASK modulating Manchester coded data as described above. The degree of modulation (the maximum amplitude of the data signal/the maximum amplitude of the carrier wave) is about 0.1. The data transfer from the non-contact IC card 246 to the reader/writer 105 is performed by converting the output data into a transmission signal in the load switching method as already discussed (the load of the antenna 135 is varied by turning on and off the switching element in response to the output data).

Returning to the discussion with reference to FIG. 16, the Bluetooth module 247 forms a piconet together with the Bluetooth module 106 of the personal computer 51, and transmits and receives various data in response to a command from the main controller 231.

The structure of the Bluetooth module 247 is identical to the one shown in FIG. 13, and the detailed discussion thereof is omitted here. In the discussion that follows, the CPU of the Bluetooth module 106 is referred to as a CPU 171A, and the CPU of the Bluetooth module 247 is referred to as a CPU 171B. The same is true of the other elements.

In the above discussion, the non-contact IC card 246 and the Bluetooth module 247 are contained in the cellular phone 52. Alternatively, the non-contact IC card 246 and the Bluetooth module 247 may be assembled into the memory stick 223, and the memory stick 223 having these elements may be loaded into the cellular phone 52. The non-contact IC card 246 and the Bluetooth module 247 are controlled by the memory stick controller 243.

Figure 19:
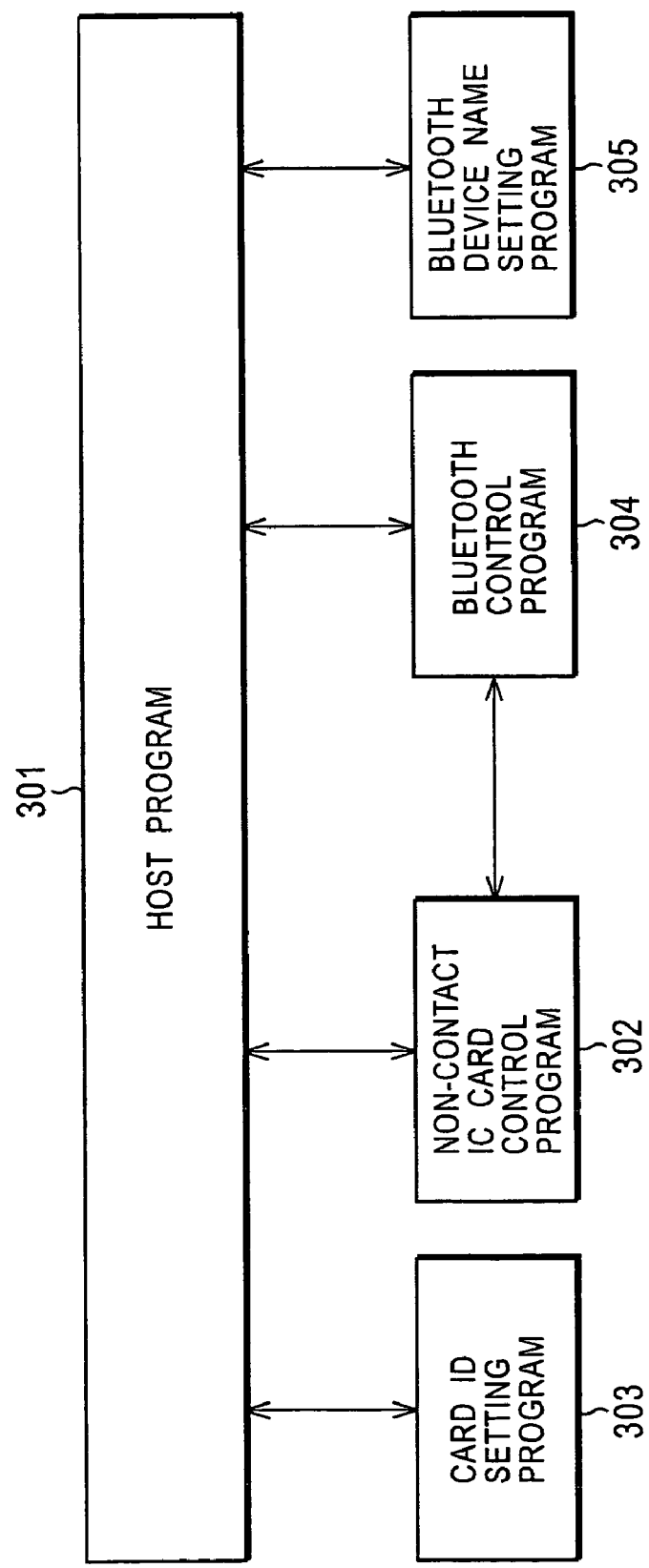
FIG. 19 is a functional block diagram of the cellular phone of FIG. 6.

FIG. 19 illustrates functional blocks of the cellular phone 52.

A host program 301 provides basic functions of the cellular phone 52, such as a communication function, and a transmission and reception function of an electronic mail. The non-contact IC card control program 302 controls the operation of the non-contact IC card 246, while performing various processes in cooperation with a card ID setting program 303, a Bluetooth control program 304, etc.

When the cellular phone 52 is located close to the personal computer 51, the non-contact IC card control program 302 supplies the reader/writer 105 with the set card ID, and starts up the Bluetooth module 247 (Bluetooth control program 304) in response to the reception of the electromagnetic wave from the reader/writer 105.

The card ID setting program 303 manages the card ID stored in an EEPROM 264, and rewrites the card ID as necessary in response to a command from the user. The card ID setting program 303 sets the card ID so that the card ID contains at least the Bluetooth device name.

The Bluetooth control program 304 controls the operation of the Bluetooth module 247, and establishes communication with another Bluetooth device. The Bluetooth device name setting program 305 manages the Bluetooth device name set in a flash memory 174B (a flash memory of the Bluetooth module 247). The Bluetooth device name setting program 305 sets the same Bluetooth device name as the card ID, and stores the Bluetooth device name in the flash memory 174B.

The operation of the communication system shown in FIG. 6 will now be discussed.

First, a series of process steps of the personal computer 51 for identifying a communication partner subsequent to the establishment of the intra-piconet synchronization is discussed with reference to flowcharts in FIG. 20 and FIG. 21.

In the following process, the personal computer 51 is a master while the other Bluetooth devices (such as the cellular phone 52 or the PDA 53) are slaves. In the discussion of the following flowcharts, communication refers to Bluetooth communication that is performed subsequent to the establishment of the intra-piconet synchronization and the identification of the communication partner.

In step S121, the reader/writer control program 86F causes the electromagnetic wave to be emitted to detect a terminal (the cellular phone 52) housing the non-contact IC card. Using a predetermined command, the reader/writer control program 86F controls the reader/writer 105, thereby causing the electromagnetic wave to be emitted from the antenna 135 with a predetermined period.

The non-contact IC card control program 302 proceeds to step S132 when the electromagnetic wave is received with the cellular phone 52 located close to the personal computer 51 in step S131. The non-contact IC card control program 302 reads the card ID (the Bluetooth device name) from the EEPROM 264 and notifies the reader/writer 105 of the card ID.

As already discussed, the card ID of which the reader/writer 105 is notified is the same information as the Bluetooth device name or the information containing the Bluetooth device name.

In step S122, the reader/writer control program 86F receives the Bluetooth device name notified of by the non-contact IC card 246. In step S123, the reader/writer control program 86F notifies the Bluetooth control program 86G of the Bluetooth device name.

In step S101, the Bluetooth control program 86G acquires the Bluetooth device name set in the cellular phone 52. Before performing various processes discussed with reference to FIG. 2 and FIG. 3, the Bluetooth control program 86G acquires the Bluetooth device name of the terminal (the cellular phone 52) to communicate with subsequent to the establishment of the intra-piconet synchronization.

Figure 1:
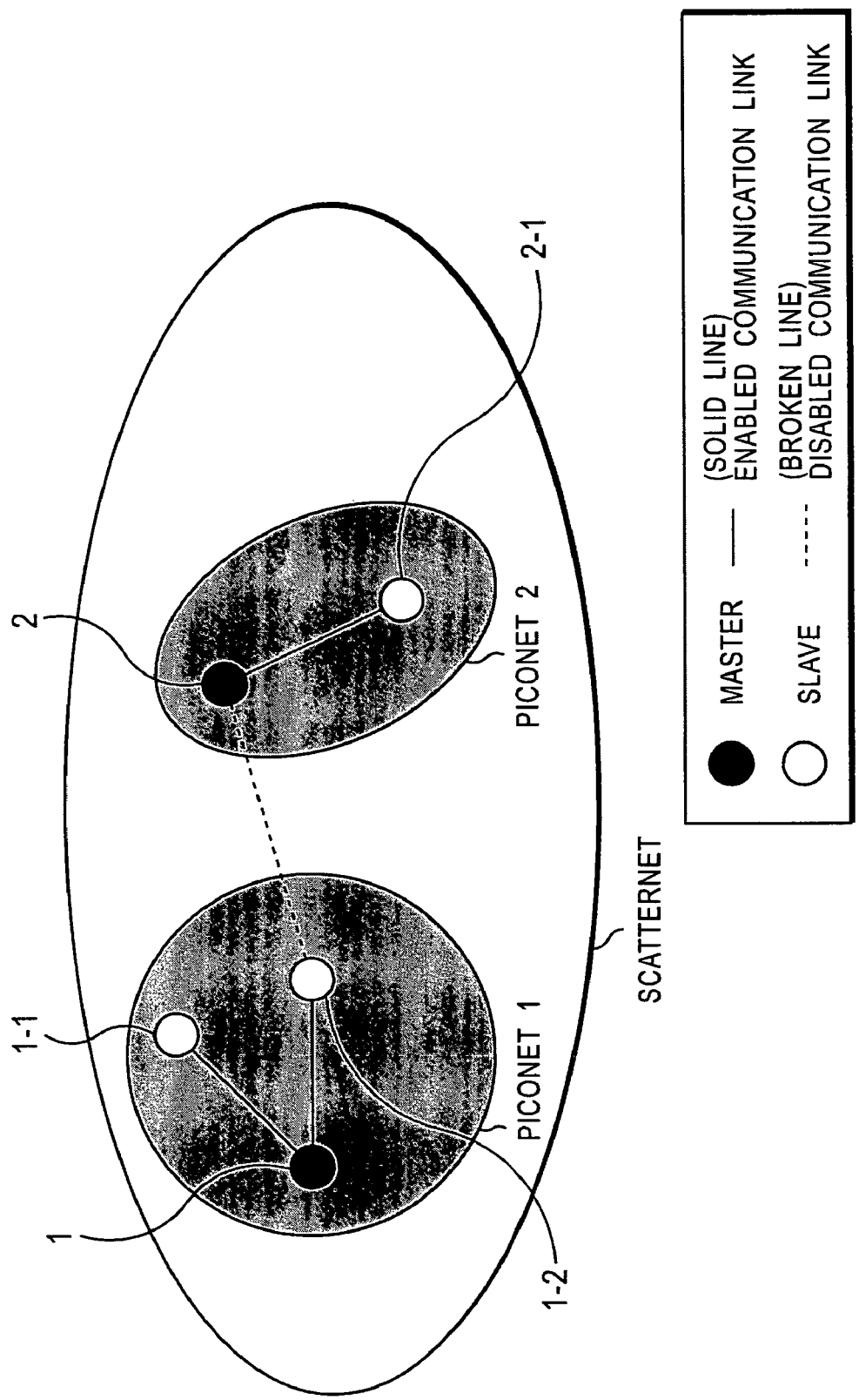
FIG. 1 illustrates the concept of a piconet and a scatternet.
Figure 2:
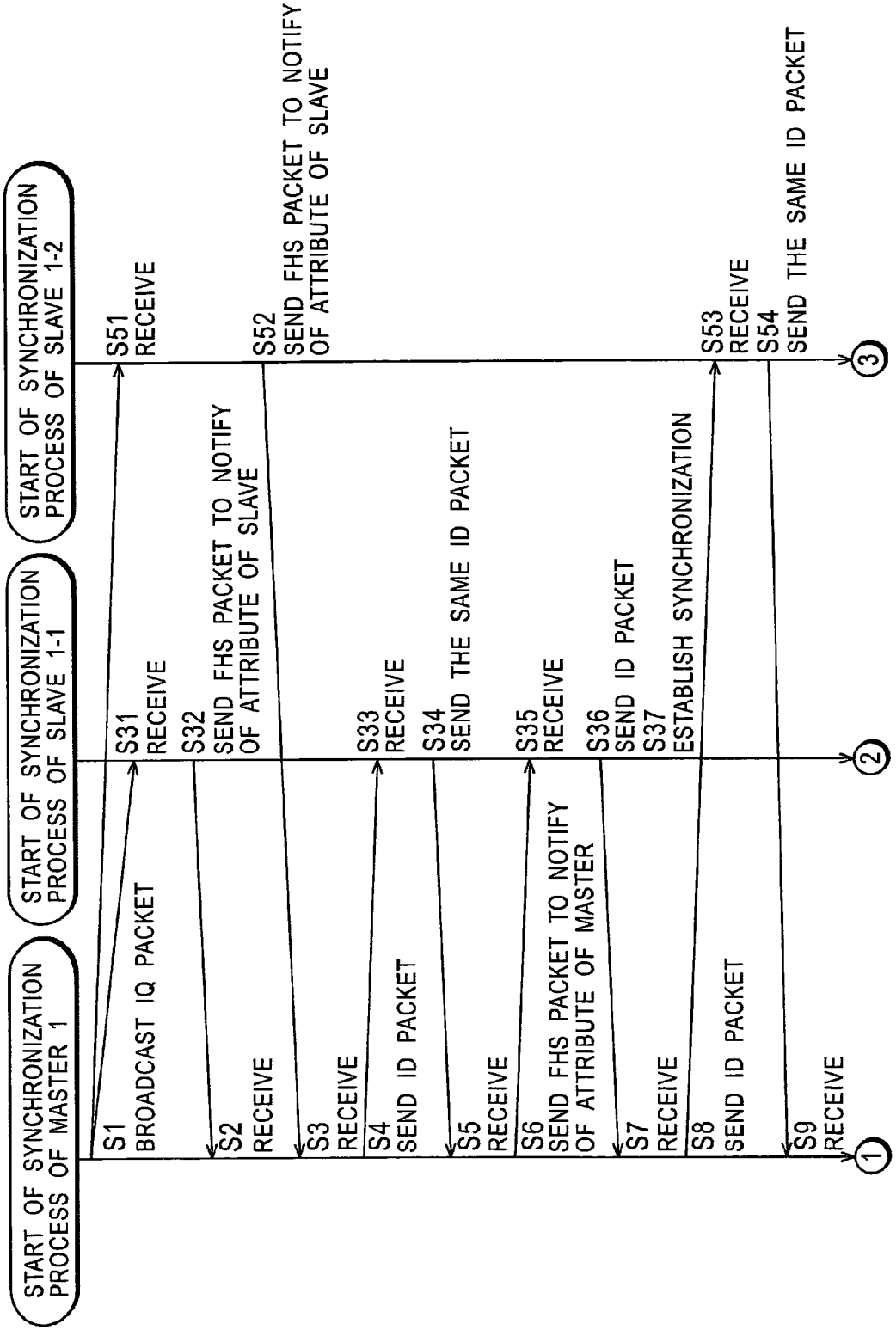
FIG. 2 is a flowchart illustrating a known process for establishing intra-piconet synchronization.
Figure 3:
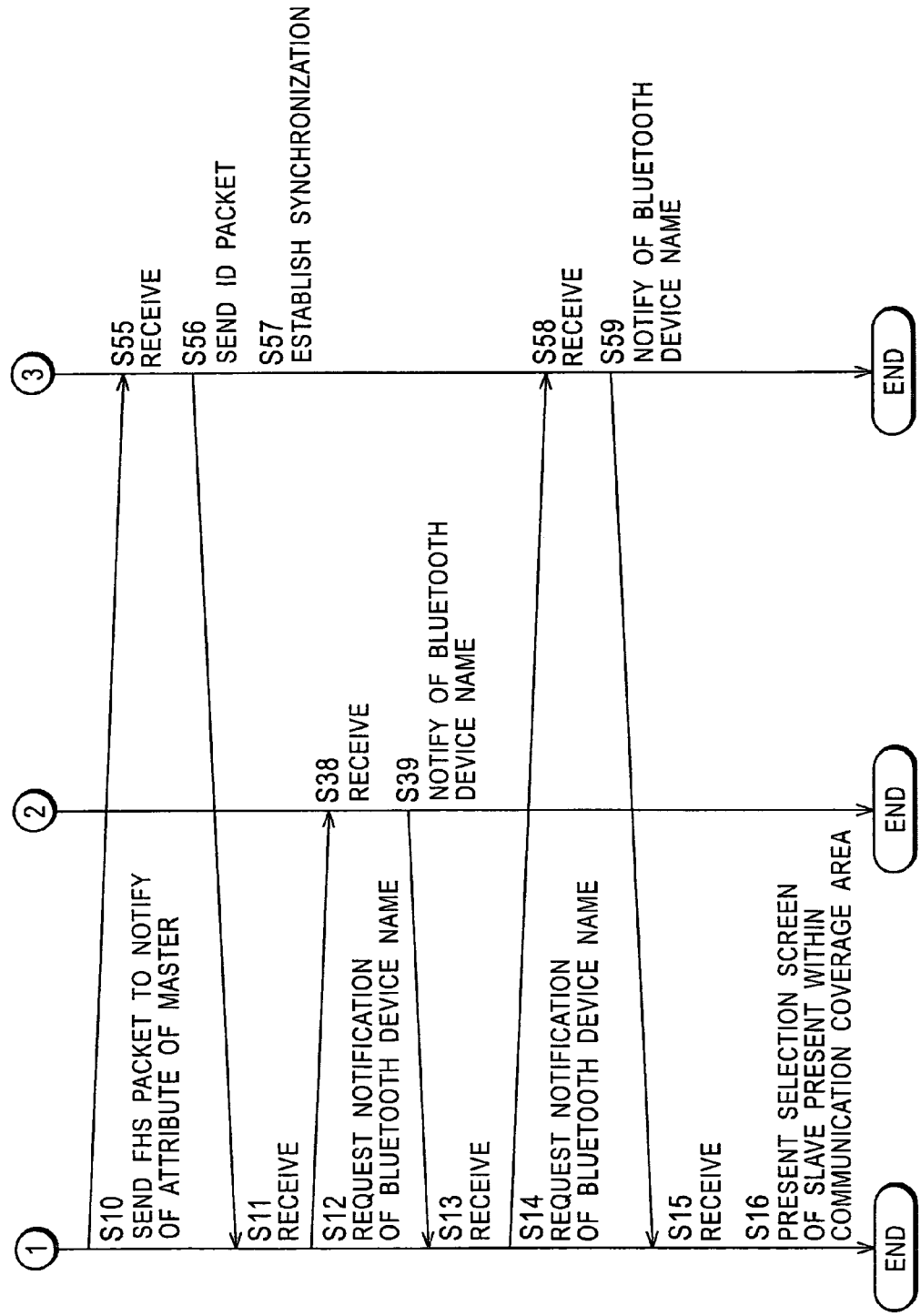
FIG. 3 is a continuation of the flowchart of FIG. 2, illustrating the known process for establishing the intra-piconet synchronization.
Figure 4:
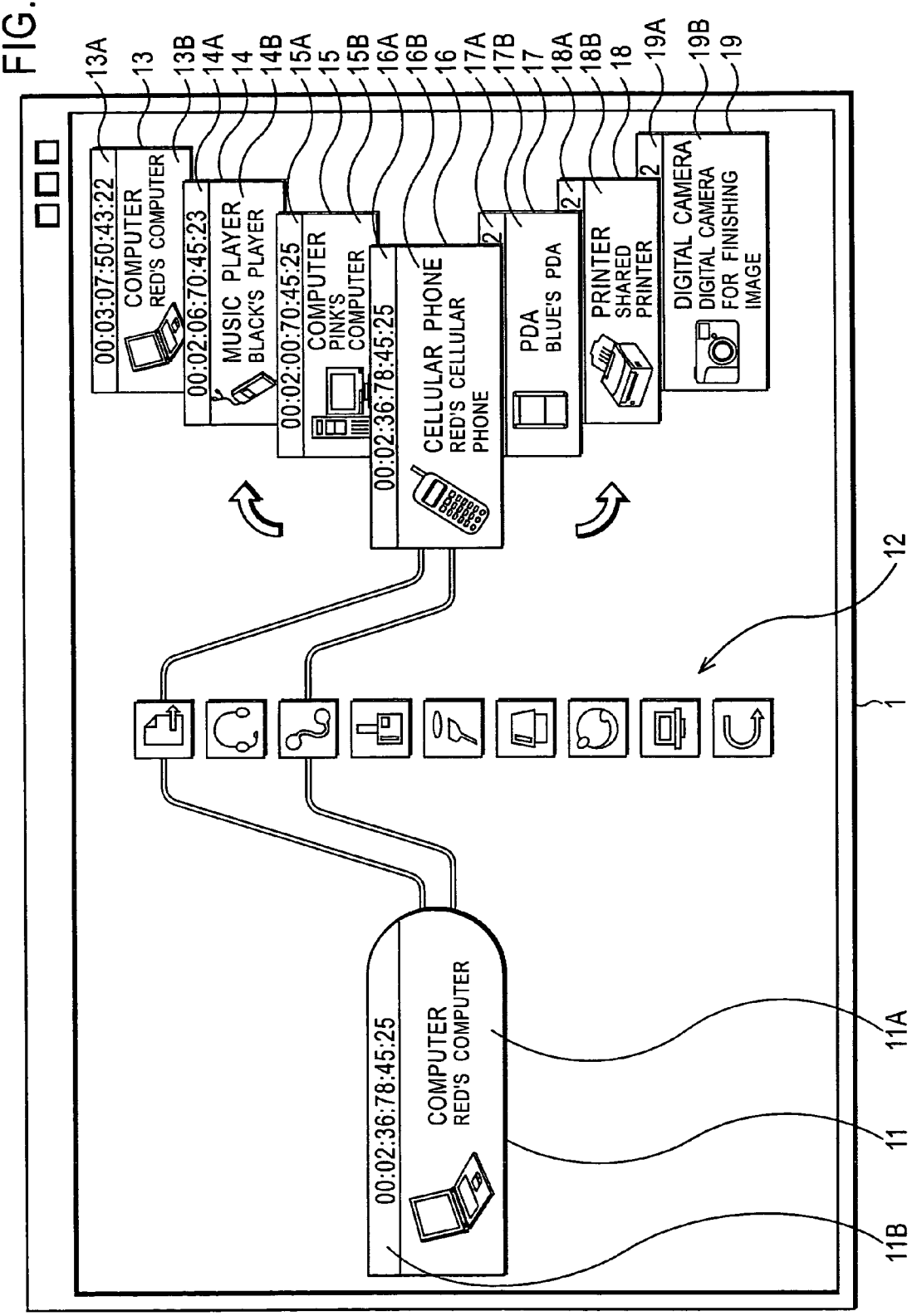
FIG. 4 illustrates a screen for selecting a communication terminal.
Figure 5:
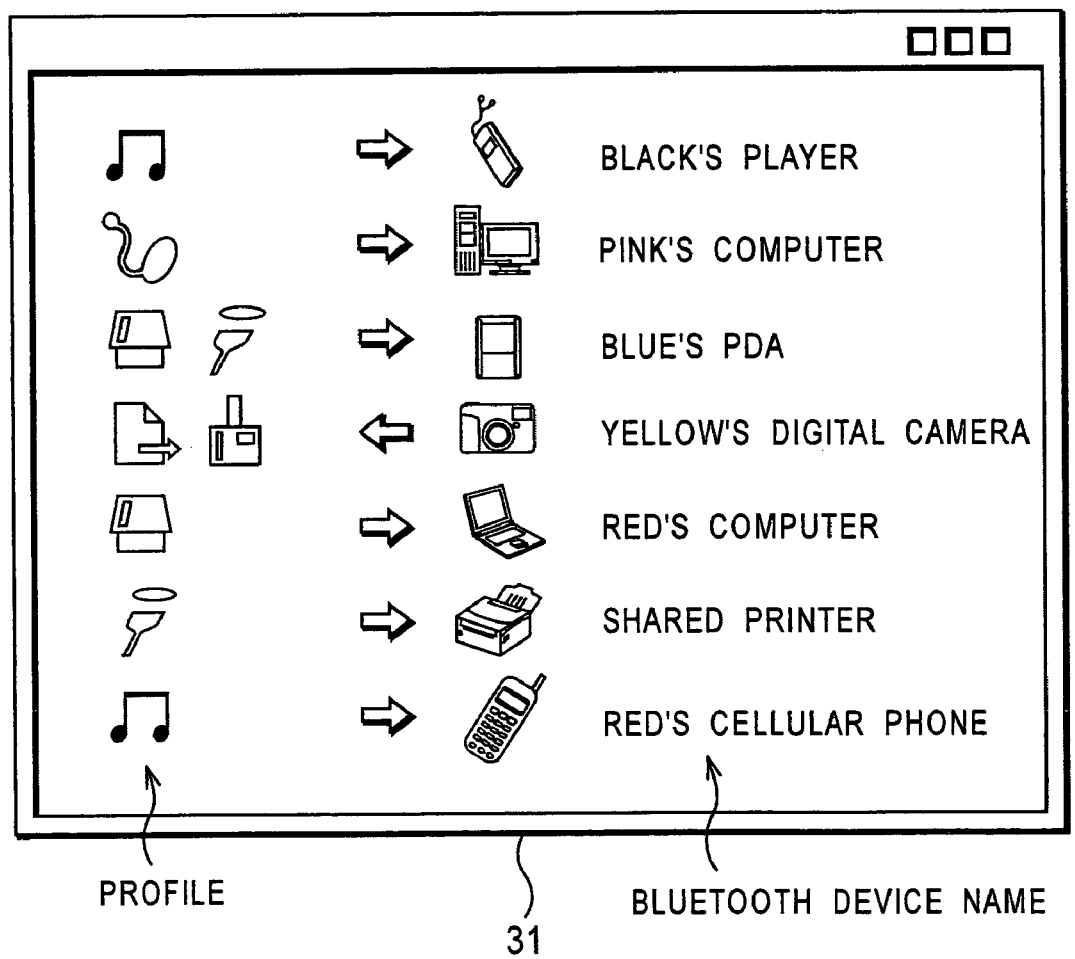
FIG. 5 illustrates another screen for selecting a communication terminal.

Process steps performed by the Bluetooth control program 86G in steps S102 through S116, process steps performed by the Bluetooth control program 304 in steps S141 and subsequent steps, and process steps performed by the Bluetooth control program of the PDA 53 in step S161 and subsequent steps are identical to those in the inquiry and the paging already discussed with reference to FIG. 2 and FIG. 3.

In other words, the Bluetooth control program 86G controls the Bluetooth module 106 in step S102, thereby broadcasting an IQ packet.

More specifically, the Bluetooth control program 86G generates an inquiry frequency hopping pattern using 24 bits (9E8B33) of a preset LAP and 4 bits (all 0's) of preset UAP, and all 28 bits of the Bluetooth clock.

The Bluetooth control program 86G generates an IAC (Inquiry Access Code) using one address block from 9E8B00 through 9E8B3F of the preset LAP, and broadcasts an IQ packet formed of the access code in the calculated inquiry hopping pattern.

The packet transmitted and received in the Bluetooth communication contains an access code of 68 bits or 72 bits serving as a base for a destination of a transmission packet, a packet header of 54 bits containing a parameter managing a communication link, and a payload as user data of 0 to 2745 bits (in variable length).

The IQ packet, which is broadcast from the antenna 194 subsequent to the process of the elements of the Bluetooth module 106, is received by the Bluetooth control program 304 of the cellular phone 52 in step S141, and is received by the Bluetooth control program of the PDA 53 in step S161.

In step S142, the Bluetooth control program 304 sends an FHS packet to the personal computer 51 to notify of the attribute of the slave, thereby replying to the inquiry. Information relating to the Bluetooth address and the Bluetooth clock of the Bluetooth module 247 is contained in the payload of the FHS packet.

The Bluetooth control program 86G receives the FHS packet in step S103, and acquires the attribute information from the cellular phone 52.

In step S162, an FHS packet representing the attribute of the PDA 53 is similarly sent, and the Bluetooth control program 86G receives the FHS packet in step S104.

Subsequent to the above inquiry process, the Bluetooth control program 86G has acquired the attribute information of all slaves present nearby.

In step S105, the Bluetooth control program 86G generates an ID packet based on information described in the FHS packet acquired from the cellular phone 52, and sends the ID packet to the cellular phone 52.

More specifically, the Bluetooth control program 86G calculates a paging frequency hopping pattern based on 24 bits of the LAP and lower 4 bits of the UAP of the Bluetooth address set in the Bluetooth module 247, and 28 bits of the Bluetooth clock.

The Bluetooth control program 86G generates a DAC (Device Access Code) using the LAP of the Bluetooth module 247, and sends an ID packet, formed of the DAC, to the cellular phone 52 in accordance with the calculated paging frequency hopping pattern.

Upon receiving the ID packet in step S143, the Bluetooth control program 304 proceeds to step S144. The Bluetooth control program 304 sends the same ID packet to the personal computer 51 to notify the personal computer 51 that the ID packet has been normally received.

In step S106, the Bluetooth control program 86G receives the ID packet sent from the cellular phone 52. In step S107, the Bluetooth control program 86G sends the FHS packet to the cellular phone 52 to notify of own attribute.

In step S145, the Bluetooth control program 304 receives the FHS packet sent from the personal computer 51, and acquires the attribute information of the master. In step S146, the Bluetooth control program 304 sends the ID packet to the personal computer 51 to notify that the FHS packet has been received.

The Bluetooth control program 304 proceeds to step S147, and establishes intra-piconet synchronization with the personal computer 51.

More specifically, the Bluetooth control program 304 generates a channel frequency hopping pattern based on 24 bits of the LAP and lower 4 bits of the UAP of the Bluetooth address set in the personal computer 51 (Bluetooth module 106), and 27 bits of the Bluetooth clock, and establishes frequency axis synchronization.

The Bluetooth control program 304 adds an offset (a difference) to the Bluetooth clock managed by itself based on the Bluetooth clock notified of by the personal computer 51, and establishes time axis synchronization.

In step S108, the Bluetooth control program 86G receives the ID packet sent from the cellular phone 52.

To establish synchronization with a plurality of slaves, the personal computer 51, functioning as the master, repeats the paging operation to each slave, thereby successively increasing the number of slaves forming the piconet. Specifically, in step S109 through step S112, and in step S163 through step S167, a similar paging operation is performed between the personal computer 51 and the PDA 53, and the intra-piconet synchronization is thus established.

When the intra-piconet synchronization is established with all slaves, the Bluetooth control program 86G requests notification of the Bluetooth device name set in each slave. In step S113, the Bluetooth control program 86G requests the cellular phone 52 to notify of the Bluetooth device name.

Upon receiving the request in step S148, the Bluetooth control program 304 proceeds to step S149. The Bluetooth control program 304 reads the Bluetooth device name set in the flash memory 174B, and notifies of the Bluetooth device name.

In step S114, the Bluetooth control program 86G receives the Bluetooth device name sent from the cellular phone 52.

In step S115, the Bluetooth control program 86G requests the PDA 53 to notify of the Bluetooth device name, and receives a response in step S116.

In step S117, the Bluetooth control program 86G identifies the slave having the Bluetooth device name set therewithin and already notified of by the reader/writer 105, as a communication partner, from among the plurality of slaves that have notified of the Bluetooth device names, and starts communicating with the identified slave. Since the Bluetooth device name of the cellular phone 52 is already notified of using the electromagnetic wave, the personal computer 51 performs subsequent communications with the cellular phone 52.

The Bluetooth control program 86G requests the cellular phone 52 to notify the Bluetooth control program 86G of a profile (service) available from the cellular phone 52. In the Bluetooth communication, the specifications of all protocols and user interfaces are specified for each device on which a Bluetooth module is expected to mount, and the profile is specified by the protocol in use. The profile is specified in connection with the function of each layer of the Bluetooth and cooperation with the layer on a per application basis.

The Bluetooth control program 86G selects a predetermined profile from the profiles notified of by the cellular phone 52, and performs communications based on the selected profile.

Before acquiring the available profile or before communications subsequent to the selection of the profile, mutual authentication may be sometimes required. The personal computer 51 and the cellular phone 52 set a link key in the respective databases thereof, and authenticate each other using the link key.

For example, when the personal computer 51 and the cellular phone 52 communicate with each other for the first time, the user is requested to input a PIN (Personal Identification Number) code in the setting of the link key. The link key is set based on the input PIN code and a generated random number. The set link key is associated with the Bluetooth address of a communication partner, and is then registered in the respective databases.

Depending on application, the link key is defined as an "initialization key", a "single key", a "composite key", or a "master key". As described above, the link key, which is set based on the PIN code and the random number for the first communication, is the initialization key. The authentication process using the initialization key needs the initialization key, the Bluetooth address of a terminal that requests authentication, and the 128 bit random number generated by a terminal that performs authentication.

As described above, through the communication of the reader/writer 105, the personal computer 51 acquires, from the non-contact IC card 246, the Bluetooth device name of the terminal to communicate with subsequent to the establishment of the intra-piconet synchronization. Based on the information, the partner to communicate with is identified. As shown in FIG. 6, Bluetooth communications start only between the personal computer 51 and the cellular phone 52 without selecting the terminal even if the PDA 53 is present in the vicinity of the personal computer 51.

To perform Bluetooth communications with the personal computer 51, the user of the cellular phone 52 can start Bluetooth communications by simply locating the cellular phone 52 close to the personal computer 51. To transfer data from the personal computer 51 to the cellular phone 52, the user can also similarly start communications by simply locating the cellular phone 52 to the personal computer 51.

In the above discussion, the Bluetooth modules of the personal computer 51, the cellular phone 52, and the PDA 53 have already started up. If the Bluetooth modules have not started up, the Bluetooth modules may be activated at the timing of the reception of the electromagnetic wave, and in succession, the intra-piconet synchronization may be established.

A series of process steps of the communication system, discussed below with reference to flowcharts in FIG. 22 and FIG. 23, establishes the intra-piconet synchronization with the Bluetooth modules in an unbooted state.

The process discussed with reference to FIG. 22 and FIG. 23 is basically identical to the synchronization establishment process discussed with reference to FIG. 20 and FIG. 21. The difference between the two processes is that the Bluetooth module 247 of the cellular phone 52 starts up in response to the reception of the electromagnetic wave emitted from the reader/writer 105, and that the Bluetooth module 106 of the personal computer 51 starts in response to the card ID sent from the non-contact IC card 246 and received by the reader/writer 105.

In step S201, the reader/writer control program 86F emits the electromagnetic wave to detect the terminal containing the non-contact IC card.

In step S211, the non-contact IC card control program 302 receives the electromagnetic wave. In step S212, the non-contact IC card control program 302 commands the Bluetooth control program 304 (non-contact IC card 246) to start.

For example, the non-contact IC card control program 302 notifies the host program 301 of the reception of the electromagnetic wave. In response to this notification, the host program 301 starts up the Bluetooth control program 304, while controlling the power supply circuit 235 to power the Bluetooth module 247.

The Bluetooth control program 304 starts up in step S221, and waits for an inquiry (in inquiry scan) from the master (personal computer 51).

After starting the Bluetooth control program 304, the non-contact IC card control program 302 proceeds to step S213 to notify the reader/writer 105 of the set card ID.

The reader/writer control program 86F receives the card ID in step S202, and starts up the Bluetooth control program 86G in step S203 to feed power to the Bluetooth module 106.

The Bluetooth control program 86G starts up in step S181. In step S182, the Bluetooth control program 86G receives the Bluetooth device name (card ID) the reader/writer control program 86F has acquired from the cellular phone 52.

After starting up the Bluetooth control program 86G in step S203, the reader/writer control program 86F proceeds to step S204, thereby notifying the Bluetooth control program 86G of the card ID acquired from the cellular phone 52.

In subsequent process steps (process steps in steps S183 through S191, and process steps in step S222 through S231), the Bluetooth control program 86G performs the inquiry and the paging with the non-contact IC card 246 as already discussed with reference to FIG. 20 and FIG. 21. In accordance with the Bluetooth device name notified of by the reader/writer 105, the Bluetooth control program 86G identifies the cellular phone 52 as the communication partner.

Since the PDA 53 has received no electromagnetic wave from the reader/writer 105, the PDA 53 is held in the unbooted state thereof. The communication partner is thus more easily identified.

Since the non-contact IC card 246 is started up in response to the reception of the electromagnetic wave as a trigger, the user of the cellular phone 52 boots up the Bluetooth control program 304 by simply locating the cellular phone 52 close to the personal computer 51 without an operation to boot up the Bluetooth control program 304. In the same way as already described, the communication partner is identified based on the card ID notified of by the non-contact IC card 246, and without any particular operation, Bluetooth communications are performed with the personal computer 51.

In the above discussion, the Bluetooth module 247 of the cellular phone 52 is started up in response to the reception of the electromagnetic wave emitted from the reader/writer 105, and the Bluetooth module 106 of the personal computer 51 is started up in response to the reception of the card ID sent from the cellular phone 52. However, the Bluetooth modules may be started up at a variety of timings.

For example, the Bluetooth control program 304 of the cellular phone 52 may be booted up at the timing the personal computer 51 is notified of the card ID (at the timing immediately subsequent to step S213).

In the power off state of the entire cellular phone 52, the entire cellular phone 52 may be switched on in response to an electromotive force generated in response to the reception of the electromagnetic wave, and in succession, the Bluetooth control program 304 may be booted up.

In the above discussion, both the non-contact IC card 246 and the Bluetooth module 247 are contained in the cellular phone 52. Alternatively, the memory stick 223 having these modules assembled therewithin may be loaded into the memory stick slot 222, and the above process may be executed.

Figure 24A:
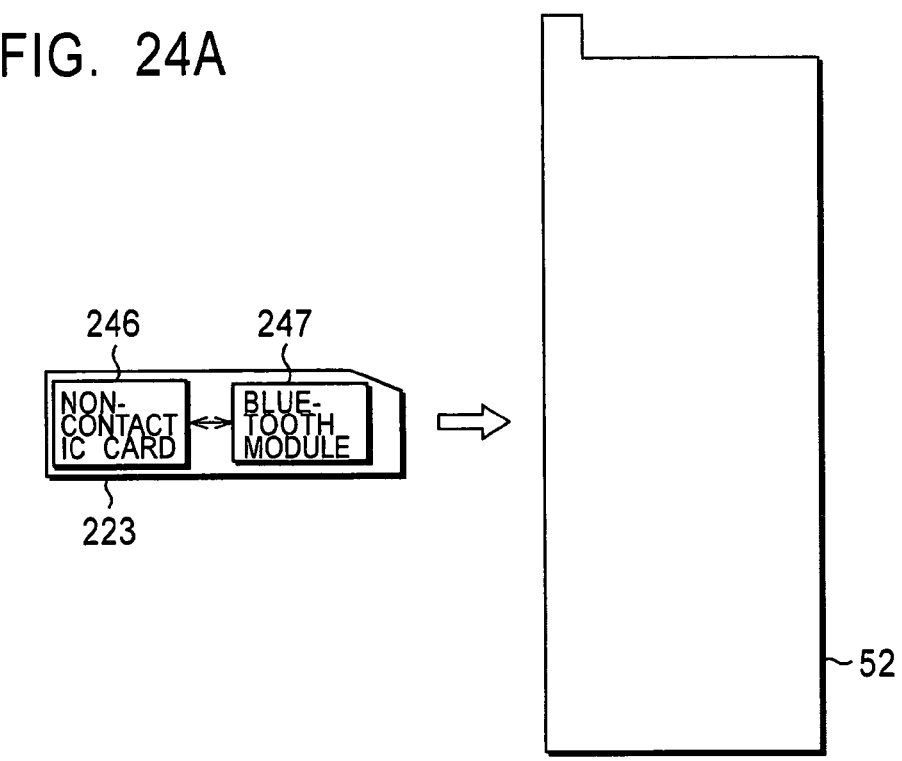
FIG. 24A illustrates another structure of the cellular phone of FIG. 6.

FIG. 24A is a diagram illustrating the cellular phone 52. The cellular phone 52 has an expanded function as a result of loading the memory stick 223 having the non-contact IC card 246 and the Bluetooth module 247 assembled thereinto.

With the memory stick 223 loaded, the cellular phone 52 expands the function thereof even when the cellular phone 52 has neither built-in non-contact IC card 246 nor built-in Bluetooth module 247. The above-referenced synchronization process for establishing the intra-piconet synchronization is thus performed.

A control program for controlling an expanded function or a new function is read from the memory stick 223, and installed in the cellular phone 52. Alternatively, the control program may be installed from a recording medium such as one of the magnetic disk 101 through the semiconductor memory 104 shown in FIG. 11 through a USB cable.

Figure 24B:
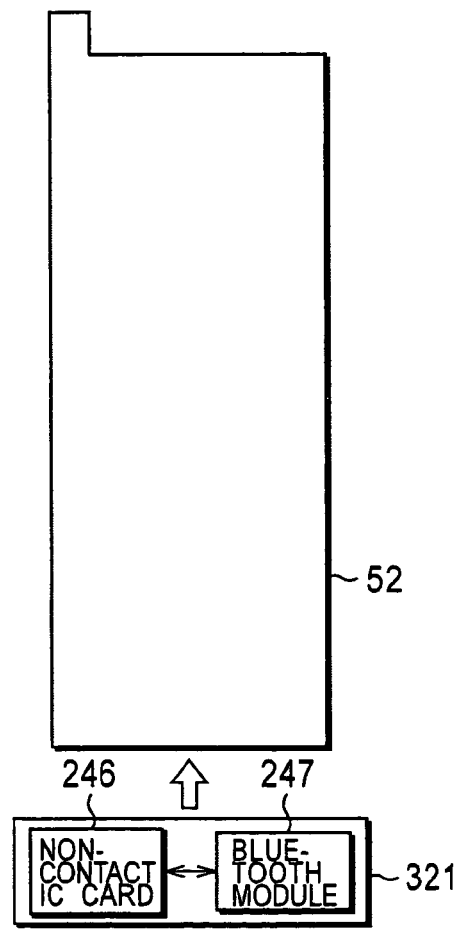
FIG. 24B illustrates yet another structure of the cellular phone of FIG. 6.

Rather than by using the memory stick 223, the cellular phone 52 may be expanded in function by the use of an external unit 321 having the non-contact IC card 246 and the Bluetooth module 247 assembled thereinto as shown in FIG. 24B. The external unit 321 is connected to a USB connector or a connector for a charging cable, mounted on a predetermined position on the cellular phone 52.

Figure 25A:
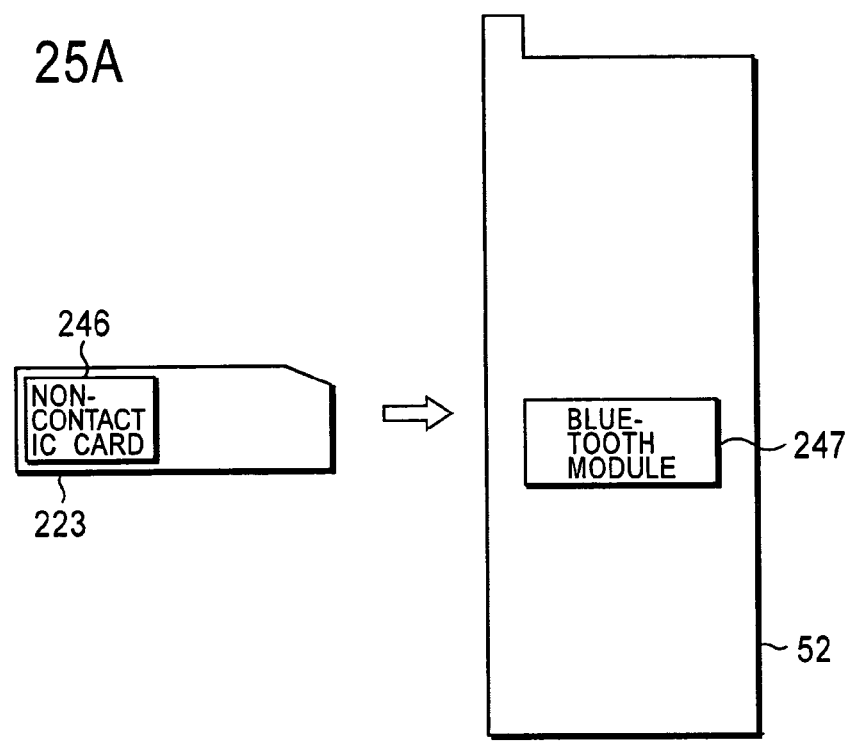
FIG. 25A illustrates a further structure of the cellular phone of FIG. 6.

FIG. 25A is a diagram of the cellular phone 52 that has a built-in Bluetooth module 247 and expands the function of the non-contact IC card 246 only by the use of the memory stick 223.

The memory stick 223 is loaded into the cellular phone 52, and the card ID set in the non-contact IC card 246 is set to contain the Bluetooth device name set in the Bluetooth module 247. The above-referenced establishment process for establishing the intra-piconet synchronization is thus performed. A rewrite process of the card ID or the Bluetooth device name will be discussed later with reference to a flowchart.

Figure 25B:
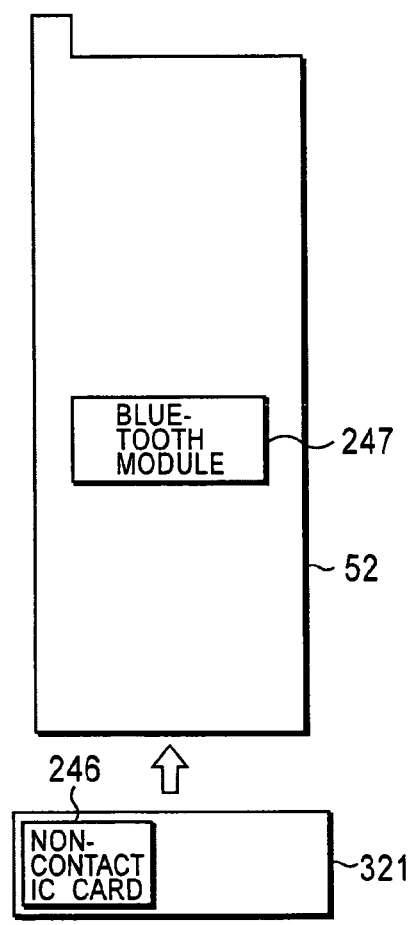
FIG. 25B illustrates a still further structure of the cellular phone of FIG. 6.

The function of the non-contact IC card 246 only is expanded by using the external unit 321 together with the cellular phone 52 as shown in FIG. 25B.

Figure 26A:
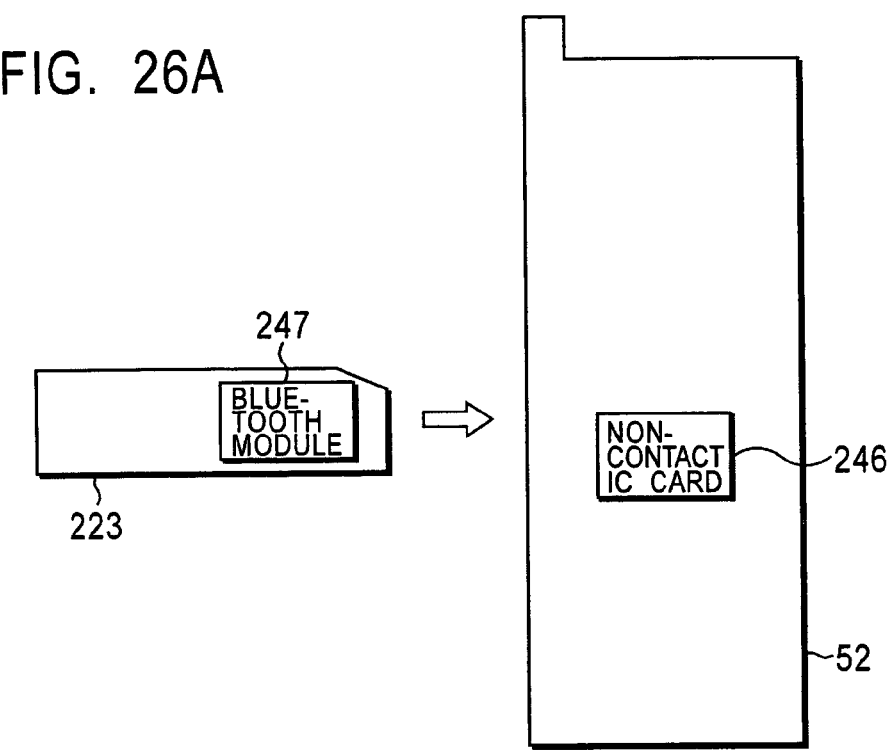
FIG. 26A illustrates a further structure of the cellular phone of FIG. 6.
Figure 26B:
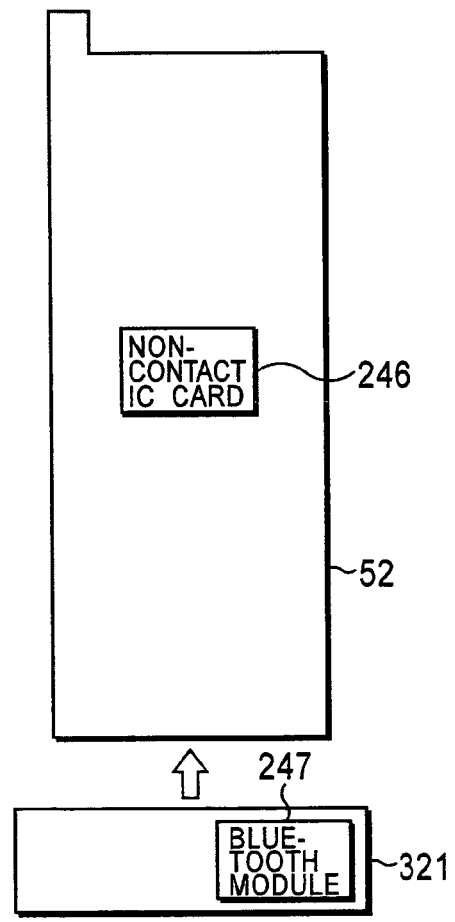
FIG. 26B illustrates a still further structure of the cellular phone of FIG. 6.

In contrast to FIG. 25A, FIG. 26A is a diagram of the cellular phone 52 having a built-in non-contact IC card 246. The function of the Bluetooth module 247 is expanded by the use of the memory stick 223. FIG. 26B is a diagram of the cellular phone 52 in which the function of the Bluetooth module 247 is expanded by the use of the external unit 321.

If there is no need for discrimination between the memory stick 223 and the external unit 321 for expanding the function of the non-contact IC card 246, the function of the Bluetooth module 247, or both in the discussion that follows, each of these two units are referred to as a function expansion unit.

The process of the cellular phone 52 for rewriting one of the card ID and the Bluetooth device name as necessary is discussed with reference to the flowchart.

As already discussed, the user may modify the card ID and the Bluetooth device name to the user's own preference. To establish the intra-piconet synchronization based on the Bluetooth device name supplied using the electromagnetic wave, at least the Bluetooth device name must be contained in the card ID.

Figure 27:
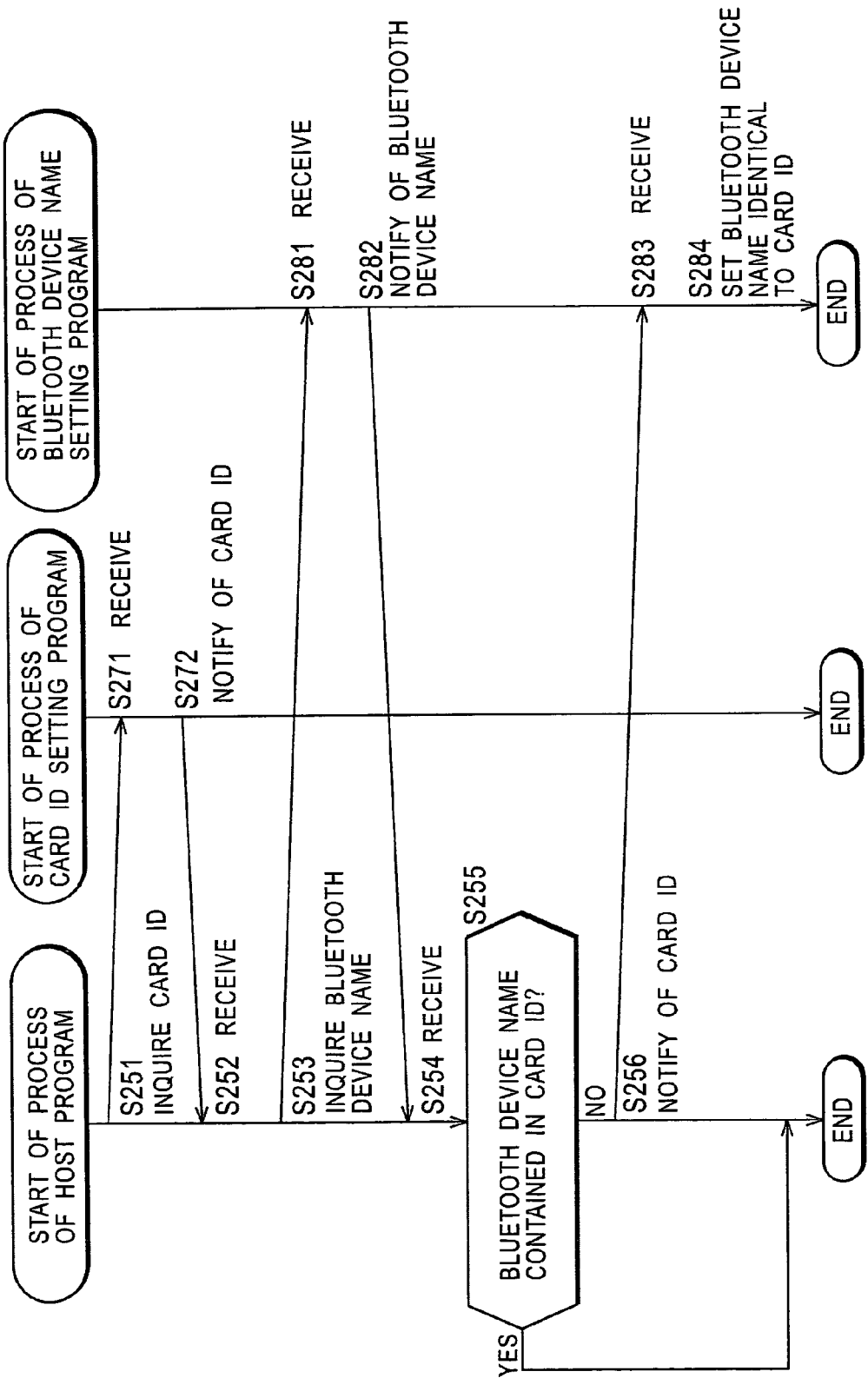
FIG. 27 is a flowchart illustrating a process of the cellular phone of FIG. 6.

The process of the cellular phone 52 for writing the Bluetooth device name based on the card ID will now be discussed with reference to the flowchart illustrated in FIG. 27.

In step S251, the host program 301 inquires the card ID from the card ID setting program 303 to check the card ID. Upon receiving the inquiry in step S271, the card ID setting program 303 proceeds to step S272 to read the card ID set in the EEPROM 264 and notify the host program 301 of the card ID.

In step S252, the host program 301 receives the card ID. In step S253, the host program 301 inquires the Bluetooth device name from the Bluetooth device name setting program 305 to check the Bluetooth device name.

In step S281, the Bluetooth device name setting program 305 receives the inquiry. In step S282, the Bluetooth device name setting program 305 reads the Bluetooth device name stored in the flash memory 174B and notifies the host program 301 of the Bluetooth device name.

In step S254, the host program 301 acquires the Bluetooth device name notified of by the Bluetooth device name setting program 305, and compares the Bluetooth device name with the one already notified card ID. In step S255, the host program 301 determines whether the acquired card ID contains at least the Bluetooth device name (information relating to the Bluetooth device name).

If the host program 301 determines in step S255 that the card ID is identical to the Bluetooth device name or that the card ID contains the Bluetooth device name, the process ends. If the host program 301 determines in step S255 that the card ID contains no Bluetooth device name, the algorithm proceeds to step S256. The host program 301 notifies the Bluetooth device name setting program 305 of the acquired card ID.

In step S283, the Bluetooth device name setting program 305 receives the card ID. In step S284, the Bluetooth device name setting program 305 sets the Bluetooth device name identical to the card ID. More specifically, the Bluetooth device name setting program 305 overwrites the Bluetooth device name set in the flash memory 174B with information identical to the card ID.

In this way, the card ID contains the Bluetooth device name. As already discussed, simply locating the cellular phone 52 close to the personal computer 51 causes the personal computer 51 functioning as the master to identify the communication partner subsequent to the establishment of the intra-piconet synchronization.

The rewrite operation of the card ID or the Bluetooth device name, including a process to be discussed below, may be performed with a predetermined period. The non-contact IC card 246 may find applications in a variety of fields, including a passage through a ticket gate, and a payment for a purchased commodity, besides the Bluetooth communications, and may be modified as necessary. If the rewrite operation is performed with the predetermined period, the user is free from resetting of the card ID each time the Bluetooth communication is performed.

The rewrite operation may be performed at the timing the electromagnetic wave is received from the reader/writer 105. In this way, a master having a reader/writer more reliably identifies a communication partner.

The process of the cellular phone 52 for rewriting the card ID based on the Bluetooth device name to set the card ID identical to the Bluetooth device name will now be discussed with reference to a flowchart illustrated in FIG. 28.

Figure 28:
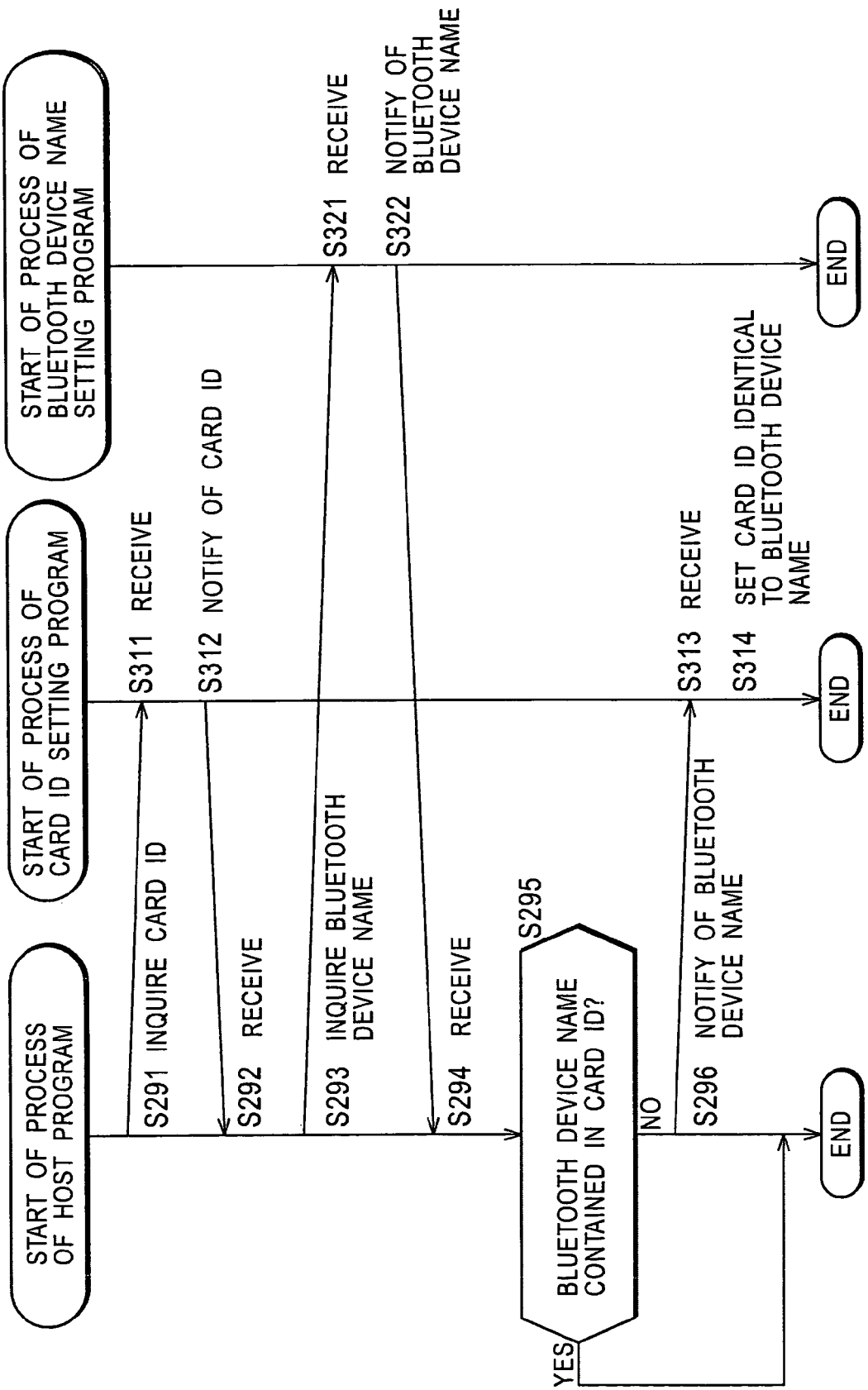
FIG. 28 is a flowchart illustrating another process of the cellular phone of FIG. 6.

The process illustrated in FIG. 28 is basically identical to the process discussed with reference to FIG. 27. More specifically, the host program 301 inquires the card ID and the Bluetooth device name respectively from the card ID setting program 303 and the Bluetooth device name setting program 305 to acquire the card ID and the Bluetooth device name. In step S295, the host program 301 determines whether the card ID contains at least the Bluetooth device name. If the host program 301 determines that the card ID contains the Bluetooth device name, the process ends.

If the host program 301 determines in step S295 that the card ID contains no Bluetooth device name, the algorithm proceeds to step S296. The host program 301 notifies the Bluetooth device name setting program 305 of the acquired Bluetooth device name.

Upon receiving the Bluetooth device name in step S313, the card ID setting program 303 proceeds to step S314. The card ID setting program 303 overwrites the card ID set in the EEPROM 264 with the same card ID as the Bluetooth device name (or the card ID containing the Bluetooth device name).

The process of the cellular phone 52 for rewriting the card ID or the Bluetooth device name is discussed with reference FIG. 29 through FIG. 32. The cellular phone 52 is expanded in function by the function expansion unit.

First, the process of the cellular phone 52 having the function expansion unit expanding the function of the non-contact IC card 246 is discussed with reference to a flowchart shown in FIG. 29.

In step S331, the host program 301 determines whether the function expansion unit for expanding the function of the non-contact IC card 246 is loaded. The host program 301 waits on standby until it is determined that the function expansion unit is loaded. If the host program 301 determines in step S331 that one of the memory stick 223 shown in FIG. 25A and the external unit 321 shown in FIG. 25B is loaded, the algorithm proceeds to step S332.

The subsequent process remains unchanged from the process discussed with reference to FIG. 27. More specifically, the host program 301 acquires the card ID and the Bluetooth device name, and determines in step S336 whether the card ID contains at least the Bluetooth device name.

If the host program 301 determines in step S336 that the card ID contains the Bluetooth device name, the process ends, or else the algorithm proceeds to step S337. The host program 301 notifies the Bluetooth device name setting program 305 of the card ID.

The Bluetooth device name setting program 305 overwrites the set Bluetooth device name with the same card ID as the received card ID.

In this way, the user, who has purchased the memory stick 223 for expanding the function of the non-contact IC card 246, rewrites the Bluetooth device name of the Bluetooth module 247 as necessary by simply loading the memory stick 223 into the cellular phone 52.

The user executes the above-referenced establishment process for establishing the intra-piconet synchronization using the function-expanded cellular phone 52. Without the need for selecting the communication partner, the user starts the Bluetooth communication.

Figure 29:
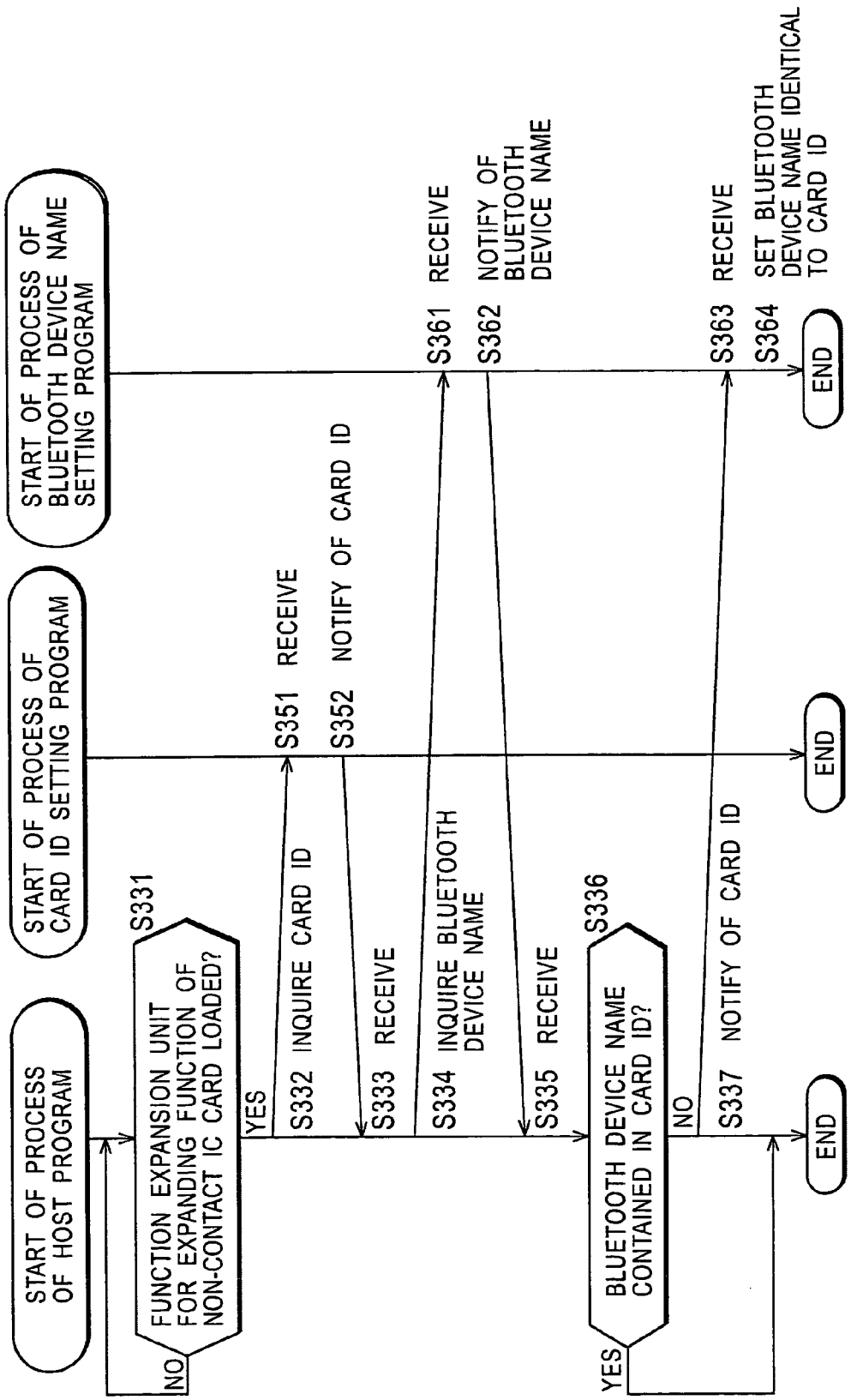
FIG. 29 is a flowchart illustrating yet another process of the cellular phone of FIG. 6.
Figure 30:
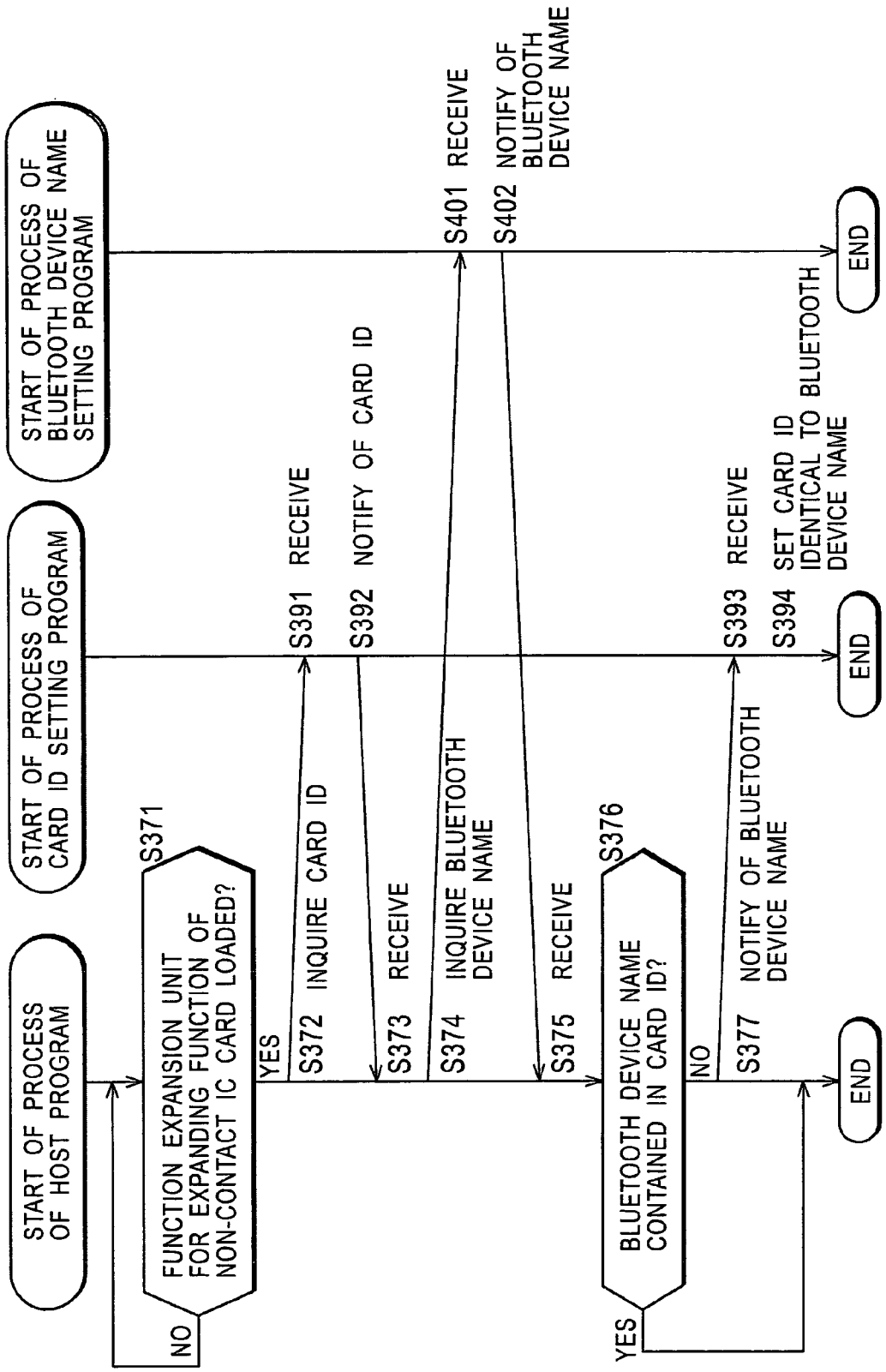
FIG. 30 is a flowchart illustrating a further process of the cellular phone of FIG. 6.

Like the flowchart illustrated in FIG. 29, the flowchart in FIG. 30 describes the process of the cellular phone 52 that has the function expansion unit loaded therein to expand the function of the non-contact IC card 246. The flowchart in FIG. 30 is different from the flowchart in FIG. 29 in information to be rewritten.

More specifically, the card ID is rewritten based on the Bluetooth device name in the flowchart illustrated in FIG. 30 if it is determined that the function expansion unit for expanding the function of the non-contact IC card 246 is loaded, and it is determined that at least the Bluetooth device name is not contained in the set card ID.

The process of the cellular phone 52 having the function expansion unit loaded therein to expand the function of the Bluetooth module 247 is discussed with reference to a flowchart illustrated in FIG. 31.

In step S411, the host program 301 determines whether the function expansion unit for expanding the function of the Bluetooth module 247 is loaded, and waits until it is determined that the function expansion unit is loaded. If the host program 301 determines in step S411 that one of the memory stick 223 illustrated in FIG. 26A and the external unit 321 illustrated in FIG. 26B is loaded, the algorithm proceeds to step S412.

The subsequent process remains unchanged from the process described with reference to FIG. 27. More specifically, the host program 301 acquires the card ID and the Bluetooth device name, and determines in step S416 whether the card ID contains at least the Bluetooth device name.

If the host program 301 determines in step S416 that the card ID contains at least the Bluetooth device name, the process ends, else, the algorithm proceeds to step S417. The host program 301 notifies the Bluetooth device name setting program 305 of the card ID.

The Bluetooth device name setting program 305 rewrites the Bluetooth device name with the same card ID as the received card ID.

In the above process, the user rewrites the Bluetooth device name as necessary by simply purchasing the memory stick 223 for expanding the function of the Bluetooth module 247, and loading the memory stick 223 into the cellular phone 52. The user executes the above-referenced establishment process for establishing the intra-piconet synchronization using the cellular phone.

Figure 31:
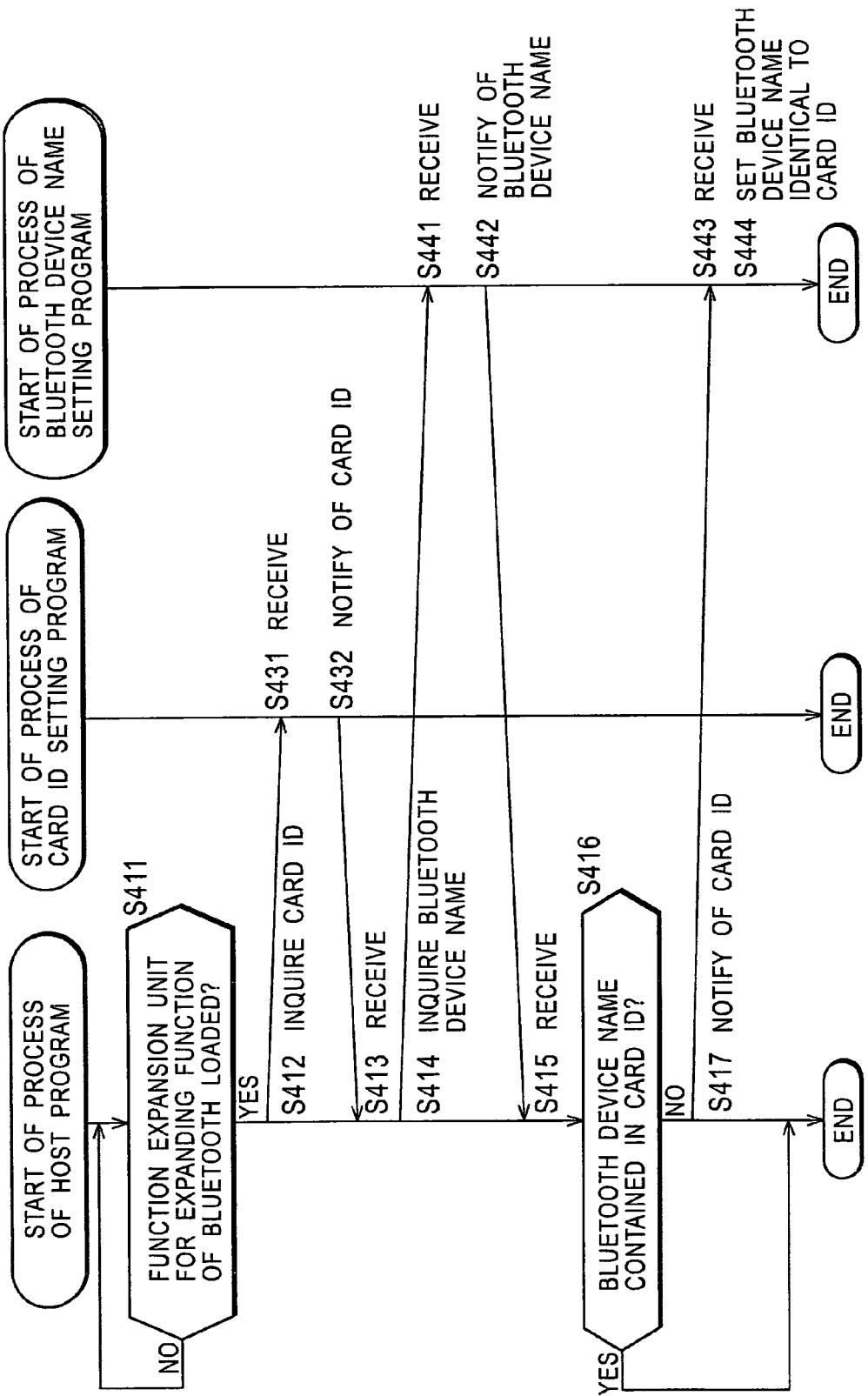
FIG. 31 is a flowchart illustrating a still further process of the cellular phone of FIG. 6.
Figure 32:
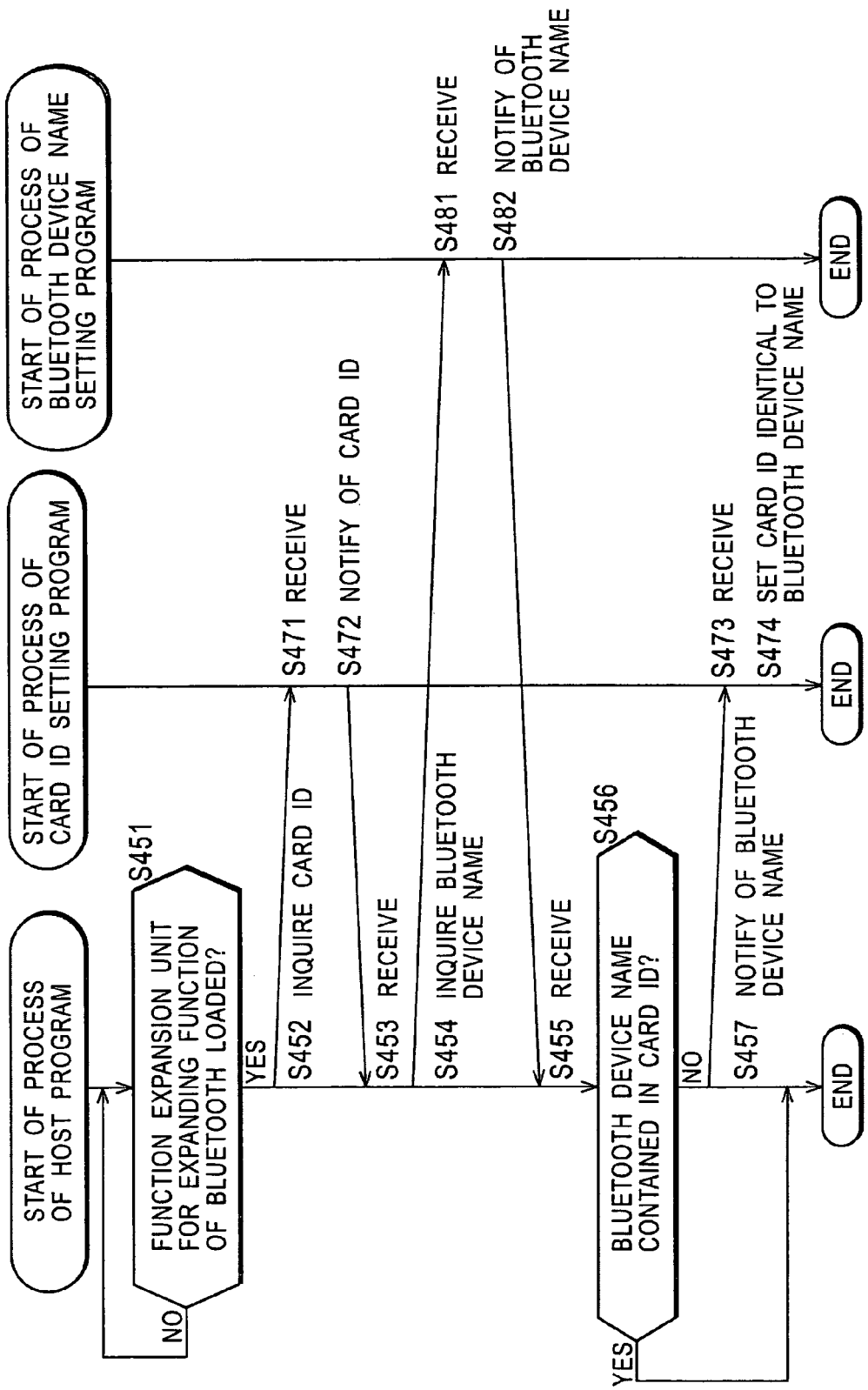
FIG. 32 is a flowchart illustrating yet a still further process of the cellular phone of FIG. 6.

Like the flowchart illustrated in FIG. 31, the flowchart in FIG. 32 describes the process of the cellular phone 52 that has the function expansion unit loaded therein to expand the function of the Bluetooth module 247. The flowchart in FIG. 32 is different from the flowchart in FIG. 31 in information to be rewritten.

More specifically, the card ID is rewritten based on the Bluetooth device name in the flowchart illustrated in FIG. 32 if it is determined that the function expansion unit for expanding the function of the Bluetooth module 247 is loaded, and it is determined that at least the Bluetooth device name is not contained in the set card ID.

In the above discussion, memories for respectively storing the card ID and the Bluetooth device name are arranged. Alternatively, these pieces of information may be stored in a physically single memory shared by the non-contact IC card 246 and the Bluetooth module 247. The shared memory may be assembled into the memory stick 223 or may be contained in the cellular phone 52.

In the above discussion, the personal computer 51 is a master, and the cellular phone 52 is a slave. The two apparatuses may be interchanged in role to each other. If a reader/writer is also arranged in the cellular phone 52, the cellular phone 52 may detect the presence of the personal computer 51, and the intra-piconet synchronization may be established based on a card ID notified of by the non-contact IC card in the personal computer 51.

In the communication system, the Bluetooth device name is acquired through the communication between the non-contact IC and the reader/writer and the intra-piconet synchronization is established based on the Bluetooth device name. This communication system is applicable not only to the communication between the personal computer 51 and the cellular phone 52, but also to communications between a variety of apparatuses.

For example, the above-referenced communication system may be constructed between a terminal such as the cellular phone 52 or the PDA 53 and an apparatus such as a television receiver, a car navigation system, a vending machine, and an ATM (automatic teller machine). It suffices if at least both a Bluetooth module and a non-contact IC card are arranged in each of the cellular phone 52 and the PDA 53, and it suffices if a Bluetooth module and a reader/writer of the non-contact IC card are arranged in each of the television receiver, the car navigation system, the vending machine, and the ATM.

If one of the two apparatuses has a reader/writer, the present invention is applicable to establish the intra-piconet synchronization between cellular phones, between PDAs, between a PDA and a digital camera, or between a PDA and a digital video camera.

An electromagnetic induction unit (including the reader/writer and the non-contact IC card) and a Bluetooth module are not only used for a connection between apparatuses, but also installed in a moving object, such as a car, an electric train, a ship, or an airplane, within a building, or in any place in a street. Through the Bluetooth module, the electromagnetic induction unit is linked to a network such as the Internet, a LAN (Local Area Network), or a WAN (Wide Area Network), and thus, a ubiquitous society (such as a Ubiquitous Network Society or a Ubiquitous Computing Society) is constructed.

Figure 33:
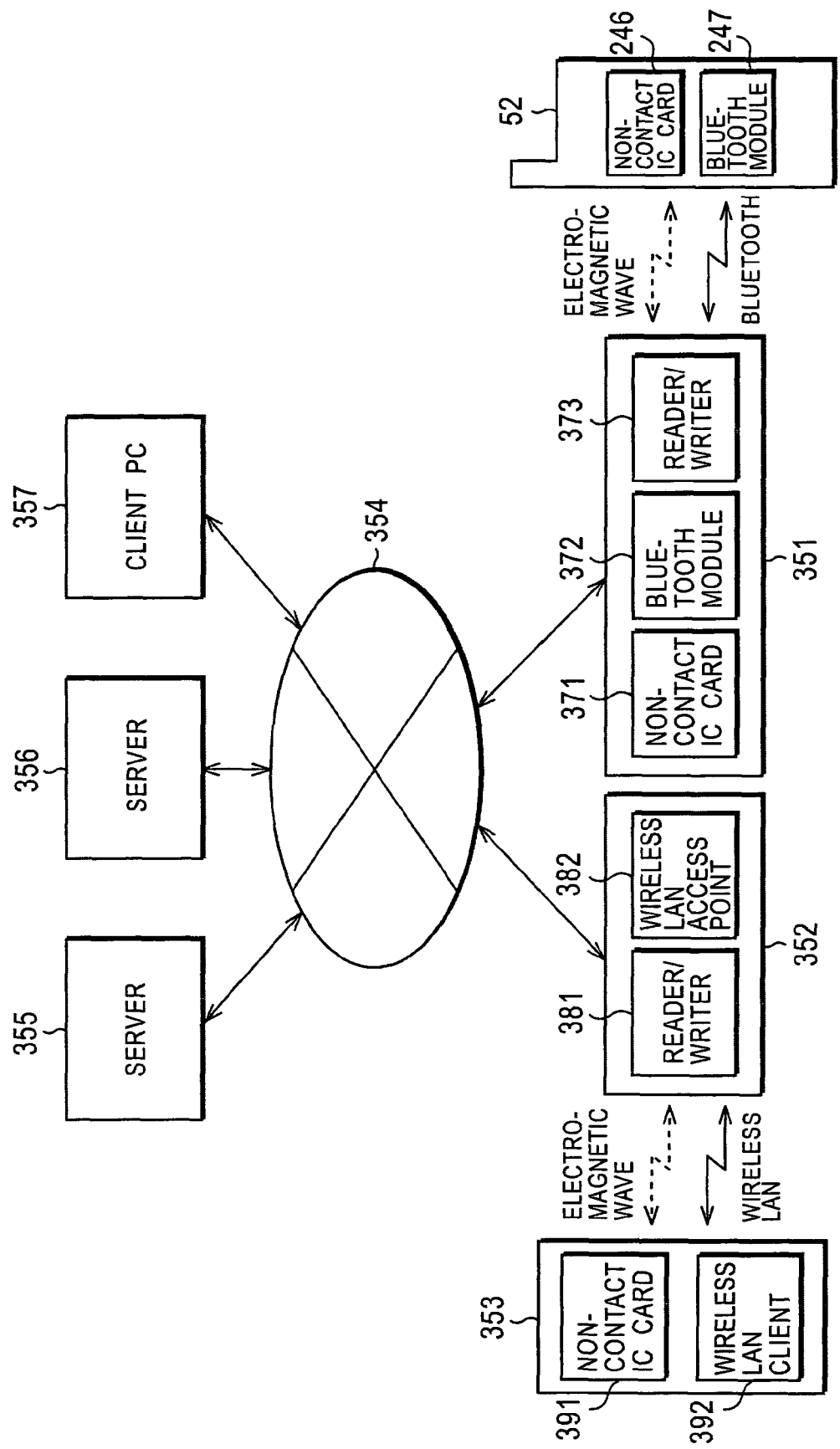
FIG. 33 illustrates a concept of a ubiquitous society implementing the present invention.

FIG. 33 illustrates the concept of the ubiquitous society constructed of the communication system implementing the present invention.

Connected to the Internet 354 as shown are access points 351 and 352, servers 355 and 356, and a client PC 357. Various information is exchanged over the Internet 354.

Connected to the access point 351 are a non-contact IC card 371, a Bluetooth module 372, and a reader/writer 373. The user of the cellular phone 52 simply locates the cellular phone 52 close to the access point 351 to perform the above-referenced process to identify the communication partner. In succession, the user gains access to the Internet 354 through the Bluetooth communication.

A reader/writer 381 and a wireless LAN access point 382 are arranged on the access point 352. The above-referenced process to identify the communication partner is performed when the user of a PDA 353 having a non-contact IC card 391 and a wireless LAN client 392 therewithin simply locates the PDA 353 close to the access point 352. The user thus gains access to the Internet 354 through a wireless LAN.

By simply locating the cellular phone 52 to the access point 351 ubiquitously installed in streets, the user of the cellular phone 52 may acquire a desired content from the server 355, participate in a community developed in the server 356, and operate a remote client PC 357 easily and at any time.

The present invention is applicable to a communication, other than the Bluetooth communication, such as a wireless LAN (IEEE (Institute of Electrical and Electronics Engineers) 802.11b) formed between the access point 352 and the PDA 353. For example, to gain access to the Internet 354 through the wireless LAN, the non-contact IC card 391 notifies the reader/writer 381 at the access point 352 of an MAC (Media Access Control) address, the number of channels, ESS-ID (Extended Service Set-Identification), etc.

Communications other than the Bluetooth communication include IrDA, HomeRF (SWAP), Wireless 1394, etc, and the present invention is applicable to these communications.

Instead of the communication method in which the above-referenced non-contact IC card 246 performs power transmission and data transfer using the loop antenna, any other communication method may be used as long as the communication method is set beforehand to have a communication coverage distance shorter than that of the Bluetooth communication by reducing output power.

In the above discussion, the personal computer 51 determines an apparatus to communicate with based on the card ID notified of by the non-contact IC card 246 and the Bluetooth device name notified of by the Bluetooth module 247. Alternatively, any information may be used as long as the information is unique identification information.

For example, when Ipv6 (Internet Protocol version 6) of 128 bits is assigned to each apparatus, the personal computer 51 functioning as the master identifies the apparatus to communicate with based on identification information notified of by the non-contact IC card 246.

In the above discussion, the terminal to communicate with is identified based on the card ID notified of by the non-contact IC card. Alternatively, the ID may be issued by the reader/writer to an approaching terminal. In this case, the approaching terminal performs the process to rewrite own Bluetooth device name based on the ID when the reader/writer notifies of the ID. The master having that reader/writer identifies the terminal to communicate with by referencing the issued ID and the Bluetooth device name which is notified of subsequent to the establishment of the intra-piconet synchronization. In this way, a Bluetooth device having no non-contact IC card and a Bluetooth device having a non-contact IC card are discriminated. A variety of methods are used to identify the communication partner.

As described above, when a partner terminal performs the Bluetooth communication for the first time subsequent to the establishment of synchronization, the same PIN code must be input to both terminals. In accordance with the present invention, however, the communication partner is identified based on identification information acquired through the communication using the electromagnetic wave, and the Bluetooth communication is enabled. In this case, the terminals may be preset for eliminating the need for the input of the PIN code. For example, a communication using the electromagnetic induction allows the two terminals to share a predetermined PIN code.

When the communication partner is identified based on identification information acquired through the communication using the electromagnetic induction, and the Bluetooth communication is enabled, the communication may be performed at a predetermined profile. In this case, the communication using the electromagnetic induction allows the two terminals to share the profiles provided by own terminal, and a predetermined profile is selected from among the profiles.

Any type of card may be substituted for the above-referenced memory stick 223 as long as the card is sized to be received in a predetermined slot. Available as a substitute for the memory stick 223 are an SD card®, and a CF card®, for example.

In the above-referenced example, the reader/writer 105 and the non-contact IC card 246 are separate elements. Each of the personal computer 51 and the personal computer 51 may have a unit having the identical functions. For example, the units having the respective functions may be assembled into the above-referenced memory stick 223 to expand the function of the personal computer 51 and the cellular phone 52.

The above series of process steps may be performed using hardware or software.

If the series of process steps is performed using the software, a computer program constituting the software may be installed from a network or a recording medium to a computer assembled into a dedicated hardware, or into a general-purpose computer that performs a variety of functions by installing various programs thereon.

The recording medium may be a package medium, which is distributed separately from the apparatus to supply the user with the software program. As shown in FIG. 11, the package medium may be one of the magnetic disk 101 (including a floppy disk), the optical disk 102 (including compact disk-read only memory (CD-ROM), digital versatile disk (DVD)), the magneto-optical disk 103 (including MD® (Mini-disk), and the semiconductor memory 104. The recording medium also may be one of the HDD 114 and the ROM 118, each of which is supplied in the mounted state thereof in the apparatus and has a computer program stored therewithin.

The process steps describing the software program stored in the recording medium are typically performed in the time sequence order stated in each flowchart. It is not a requirement that the process steps be performed in the time sequence order. Several process steps may be performed in parallel or separately.

In this specification, the system refers to an entire system containing a plurality of apparatuses.

INDUSTRIAL APPLICABILITY

In the communication system and the communication method of the present invention as described above, the identification information of the communication terminal is acquired using the first wireless communication unit that sends power to and transmits data to and receives data from the communication terminal close thereto through the loop antenna, the synchronization for wireless communication with the plurality of communication terminals including the communication terminal close thereto is established using the second wireless communication unit, and the terminal name information is acquired from the plurality of communication terminals with which synchronization is established, using the second wireless communication unit. The communication partner is identified using the acquired identification information and the acquired terminal name information. The identification information of own terminal is provided to the information processing apparatus using the third wireless communication unit that transmits and receives data using at least a portion of power induced through an loop antenna, synchronization is established by transmitting and receiving predetermined signals through the fourth wireless communication unit in response to the request from the information processing apparatus when the synchronization of wireless communication is established using the second wireless communication unit, and the terminal name information of own terminal is provided, using the fourth wireless communication unit transmitting and receiving data, in response to the request from the information processing apparatus transmitted through the second wireless communication unit. In this way, the communication partner is identified subsequent to the establishment of synchronization, and communication is started easily and quickly.

In the information processing apparatus, the information processing method, and the program of the present invention, the identification information of the communication terminal is acquired using the first wireless communication unit that transmits and receives predetermined data, the synchronization for wireless communication with the plurality of communication terminals including the communication terminal is established using the second wireless communication unit that transmits and receives desired data, and the terminal name information is acquired from the plurality of communication terminals with which synchronization is established, using the second wireless communication unit. The communication partner is identified using the acquired identification information, and the acquired terminal name information. In this way, the communication partner is identified subsequent to the establishment of synchronization, and communication is started easily and quickly.

In the communication terminal, the communication method, and the program of the present invention, the identification information of own terminal is provided in response to the predetermined request from the information processing apparatus using the first wireless communication unit that transmits and receives predetermined data, the synchronization with the information processing apparatus is established by transmitting and receiving predetermined signals through the second wireless communication unit that transmits and receives desired data, and the terminal name information of own terminal is provided using the second wireless communication unit in response to the request from the information processing apparatus received through the second wireless communication unit. The communication is easily and quickly started.

In the first expansion device of the present invention, the connection terminal is electrically connected to the information processing apparatus, the identification information of the communication terminal close thereto is acquired using the first wireless communication unit that sends power to and transmits data to and receives data from the communication terminal close thereto through the loop antenna, and the synchronization for wireless communication with the plurality of communication terminals including the communication terminal close thereto is established using a second wireless communication unit. The terminal name information is acquired from the plurality of communication terminals with which synchronization is established by the synchronization processing means, using the second wireless communication unit, and the communication partner is identified using the acquired identification information and the acquired terminal name information. Even if the first and second wireless communication units are not arranged in the information processing apparatus, the first expansion device expands the function of the information processing apparatus, and communication is easily and quickly started.

In the second expansion device of the present invention, the connection terminal is electrically connected to the communication terminal, the identification information of own terminal is provided in response to the request from an information processing apparatus using the first wireless communication unit that transmits and receives data using at least the portion of power induced through the loop antenna, the synchronization with the information processing apparatus is established by transmitting and receiving predetermined signals through the second wireless communication unit that transmits and receives desired data, and the terminal name information of own terminal is provided using the second wireless communication unit in response to the request from the information processing apparatus received through the second wireless communication unit. Even if the first and second wireless communication units are not arranged in the information processing apparatus, the second expansion device expands the function of the information processing apparatus, and the communication is easily and quickly started.

The invention claimed is:

1. A communication system comprising a ubiquitous network including an information processing apparatus and a plurality of communication terminals,
wherein the information processing apparatus comprises:
transmission means for transmitting a detection signal to detect a communication terminal;
first acquisition processing means for acquiring, upon moving at least one of the plurality of communication terminals close to the information processing apparatus, identification information of the communication terminal close thereto using a first wireless communication unit that sends power to, and transmits data to, and receives data from the communication terminal close thereto through a loop antenna;
first synchronization processing means for establishing synchronization for wireless communication with the plurality of communication terminals using a second wireless communication unit;
second acquisition processing means for acquiring, using the second wireless communication unit, second identification information from the plurality of communication terminals with which synchronization is established; and
identification processing means for automatically identifying, as a communication partner, the communication terminal having the acquired identification information, from among the plurality of communication terminals having the acquired second identification information based on a matching between the identification information acquired by the first wireless communication unit and the second identification information acquired by the second wireless communication unit; and
wherein the communication terminal comprises:
first providing processing means for providing identification information of the communication terminal to the information processing apparatus in response to receiving the detection signal, using a third wireless communication unit that transmits and receives data using at least a portion of power induced through a loop antenna;

second synchronization processing means for establishing synchronization by transmitting and receiving predetermined signals through a fourth wireless communication unit in response to a request from the information processing apparatus when the synchronization of wireless communication is established; and
second providing processing means for providing second identification information of the communication terminal, using the fourth wireless communication unit, in response to a request from the information processing apparatus transmitted through the second wireless communication unit, wherein:
the information processing apparatus establishes, using the second wireless communication unit and the second identification information, communication with the fourth wireless communication unit of the automatically identified communication terminal.

2. A communication method for a communication system including a ubiquitous network including an information processing apparatus and a plurality of communication terminals,
wherein the information processing method for the information processing apparatus comprises:
transmitting a detection signal to detect a communication terminal;
acquiring, upon moving at least one of the plurality of communication terminals close to the information processing apparatus, identification information of the communication terminal close thereto using a first wireless communication unit that sends power to, transmits data to, and receives data from the communication terminals terminal close thereto through a loop antenna;
establishing synchronization for wireless communication with the plurality of communication terminals using a second wireless communication unit;
acquiring, using the second wireless communication unit, second identification information from the plurality of communication terminals with which synchronization is established; and
automatically identifying, as a communication partner, the communication terminal having the acquired identification information, from among the plurality of communication terminals having the acquired second identification information based on a matching between the identification information acquired by the first wireless communication unit and the second identification information acquired by the second wireless communication unit; and
wherein the communication method for the communication terminal comprises:
providing identification information of the communication terminal to the information processing apparatus in response to receiving the detection signal, using a third wireless communication unit that transmits and receives data using at least a portion of power induced through a loop antenna, establishing synchronization by transmitting and receiving predetermined signals through a fourth wireless communication unit in response to a request from the information processing apparatus when the synchronization of wireless communication is established; and
providing second identification information of the communication terminal, using the fourth wireless communication unit, in response to a request from the information processing apparatus transmitted through the second wireless communication unit, and further including:

establishing, by the information processing apparatus using the second wireless communication unit and the second identification information, communication with the fourth wireless communication unit of the automatically identified communication terminal.

3. An information processing apparatus, comprising:

transmission means for transmitting a detection signal to detect a communication terminal;

first acquisition processing means for acquiring, upon moving at least one of a plurality of communication terminals close to the information processing apparatus, identification information of the communication terminal using a first wireless communication unit that transmits and receives predetermined data;

synchronization processing means for establishing synchronization for wireless communication with the plurality of communication terminals using a second wireless communication unit that transmits and receives desired data;

second acquisition processing means for acquiring, using the second wireless communication unit, second identification information from the plurality of communication terminals with which synchronization is established; and identification processing means for automatically identifying, as a communication partner, the communication terminal having the acquired identification information, from among the plurality of communication terminals having the acquired second identification information based on a matching between the identification information acquired by the first wireless communication unit and the second identification information acquired by the second wireless communication unit, wherein:

the information processing apparatus establishes, using the second wireless communication unit and the second identification information, communication with the automatically identified communication terminal.

4. An information processing apparatus according claim 3, wherein the wireless communication coverage distance of the first wireless communication unit is shorter than the wireless communication coverage distance of the second wireless communication unit.

5. An information processing apparatus according to claim 3, wherein the first acquisition processing means acquires the identification information of the communication terminals terminal close thereto using the first wireless communication unit that sends power to and transmits data to and receives data from the communication terminal close thereto through a loop antenna.

6. An information processing apparatus according to claim 3, wherein each of the identification information and the second identification information contains a Bluetooth device name.

7. An information processing apparatus according to claim 3, wherein each of the identification information and the second identification information contains an IP address unique to the communication terminal.

8. An information processing apparatus according to claim 3, further comprising start-up processing means for starting the second wireless communication unit in response to the acquisition of the identification information by the first acquisition processing means.

9. An information processing apparatus according to claim 3, wherein the first acquisition processing means operates when the proximity of the communication terminal is detected in response to a change in the load of the first wireless communication unit.

10. An information processing method, comprising:

transmitting a detection signal to detect a communication terminal;

acquiring, upon moving at least one of a plurality of communication terminals close to an information processing apparatus, identification information of the communication terminal using a first wireless communication unit that transmits and receives predetermined data;

establishing synchronization for wireless communication with the plurality of communication terminals using a second wireless communication unit that transmits and receives desired data;

acquiring second identification information from the plurality of communication terminals with which synchronization is established, using the second wireless communication unit;

automatically identifying, as a communication partner, the communication terminal having the acquired identification information, from among the plurality of communication terminals having the acquired second identification information based on a matching between the identification information acquired by the first wireless communication unit and the second identification information acquired by the second wireless communication unit; and establishing, using the second wireless communication unit and the second identification information, communication with the automatically identified communication terminal.

11. An information processing method according to claim 10, wherein:

the identification information contains a Bluetooth device name, and acquiring identification information further comprises acquiring the identification information of the communication terminal close thereto using the first wireless communication unit, the first wireless communication unit sending power to, transmitting data to, and receiving data from the communication terminals through a loop antenna.

12. An information processing method according to claim 10, wherein the identification information is acquired when the proximity of the communication terminal is detected in response to a change in the load of the first wireless communication unit.

13. A communication terminal, comprising:

first providing processing means for providing, upon moving the communication terminal close to an information processing apparatus and in response to receiving a detection signal from the information processing apparatus, identification information of the communication terminal using a first wireless communication unit that transmits and receives predetermined data;

synchronization processing means for establishing synchronization with the information processing apparatus by transmitting and receiving predetermined signals through a second wireless communication unit that transmits and receives desired data; and second providing processing means for providing second identification information of the communication terminal using the second wireless communication unit in response to a request from the information processing apparatus received through the second wireless communication unit, wherein
the identification information provided by the first wireless communication unit and the second identification information provided by the second wireless communication unit are compared to establish a connection, and
the connection is established using the second identification information and the second wireless communication unit to allow communication between the communication terminal and the information processing apparatus.

14. A communication terminal according claim 13, wherein the wireless communication coverage distance of the first wireless communication unit is shorter than the wireless communication coverage distance of the second wireless communication unit.

15. A communication terminal according to claim 13, wherein the first providing processing means provides the identification information of the communication terminal to the information processing apparatus using the first wireless communication unit, the first wireless communication unit transmitting and receiving data using at least a portion of power induced through a loop antenna.

16. A communication terminal according to claim 13, wherein each of the identification information and the second identification information contains at least a Bluetooth device name.

17. A communication terminal according to claim 13, wherein each of the identification information and the second identification information contains an IP address unique to the communication terminal.

18. A communication method executed by a communication terminal, the method comprising:
providing, upon moving the communication terminal close to an information processing apparatus and in response to receiving a detection signal from the information processing apparatus, identification information of the communication terminal using a first wireless communication unit that transmits and receives predetermined data;
establishing synchronization with the information processing apparatus by transmitting and receiving predetermined signals through a second wireless communication unit that transmits and receives desired data; and
providing second identification information of the communication terminal using the second wireless communication unit in response to a request from the information processing apparatus received through the second wireless communication unit, wherein
the identification information provided by the first wireless communication unit and the second identification information provided by the second wireless communication unit are compared to establish a connection, and
the connection is established using the second identification information and the second wireless communication unit to allow communication between the communication terminal and the information processing apparatus.

19. A communication method according to claim 18, wherein:
each of the identification information and the second identification information contains at least a Bluetooth device name; and
the first wireless communication unit transmits and receives data using a portion of power induced through a loop antenna.

20. An expansion device connectable with an information processing apparatus, comprising:
a connection terminal, electrically connected to the information processing apparatus, for transmitting and receiving data;
transmission means for transmitting a detection signal to detect a communication terminal;
first acquisition processing means for acquiring, upon moving at least one of a plurality of communication terminals close to the information processing apparatus, identification information of the communication terminal using a first wireless communication unit that sends power to, transmits data to, and receives data from the communication terminal through a loop antenna;
synchronization processing means for establishing synchronization for wireless communication with the plurality of communication terminals using a second wireless communication unit;
second acquisition processing means for acquiring, using the second wireless communication unit, second identification information from the plurality of communication terminals with which synchronization is established; and
identification processing means for automatically identifying, as a communication partner, the communication terminal having the acquired identification information, from among the plurality of communication terminals having the acquired second identification information based on a matching between the identification information acquired by the first wireless communication unit and the second identification information acquired by the second wireless communication unit, wherein
the information processing apparatus establishes, using the second wireless communication unit and the second identification information, communication with the automatically identified communication terminal.

21. An expansion device connectable with a communication terminal, comprising:
a connection terminal, electrically connected to the communication terminal, for transmitting and receiving data;
first providing processing means for providing, upon moving the communication terminal close to an information processing apparatus and in response to receiving a detection signal from the information processing apparatus, identification information of the communication terminal using a first wireless communication unit that transmits and receives data using at least a portion of power induced through an loop antenna;
synchronization processing means for establishing synchronization with the information processing apparatus by transmitting and receiving predetermined signals through a second wireless communication unit that transmits and receives desired data; and
second providing processing means for providing second identification information of the communication terminal using the second wireless communication unit in response to a request from the information processing apparatus received through the second wireless communication unit, wherein
the identification information provided by the first wireless communication unit and the second identification information provided by the second wireless communication unit are compared to establish a connection, and
the connection is established using the second identification information and the second wireless communication unit to allow communication between the communication terminal and the information processing apparatus.

22. A computer-readable medium comprising program instructions which, when executed by a processor in an information processing apparatus, perform a method comprising:

transmitting a detection signal to detect a communication terminal;

acquiring, upon moving at least one of a plurality of communication terminals close to the information processing apparatus, identification information of the communication terminal close thereto using a first wireless communication unit that transmits and receives predetermined data;

establishing synchronization for wireless communication with the plurality of communication terminals using a second wireless communication unit that transmits and receives desired data;

acquiring second identification information from the plurality of communication terminals with which synchronization is established, using the second wireless communication unit;

automatically identifying, as a communication partner, the communication terminal having the acquired identification information, from among the plurality of communication terminals having the acquired second identification information based on a matching between the identification information acquired by the first wireless communication unit and the second identification information acquired by the second wireless communication unit, and establishing communication between the second wireless unit of the information processing apparatus and the identified communication terminal using the acquired second identification information.

23. A computer-readable medium comprising program instructions which, when executed by a processor in a communication terminal, perform a method comprising:

providing, upon moving the communication terminal close to an information processing apparatus and in response to receiving a detection signal from the information processing apparatus, identification information of the communication terminal using a first wireless communication unit that transmits and receives predetermined data;

establishing synchronization with the information processing apparatus by transmitting and receiving predetermined signals through a second wireless communication unit that transmits and receives desired data; and providing second identification information of the communication terminal using the second wireless communication unit in response to a request from the information processing apparatus received through the second wireless communication unit, wherein the identification information provided by the first wireless communication unit and the second identification information provided by the second wireless communication unit are compared to establish a connection, and the connection is established using the second identification information and the second wireless communication unit to allow communication between the communication terminal and the information processing apparatus.

* * * * *